United States Patent
Drazic et al.

(10) Patent No.: US 11,396,474 B2
(45) Date of Patent: *Jul. 26, 2022

(54) METHOD FOR MANUFACTURING A DEVICE FOR FORMING AT LEAST ONE FOCUSED BEAM IN A NEAR ZONE

(71) Applicant: INTERDIGITAL CE PATENT HOLDINGS, SAS, Paris (FR)

(72) Inventors: Valter Drazic, Betton (FR); Mozhdeh Seifi, Thorigne-Fouillard (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 77 days.

This patent is subject to a terminal disclaimer.

(21) Appl. No.: 15/946,821

(22) Filed: Apr. 6, 2018

(65) Prior Publication Data
US 2018/0354844 A1 Dec. 13, 2018

(30) Foreign Application Priority Data
Apr. 7, 2017 (EP) .................................... 17305414

(51) Int. Cl.
*C03C 17/00* (2006.01)
*G02B 3/00* (2006.01)
(Continued)

(52) U.S. Cl.
CPC .............. *C03C 17/001* (2013.01); *G02B 3/00* (2013.01); *G02B 6/32* (2013.01); *B82Y 20/00* (2013.01);
(Continued)

(58) Field of Classification Search
CPC ... C03C 17/001; C03C 2218/152; G02B 6/32; G02B 3/00; G02B 2006/12102; G02B 2003/0093; B82Y 20/00
(Continued)

(56) References Cited

U.S. PATENT DOCUMENTS 3,718,383 A 2/1973 Moore
3,873,408 A 3/1975 Hensler
(Continued)

FOREIGN PATENT DOCUMENTS

CN 1452722 A 10/2003
CN 1823456 8/2006
(Continued)

OTHER PUBLICATIONS

Definition—Light (https://www.britannica.com/science/light, accessed online Oct. 21, 2021) (Year: 2021).*
(Continued)

*Primary Examiner* — Michael B Cleveland
*Assistant Examiner* — Michael G Miller
(74) *Attorney, Agent, or Firm* — Invention Mine LLC

(57) ABSTRACT

The disclosure concerns a method for manufacturing a device for forming at least one focused beam in a near zone, from an electromagnetic wave incident on said device. The method includes depositing a dielectric material layer with a first refractive index on a substrate layer, creating at least one cavity by a microfabrication technique in the dielectric material layer, the device for forming at least one focused beam in a near zone of the substrate layer (110) and the dielectric material layer, filling the at least one cavity with a material having a second refractive index lower than the first refractive index, determining a deviation between a measured focused beam radiation angle obtained from the device for forming at least one focused beam in a near zone and an expected focused beam radiation angle and modifying locally at least one of the two refractive indexes according to the deviation.

14 Claims, 66 Drawing Sheets

(51) Int. Cl.
  *G02B 6/32* (2006.01)
  *B82Y 20/00* (2011.01)
  *G02B 6/12* (2006.01)
(52) U.S. Cl.
  CPC ............... *C03C 2218/152* (2013.01); *G02B 2003/0093* (2013.01); *G02B 2006/12102* (2013.01)
(58) Field of Classification Search
  USPC .................................................. 427/162–169
  See application file for complete search history.

(56) References Cited

U.S. PATENT DOCUMENTS

| | | | |
|---|---|---|---|
| 3,904,268 A | 9/1975 | Keck | |
| 4,952,037 A * | 8/1990 | Oikawa | C03C 3/078 359/642 |
| 6,236,513 B1 * | 5/2001 | Mallary | B82Y 20/00 359/642 |
| 6,569,575 B1 | 5/2003 | Biebuyck | |
| 6,594,430 B1 * | 7/2003 | Rausch | G02B 3/04 359/717 |
| 6,753,131 B1 | 6/2004 | Rogers | |
| 6,804,189 B2 | 10/2004 | Inase | |
| 7,057,151 B2 | 6/2006 | Lezec | |
| 7,394,535 B1 | 7/2008 | Chen | |
| 7,541,115 B1 | 6/2009 | Volk | |
| 7,612,883 B2 | 11/2009 | Que | |
| 8,003,965 B2 | 8/2011 | Grbic | |
| 8,052,908 B2 | 11/2011 | Peckerar | |
| 8,448,247 B2 | 5/2013 | Stute | |
| 8,488,247 B2 | 7/2013 | Cai | |
| 8,508,830 B1 | 8/2013 | Wang | |
| 8,552,416 B2 | 10/2013 | Kim | |
| 8,554,031 B2 | 10/2013 | Astratov | |
| 8,953,064 B1 | 2/2015 | Ng | |
| 9,151,891 B2 | 10/2015 | Ma et al. | |
| 9,170,203 B2 | 10/2015 | Bisht | |
| 9,389,424 B1 | 7/2016 | Schowengerdt | |
| 10,677,992 B2 | 6/2020 | Boriskin | |
| 10,678,127 B2 | 6/2020 | Boriskin | |
| 10,846,835 B2 | 11/2020 | Gill | |
| 2003/0036674 A1 | 2/2003 | Bouton | |
| 2004/0165269 A1 | 8/2004 | Hasman | |
| 2008/0024792 A1 | 1/2008 | Pendry | |
| 2008/0089367 A1 | 4/2008 | Srinivasan | |
| 2008/0231863 A1 | 9/2008 | Chen | |
| 2009/0068597 A1 | 3/2009 | Shiraishi | |
| 2010/0006784 A1 | 1/2010 | Mack | |
| 2010/0067842 A1 | 3/2010 | Seidman | |
| 2010/0265590 A1 | 10/2010 | Bowers | |
| 2010/0320213 A1 | 12/2010 | Kelly | |
| 2010/0320513 A1 | 12/2010 | Goarin | |
| 2011/0063717 A1 | 3/2011 | Consonni | |
| 2012/0326309 A1 | 12/2012 | Andry | |
| 2013/0308127 A1 | 11/2013 | Bisht | |
| 2013/0335677 A1 | 12/2013 | You | |
| 2014/0043611 A1 | 2/2014 | Narasimhan | |
| 2014/0111677 A1 | 4/2014 | Fukuda | |
| 2014/0333926 A1 | 11/2014 | Bond | |
| 2015/0090862 A1 * | 4/2015 | Matsui | G02B 5/1809 250/208.1 |
| 2015/0146180 A1 | 5/2015 | Lee | |
| 2015/0177619 A1 | 6/2015 | Kobrin | |
| 2015/0212242 A1 * | 7/2015 | Chen | H01L 33/58 359/315 |
| 2015/0243096 A1 | 8/2015 | Schowengerdt | |
| 2015/0248790 A1 | 9/2015 | Schowengerdt | |
| 2015/0268415 A1 | 9/2015 | Schowengerdt | |
| 2016/0084761 A1 | 3/2016 | Rothberg | |
| 2016/0147138 A1 | 5/2016 | Shih | |
| 2016/0187788 A1 | 6/2016 | Onose | |
| 2016/0223739 A1 | 8/2016 | Yoon | |
| 2016/0240419 A1 | 8/2016 | Sieber | |
| 2016/0259253 A1 | 9/2016 | Luo | |
| 2016/0265747 A1 | 9/2016 | Nagao | |
| 2016/0298875 A1 | 10/2016 | Dellea | |
| 2018/0210214 A1 | 7/2018 | Kim | |
| 2018/0354844 A1 | 12/2018 | Drazic | |
| 2019/0101700 A1 | 4/2019 | Boriskin | |
| 2019/0101769 A1 | 4/2019 | Boriskin | |
| 2019/0250315 A1 | 8/2019 | Boriskin | |
| 2020/0233223 A1 | 7/2020 | Shramkova | |

FOREIGN PATENT DOCUMENTS

| | | | |
|---|---|---|---|
| CN | 1853131 | 10/2006 | |
| CN | 101088040 | 12/2007 | |
| CN | 101419337 A | 4/2009 | |
| CN | 101819326 | 9/2010 | |
| CN | 102916343 A | 2/2013 | |
| CN | 103353675 | 10/2013 | |
| CN | 105974576 A | 9/2016 | |
| EP | 1398656 A1 | 3/2004 | |
| EP | 3223062 | 9/2017 | |
| EP | 3223063 A1 | 9/2017 | |
| JP | 2005141075 A | 6/2005 | |
| JP | 2011014857 A | 1/2011 | |
| KR | 20120111288 | 10/2012 | |
| RU | 2591282 | 7/2016 | |
| WO | 0157559 A1 | 8/2001 | |
| WO | 2003025635 A1 | 3/2003 | |
| WO | 2008069454 A1 | 6/2008 | |
| WO | 2008080117 A2 | 7/2008 | |
| WO | 2010114834 A1 | 10/2010 | |
| WO | 2010114857 A1 | 10/2010 | |
| WO | 2014182893 A1 | 11/2014 | |
| WO | WO2017007431 | 1/2017 | |
| WO | WO-2017007431 A * | 1/2017 | ............. B82Y 20/00 |
| WO | WO2017162880 | 9/2017 | |
| WO | WO2017162881 | 9/2017 | |
| WO | WO-2017162881 A1 * | 9/2017 | ............. B82Y 20/00 |
| WO | WO2017162882 | 9/2017 | |
| WO | 2018073407 A1 | 4/2018 | |
| WO | 2018073426 A1 | 4/2018 | |

OTHER PUBLICATIONS

Liu et al., "Engineering Photonic Nanojets by Core-Shell Micro-Cuboids", 2016 IEEE 16th International Conference on Nanotechnology (IEEE-NANO), Sendai, Japan, Aug. 22, 2016, pp. 113-115.
Kong et al., "Quasi one-dimensional light beam generated by a graded-index microsphere", Optics Express, vol. 17, No. 5, Mar. 2, 2009, pp. 3722-3731.
Liu, C., "Ultra-Elongated Photonic Nanojets Generated by a Graded-Index Microellipsoid", Progress in Electromagnetics Research Letters, vol. 37, Jan. 2013, pp. 153-165.
Boriskina, Svetlana, V., "Spectrally Engineered Photonic Molecules as Optical Sensors with Enhanced Sensitivity: A Proposal and Numerical Analysis" Journal of Optical Society of America, vol. 23, No. 8, Aug. 2006, pp. 1565-1573.
Liu, Cheng-Yang, et. al., "Photonic Nanojet Modulation by Elliptical Microcylinders". Optik, vol. 125, (2014), pp. 4043-4046.
Khaleque, Abdul, et. al., "Tailoring the Properties of Photonic Nanojets by Changing the Material and Geometry of the Concentrator". Progress in Electromagnetics Research, vol. 48, (2014), pp. 7-13.
Machine Translations of Patent Publication JP2011014857A, published on Jan. 20, 2011, 34 pages.
International Search Report and Written Opinion of the International Searching Authority for PCT/EP2017/076877, dated Jan. 17, 2018, 11 pages.
International Preliminary Report on Patentability for PCT/EP2017/076877 dated Apr. 23, 2019, 7 pages.
Valentine, Jason, et. al., "An Optical Cloak Made of Dielectrics". Nature Materials Letters, vol. 8, No. 7, Jul. 2009, pp. 568-571.
Dang, Cuong, et. al, "Red, Green and Blue Lasing Enabled by Single-Exciton Gain in Colloidal Quantum Dot Films". Nature Nanotechnology Letters, vol. 7., May 2012, pp. 335.

(56) References Cited

OTHER PUBLICATIONS

Cai, Wenshan, et. al., "Optical Cloaking With Metamaterials". Nature Photonics, vol. 1, No. 4, Apr. 2007, 224-227.
Stafeev, Sergey S., et. al., "Measurement of Photonic Nanojet Generated by Square-Profile Microstep". Proceedings of SPIE, vol. 9448, (2015), p. 94482C-1-5.
Alitalo, Pekka, et. al., "Electromagnetic Cloaking With Metamaterials". Materials Today, vol. 12, No. 3, Mar. 2009, pp. 22-29.
Landy, Nathan I., et. al., "Guiding Light With Conformal Transformations". Optical Society of America, Optics Express, vol. 17, No. 17, Aug. 17, 2009, pp. 14872-14879.
Monticone, Francesco, et. al., "Invisibility Exposed: Physical Bounds on Passive Cloaking". Optical Society of America, Optica, vol. 3, No. 7, Jul. 2016, pp. 718-724.
Pendry, J. B., et. al., "Controlling Electromagnetic Fields". Science, vol. 312, Jun. 23, 2006, pp. 1780-1782.
Schmied, Roman, et. al., "Conformal Carpet and Grating Cloaks". Optical Society of America, Optics Express, vol. 18, No. 23, Nov. 8, 2010, pp. 24361-24367.
Matsui, Tatsunosuke, et. al., "Finite-Difference Time-Domain Analysis of Photonic Nanojets From Liquid-Crystal-Containing Microcylinder". Japanese Journal of Applied Physics 53, 01AE04, (2014), pp. 1-4.
Mahariq, Ibrahim, et. al., "Photonic Nanojet Analysis by Spectral Element Method". IEEE Photonics Journal, vol. 6, No. 5, Oct. 2014, 15 pages.
Geints, Yurii E., et. al., "Influence of the Spatial Shape of Nonspherical Symmetric Dielectric Microparticles on Morphology of Photonic Jets". Proceedings of SPIE, vol. 9680, pp. 1-5.
Geints, Yu E., et. al., "Characteristics pf Photonic Nanojets From Ordered Microassemblies of Dielectric Spheres". Quantum Electronics, vol. 46, No. 3, (2016), pp. 236-241.
Martin, Jéeröme, et. al., "Intense Bessel-Like Beams Arising From Pyramid-Shaped Microtips". Optical Society of America, Optical Letters, vol. 37, No. 7, Apr. 1, 2012, pp. 1274-1276.
Gients, Yu, E., et al., "Modeling Spatially Localized Photonic Nanojets From Phase Diffraction Gratings". Journal of Applied Physics, 119, 153101, (2016), 6 pages.
International Search Report and Written Opinion of the International Searching Authority for PCT/EP2017/076835, dated Jan. 23, 2018, 19 pages.
International Preliminary Report on Patentability for PCT/EP2017/076835 dated Apr. 23, 2019, 10 pages.
Nishiwaki, Seiji, "Efficient Colour Splitters for High-Pixel-Density Image Sensors". Nature Photonics, vol. 7, Mar. 2013, pp. 240-246.
Hua, Hong, et. al., "A 3D Integral Imaging Optical See-Through Head-Mounted Display". Optical Society of America, Optics Express, vol. 22, No. 11, Jun. 2, 2014, pp. 13486-13491.
Heifeiz, Alexander, et. al., "Photonic Nanojets". Journal of Computational Theory Nanoscience, vol. 6, No. 9., (2009), pp. 1979-1992.
Novotny, Lukas, et. al., "Near-field Optical Microscopy and Spectroscopy with Pointed Probes". Annual Review of Physical Chemistry, vol. 57, (2006) pp. 303-331.
Grbic, Anthony, et. al., "Near-Field Plates: Subdiffraction Focusing with Patterned Surfaces". Science, vol. 320, Issue. 5875, 11 pages.
Kong, Soon-Cheol, et. al., "Photonic Nanojet-Enabled Optical Data Storage". Optical Society of America, Optics Express, vol. 16, No. 18, Sep. 1, 2008, pp. 13713-13719.
Pacheco-Peña, V., et. al., "Terajets Produced By Dielectric Cuboids". Applied Physics Letters 105, 084102, (2014), doi: 10.1063/1.4894243, 5 pages.
Pacheco-Peña, V., et. al., "Multifrequency Focusing and Wide Angular Scanning of Terajets". Optical Society of America, Optics Letters, vol. 40, No. 2, (2015), 5 pages.
Royon, Arnaud, "Nonlinear Femtosecond Near Infrared Laser Structuring in Oxide Glasses". Electronic Theses and Dissertations, (2009), 174 pages.
Sinai, P., "Correction of Optical Aberrations by Neutron Irradiation". Applied Optics, vol. 10, Issue 1, Jan. 1971, pp. 99-104.
Machine translation of RU 2591282 C1 published on Jul. 20, 2016, 5 pages.
Mukawa, Hiroshi, et. al., "A Full-Color Eyewear Display Using Planar Waveguides with Reflection Volume Holograms". Journal of the Society for Information Display (SID), vol. 17, No. 3, (2009), pp. 185-193.
Guo, Si Yue, et. al., "Fabrication of Optical Fiber Probes for Scanning Near-Field Optical Microscopy". McGill Science Undergraduate Research Journal (MSURJ) vol. 3, No. 1, Mar. 2008, pp. 32-39.
Pacheco-Pena, V., et. al., "Terajets Produced by 3D Dielectric Cuboids". Applied Physics Letters vol. 105, No. 8, (2014), pp. 1-12.
Gu, Yinghong, et. al., "Color Generation Via Subwavelength Plasmonic Nanostructures". Nanoscale, vol. 7, (2015), pp. 6409-6419.
Kotlyar, Victor, et. al., "Photonic Nanojets Generated Using Square-Profile Microsteps". Optical Society of America, Applied Optics, vol. 53, No. 24, Aug. 20, 2014, pp. 5322-5329.
International Search Report and Written Opinion of the International Searching Authority for PCT/EP2017/057130, dated Jun. 26, 2017, 11 pages.
Stafeev, S., et. al., "Near-Field Diffraction of Laser Light by Dielectric Corner Step". Proceedings of SPIE, vol. 9031, (2014), pp. 90311A-1-7.
International Preliminary Report on Patentability for PCT/EP2017/057130, dated Sep. 25, 2018, 7 pages.
Huang, Fu Min, et. al., "Nanohole Array as a Lens". Nano Letters, vol. 8, No. 8., (2008), 8 pages.
Junesch, Juliane, et. al., "Optical Properties of Nanohole Arrays in Metal—Dielectric Double Films Prepared by Mask-on-Metal Colloidal Lithography". ACS Nano, vol. 6, No. 11, (2012), pp. 10405-10415.
Liu, Cheng-Yang, "Photonic Jets Produced by Dielectric Micro Cuboids". Applied Optics, vol. 54, Issue 29, (2015), pp. 8694-8699.
Minin, Igor V., et. al., "Localized Photonic Jets from Flat, Three-Dimensional Dielectric Cuboids in the Reflection Mode". Optics Letters, vol. 40, No. 10, May 15, 2015, pp. 2329-2332.
Minin, Igor V., et. al., "Localized EM and Photonic Jets from Non-Spherical and Non-Symmetrical Dielectric Mesoscale Objects: Brief Review". Annual Physics (Berlin), vol. 527, No. 7-8, (2015), pp. 491-497.
Wikipedia, "Diffraction". Wikipedia web article retrieved from the internet on May 16, 2017, pp. 1-14.
Ghenuche, Petru, et. al., "Multi-Focus Parallel Detection of Fluorescent Molecules at Picomolar Concentration With Photonic Nanojets Arrays". Applied Physics Letters, American Institute of Physics, (2014), vol. 105, No. 13, pp. 131102-1-5.
Kress, Bernard, et. al., "A Review of Head-Mounted Displays (HMD) Technologies and Applications for Consumer Electronics". Proceedings of SPIE, vol. 8720, (2013), pp. 87200A-1-13.
Tirosh, Udi, "New Flat Lenses Technology Could Offer Smaller Lenses With Zero Chromatic Aberration". DIY Photography, Feb. 20, 2015, 8 pages.
Khorasaninejad, Mohammadreza, et. al., "Metalenses: Versatile Multifunctional Photonic Components". Planar Optics, Science, vol. 358, No. 1146, Dec. 1, 2017, pp. 1-8.
Liu, Cheng-Yang, "Ultra-High Transmission of Photonic Nanojet Induced Modes in Chains of Core-Shell Microcylinders". Physics Letters A, vol. 376, (2012), pp. 3261-3266.
Wei, Pei-Kuen, et. al., "Diffraction-Induced Near-Field Optical Images in Mesoscale Air-Dielectric Structures". Journal of Optical Society of America, vol. 20, No. 7, Jul. 2003, pp. 1503-1507.
Matsui, Takayuki, et. al., "Transmission Phase Control by Stacked Metal-Dielectric Hole Array With Two-Dimensiona Geometric Design". Optical Society of America, Optical Express, vol. 20, No. 14, Jul. 2, 2012, pp. 16092-16103.
International Search Report and Written Opinion of the International Searching Authority for PCT/EP2017/057129 dated May 30, 2017, 12 pages.
International Preliminary Report on Patentability for PCT/EP2017/057129 dated Sep. 25, 2018, 9 pages.
International Search Report and Written Opinion of the International Searching Authority for PCT/EP2017/057131 dated May 30, 2017, 12 pages.

(56) References Cited

OTHER PUBLICATIONS

International Preliminary Report on Patentability for PCT/EP2017/057131 dated Sep. 25, 2018, 9 pages.
International Preliminary Report on Patentability for PCT/EP2017/076881 dated Apr. 23, 2019, 6 pages.
International Search Report and Written Opinion of the International Searching Authority for PCT/EP2017/076881 dated Feb. 2, 2018, 10 pages.
Venugopal, Gunasekaran, et. al., "Advances in Micro/Nano Electromechanical Systems and Fabrication Technologies". Chapters, entitled "Nanolithography", Intech Press, (2013), pp. 187-205.
Xie, X.N., et. al., "Nanoscale Materials Patterning and Engineering by Atomic Force Microscopy Nanolithography". Materials Science and Engineering R54, (2006), pp. 1-48.
Nu, Wei, et. al., "A Deep Sub-Wavelength Process for the Formation of Highly Uniform Arrays of Nanoholes and Nanopillars". Nanotechnology, vol. 18, 485302, (2007), pp. 1-4.
Cheung, Chin Li, et. al., "Fabrication of Nanopillars by Nanosphere Lithography". Nanotechnology, vol. 17, No. 5, Mar. 14, 2006, pp. 1339-1343.
Xu, Chen, et. al., "Photon Nanojet Lens: Design, Fabrication and Characterization". Nanotechnology, vol. 27, Mar. 4, 2016.
Mohseni, Hooman, "Photonic Jet and its Applications in Nano-Photonics". Frontiers in Optics/Laser Science (2015), 2 pages.
Voison, Pauline, "New Generation Lithography by UV-Assisted Nanoimprint: Study and Development of Materials and Processes for Microelectronic Application". Abstract of PhD Thesis, Universete Joseph Fourier, (2007), 173 pages.
Yu, Geints, et. al., "Modeling Spatially Localized Photonic Nanojets From Phase Diffraction Gratings". Journal of Applied Physics, vol. 119, No. 15, 153101, Apr. 21, 2016, pp. 153101-1-6.
Kim, Jooyoung, et al., "Fabrication of Palsmonic Nanodiscs by Photonic Nanojet Lithography". Applied Physics Express, vol. 5, 025201, Jan. 19, 2012, pp. 025201-1-3.

Kushwaha, P.K., et al., "Controlled Shaping of Photonic Nanaojets Using Core Shell Microspheres". International Conference on Optics and Photonics, Proceedings of SPIE, vol. 9654, (2015), pp. 96541H-1-6.
Timoschenko, Igor, "Scanning Nanaojet Lithograph and Microscope". Photonics Applications in Astronomy, Communications, Industry, and High-Energy Physics Experiments, Proceedings of SPIE vol. 6937, 69373R (2007), pp. 69373R-1-5.
Liu, Cheng-Yang, et. al., "Geometric Effect on Photonic Nanojet Generated by Dielectric Microcylinders With Non-Cylindrical Cross-Sections". Optics Communications, vol. 380, (2016), pp. 287-296.
Valdivia-Valero, F. J.,et al. "Optical forces on cylinders near subwavelength slits illuminated by a photonic nanojet." Optics Communications 294 (2013): 25 pages.
Kuang, C., et al., "Creating attoliter detection vol. by microsphere photonic nanojet and fluorescence depletion." Optics Communications 285, No. 4 (2012): 402-406 (5 pages).
Zhao, T., et al., "Nanofocusing Element Based on Subwavelength Optical Microcavity" Opto-Electronic Engineering, vol. 37 No. 4, Apr. 2010, pp. 147-150 (12 pages with translation).
Neves, A. A. R., "Photonic nanojets in optical tweezers." Journal of Quantitative Spectroscopy and Radiative Transfer 162, Mar. 17, 2015, 20 pages.
Ghenuche, P., et al., "Photonic nanojet focusing for hollow-core photonic crystal fiber probes." Applied optics vol. 51, No. 36 (2012) pp. 8637-8640 (4 pages).
Geints, Y.E., et al., "Photonic jet shaping of mesoscale dielectric spherical particles: Resonant and non-resonant jet formation." Journal of Quantitative Spectroscopy and Radiative Transfer 126, Sep. 2013 pp. 44-49 (6 pages).
J. H. Schmid et al., "Refractive Index Engineering With Subwavelength Gratings in Silicon Microphotonic Waveguides," IEEE Photonics Journal, vol. 3, No. 3, Jun. 2011, pp. 597-607 (12 pages).

* cited by examiner

Rectangular
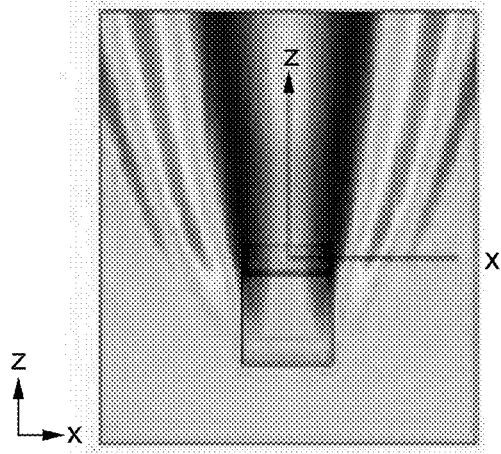
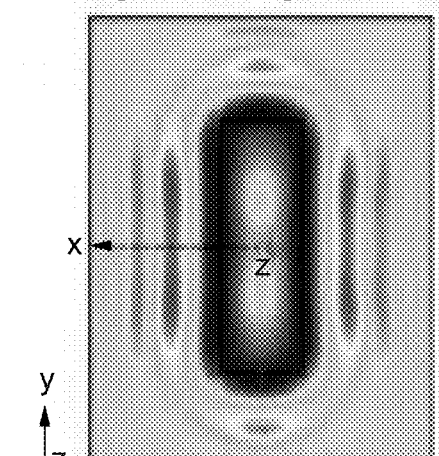
*FIG. 13(D)*

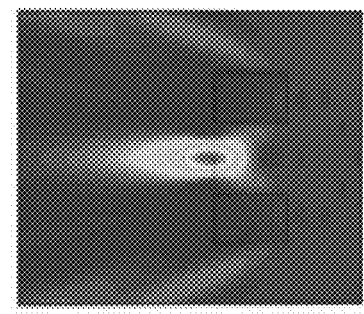
*FIG.22(C)* $\lambda_0 = 650nm$
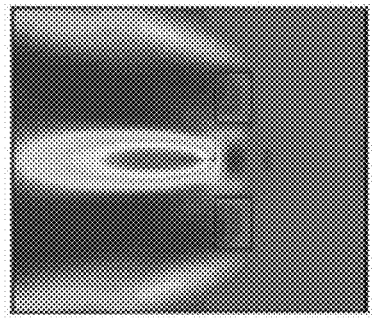
*FIG.21(C)* $\lambda_0 = 650nm$
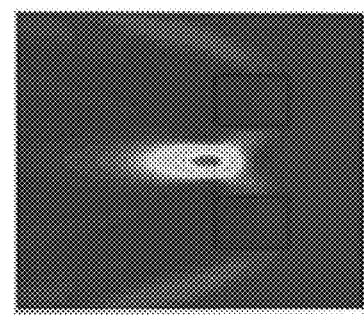
*FIG.22(B)* $\lambda_0 = 550nm$
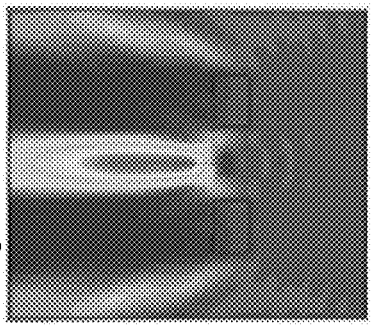
*FIG.21(B)* $\lambda_0 = 550nm$
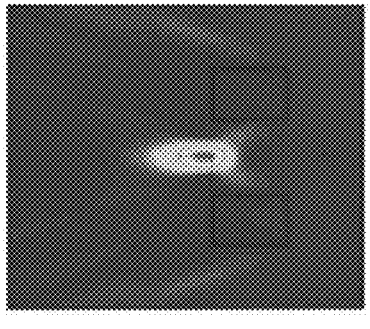
*FIG.22(A)* $\lambda_0 = 450nm$
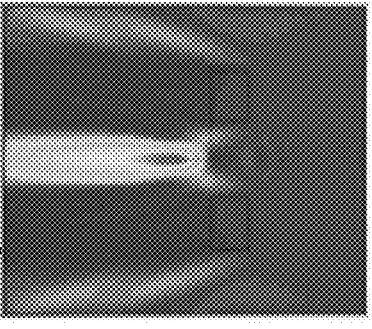
*FIG.21(A)* $\lambda_0 = 450nm$

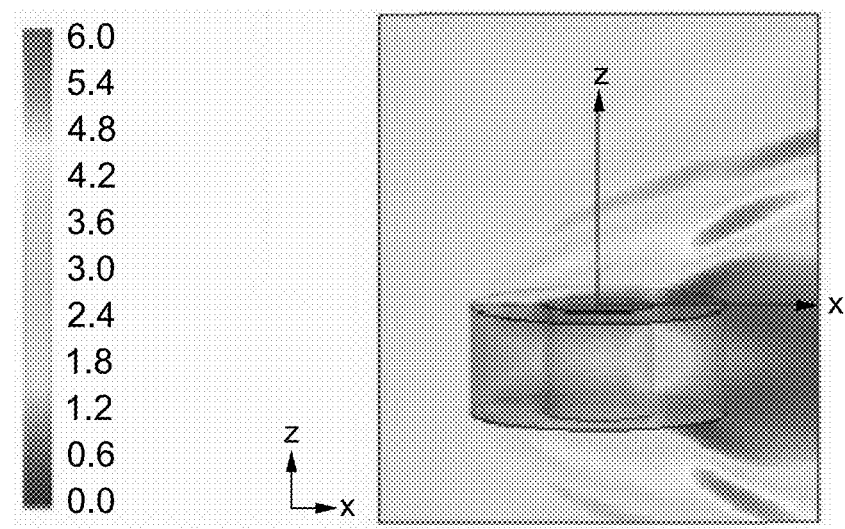
FIG. 34(C)
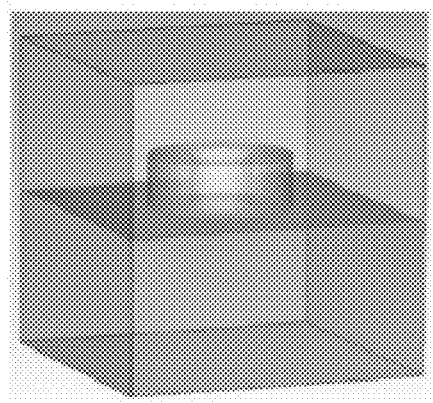
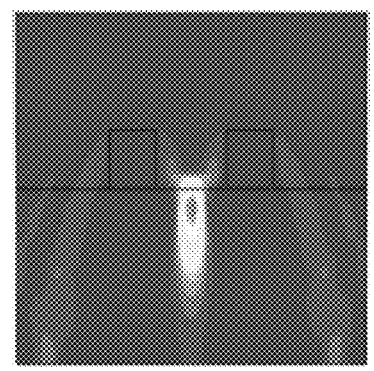
FIG. 35(A)　　　　FIG. 35(B)

$n_1=1.49$, $L_y = L_2 = 2\lambda_1$, $S=0.5\lambda_1$

METHOD FOR MANUFACTURING A DEVICE FOR FORMING AT LEAST ONE FOCUSED BEAM IN A NEAR ZONE

RELATED TO EUROPEAN APPLICATION

This application claims priority from European Application No. 17305414.9, entitled "METHOD FOR MANUFACTURING A DEVICE FOR FORMING AT LEAST ONE FOCUSED BEAM IN A NEAR ZONE", filed on Apr. 7, 2017, the contents of which are hereby incorporated by reference in its entirety.

TECHNICAL FIELD

The present disclosure relates generally to techniques for forming field intensity patterns from electromagnetic waves, among which visible light. More particularly, but not exclusively, the present disclosure relates to techniques for near-field focusing and beam forming in the near zone, that can be used in a wide range of devices (as for example data storage devices, eyewear electronic devices (such as AR (Augmented Reality) and VR (Virtual Reality) glasses), optical sensors, antennas, etc.). By near zone, it is meant here, and throughout this document, a region around a device according to the present disclosure, whose dimensions can extend from a fraction of the wavelength to about 10 wavelengths in the host medium. It may not obviously be limited to the non-radiative (reactive) zone but can also comprise the Fresnel radiative, the transition, and partly the far-field zones, depending on the size of the device.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the following, a problematic described in the context of focusing and beam forming in the near zone) is presented. However, the present technique can also be used in a wider context of the guiding of electromagnetic waves.

The focusing and collimation (i.e. beam forming) of electromagnetic waves is an established way to increase locally the magnitude of the electric field and, in such a way, to enhance efficiency of sensors, e.g. electro-optical sensors whose operational principles rely on the conversion of the energy propagating in space in the form of an electromagnetic wave into an output voltage or current. The latter sensors (for instance CMOS imaging sensors or photodiodes) are in the heart of the devices produced by Lytro, Raytrix, and Nokia as explained in document U.S. Pat. No. 8,953,064. The same phenomenon of the local field enhancement is used in a variety of other application at different wavelength ranges.

In the optical field, the today level of technologies enables fabrication of highly-integrated components (e.g. chips and optical sensors) with structural elements having nano-scale dimensions, which are close to or even smaller than the wavelength of visible light (see for example the article "*A full-color eyewear display using planar waveguides with reflection volume holograms*" by H. Mukawa et al., published in the proceedings of SID, vol. 17, no. 3, pp. 185-193, 2009, or the article "*Efficient colour splitters for high-pixel density image sensors*" by S. Nishiwaki et al., published in Nature Photonics, vol. 7, pp. 240-246, 2013, or in the document US 2014/0111677, or in the article "*A 3D integral imaging optical see-through head-mounted display*" by H. Hua and B. Javadi, published in the Opt. Express, vol. 22, 13484, 2014). The possibility of manipulating light with the same level of accuracy would become a great breakthrough compared to the state of the art.

The spatial resolution of conventional focusing devices, such as dielectric and metal-dielectric lenses, is limited by the Abbe diffraction limit and typically does not exceed one wavelength in the host media. At the same time, there are many applications which require, or can benefit from, a sub-wavelength resolution (see for example the article "*Photonic nanojets*", by A. Heifetz et al., and published in the Journal of Computational Theory Nanoscience, vol. 6, pp. 1979-1992, 2009). This explains the growing interest to the focusing components enabling the sub-wavelength resolution.

Another critical challenge associated with the today mobile and wearable technologies consists in the need for further miniaturization of such devices. The operational principles of the conventional lenses prevent reduction of their dimensions beyond a certain limit (~10 wavelengths) that constitutes a bottleneck for the future advances in the field. In particular, such a constrain may concern the packaging density of light detectors and may thus handicap further improvement of the image resolution.

Finally, the operational principles of the conventional lenses require a certain index ratio between the lens and host medium materials. The higher the index ratio, the higher the lens focusing power can be achieved. Because of this, in most cases the lenses are separated by air gaps, which require additional space and cause certain difficulties with lens fixation in space and alignment. Fully integrated system can help avoid these problems (see the previous mentioned article "*Efficient colour splitters for high-pixel density image sensors*").

However, combination of several dielectric materials with different refractive indexes is rather difficult and not always feasible because of both the technological difficulties and the limited range of the refractive index variation for the optically-transparent materials (typical index value in optical range is n<2). For example, the technique described in the article entitled "*Ultra-elongated Photonic Nanojets generated by a graded-index microellipsoid*" by C. Liu is a complex architecture when the manufacturing process has to be taken into account. Thus, alternative design concepts are needed.

Nowadays, the most popular focusing elements remain convex dielectric lenses introduced long ago (see FIG. 1 (a)). Such a lens can effectively focus light in a tight focal spot noted FS located on a certain distance noted FL from the lens surface, provided the lens has sufficient aperture size and its profile shape is properly defined with respect to the refractive indexes of the lens material and host medium. The operational principle of the refractive dielectric lenses is based on the Snell's law, which predicts the tilt (refraction) of optical rays at the air-dielectric boundary of the lens due to the different phase velocity in the two media. To enable the desired focusing function, the lens must have the aperture size of at least a few wavelengths in the host medium, with a typical physical size varying from a few microns in case of microlenses to several centimeters in case of camera objective lenses. Their resolution is limited by the Abbe diffraction limit and is typically larger than one wavelength in the host media.

There is also a class of a Fresnel-type diffractive lenses, whose operational principles rely on the interference of the waves diffracted by multiple concentric rings (see FIG. 1(b)). Compared to refractive lenses (see FIG. 1 (a)), such lenses have smaller thickness, however, they usually suffer from strong chromatic aberrations. Their resolution is limited by the diffraction limit, same as for refractive lenses.

As already mentioned above, the spatial resolution of far-field focusing systems (e.g. refractive and diffractive lenses) is limited by the Abbe diffraction limit set by $\sim\lambda/2n \sin\alpha$, where $\lambda$ is the vacuum wavelength, n is the host media refractive index, and is the half aperture angle of the lens. Thus, a higher resolution can be achieved either by increasing the lens aperture size or by reducing the focusing distance. The latter explains the growing interest to nearfield focusing systems. This interest is also strongly supported by the growing number of applications across different domains, which require near-field light processing with the highest possible resolution (see for example the previous mentioned article "Photonic nanojets").

At present, there are several near-field focusing techniques available, based on subwavelength aperture probes (see the article "Near-field optical microscopy and spectroscopy with pointed probes", by L. Novotny and S. J. Stranick, published in the Annu. Rev. Phys. Chem. Vol. 57, pp. 303-331, 2006 or the article "Fabrication of optical fiber probes for scanning near-field optical microscopy", by S. Y. Guo, J. M. LeDue, P. Grütter, and published in mSURJ, vol. 3, no. 1, 2008.), planar subwavelength-patterned structures (see the document U.S. Pat. No. 8,003,965 or the article "Near-field plates: subdiffraction focusing with patterned surfaces" by A. Grbic, L. Jiang and R. Merlin, published in Science, vol. 320, pp. 511-513, 2008), and photonic nanojet microsphere dielectric lenses (see the article "Photonic nanojet-enabled optical data storage" by S.-C. Kong et al., published in Opt. Express, Vol. 16, No. 18, 2008, or the document U.S. Pat. No. 7,394,535, (illustrated in FIG. 1(c)) or the previously mentioned article "Photonic nanojets"). The latter solution (i.e. nanojet microspheres (FIG. 1(c))) is often referred to as the most effective one because microspheres can simultaneously provide the subwavelength resolution and a high level of field intensity enhancement (also noted FIE). As shown on FIG. 1(c), they allow generating a nanojet beam NB.

Despite of the attractive performance characteristics, the use of microspheres is associated with certain difficulties related to their (i) precise positioning, (ii) integration with other optical components, and (iii) non-compatibility with the established planar fabrication techniques. These difficulties affect feasibility and increase the fabrication and assembly costs of the nanojet based devices. Potentially, the assembly problem can be solved using nanoscale patterned structures or hollow tubing (see the document U.S. Pat. No. 8,554,031), but these solutions may not be compatible with some applications.

An alternative solution for nanojet microsphere lenses was proposed based on the solid dielectric cuboids (noted SDC). As demonstrated in the article "Terajets produced by dielectric cuboids" by V. Pacheco-Pena et al., published in Applied Phys. Lett. Vol. 105, 084102, 2014 (and illustrated by FIG. 1(d)), or in the article "Multifrequency focusing and wide angular scanning of terajets" by V. Pacheco-Pena et al., published in Opt. Lett., vol. 40, no. 2, pp. 245-248, 2015, when illuminated by a plane wave, the SDC lenses can also produce condensed beams TB, similar to the nanojet beams observed for microspheres, with subwavelength dimensions, provided the size and shape of cuboids is properly adjusted with respect to the incident wavelength and the refractive index of the cuboid material. According to the previously mentioned article "Terajets produced by dielectric cuboids", the best spatial resolution ($\lambda/2$, where $\lambda$ is the wavelength in the host medium) and field intensity enhancement (factor of ~10) is achieved for SDC with dimensions of about one wavelength in the host medium and the refractive index ratio $n_2/n_1 \sim 1.5$, where $n_1$ and $n_2$ are refractive indexes of the host medium and cuboid material, respectively.

Although the rectangular shape of SDC lenses can be advantageous for some planar fabrication methods (e.g. micromachining or lithography), the fabrication of SDC lenses operating in the optical range can be difficult or even impossible because of the following constrains:

Strict requirements imposed on the cuboid size and shape;
Absence of materials with the desired refractive indexes (in the optical range, the refractive index of common optical glass and plastics, which can be used as a host medium, varies from $n_1 \approx 1.3$ up to 2.0, whereas, according to the article "Terajets produced by dielectric cuboids", the desired value of the cuboid lens refractive index should be $n_2 \sim 2.25$ (follows from the suggested ratio $n_1/n_2=1.5$ and the refractive index value of a standard glass $n_1 \approx 1.5$) that is out of range for standard optical materials;
No solution provided for setting the position of such lenses in space. This is a critical point because of the miniature size of the cuboids.

For the completeness of the discussion, it is worth mentioning one more alternative solution for the near-field enhancement available in the optical range. This solution is based on the phenomenon known as surface plasmon polaritons (noted SPP). The SPP phenomenon enables one to create subwavelength hot spots with a very high field intensity.

In particular, SPP-based components find application in color filtering and display technologies (see the article "Plasmonic structures color generation via subwavelength plasmonic nanostructures" by Y. Gu et al., and published in J. Nanoscale, vol. 7, pp. 6409-6419, 2015). However, the SPP fields are tightly coupled to the metal and decay exponentially away from the surface, which prevents the use of SPP devices for the optical systems requiring a "long-range communication" or far-field beam forming. Moreover, the SPP can only be excited under specific conditions that include:

certain material properties of the metals (i.e. negative real part of the relative permittivity that is only intrinsic to some noble metals in the visible light spectrum);
normal E-field component in the incident field; and
use of a SPP launcher (e.g. dielectric prism or grating).
These constrains are not always acceptable.

Based on the above, it can be concluded that each of the existing focusing methods and components suffers from certain limitations and thus does not fully satisfy the needs of the today and future micro and nanotechnologies. The critical limitations, intrinsic to all (or at least some) of the available focusing devices, are associated with:

physical dimensions of the components,
limited spatial resolution,
limited choice of dielectric materials (limited refractive index variation range),
fabrication/integration difficulties, certain limitations in the performance characteristics of the devices (e.g. chromatic aberrations and/or polarization sensitive response) linked to the operational principles of these devices.

Hence, it would hence be desirable to provide a technique enabling control over the field intensity distribution in the near zone, and notably for focusing electromagnetic waves and beam forming in the near zone, which would not suffer from at least some of these drawbacks.

Moreover, a manufacturing process of this alternative technique should take into account the constraints of the facilities in plant, and be a good trade-off between the performances achieved by an alternative technique and the complexity of the manufacturing process of a device related to the alternative technique.

SUMMARY OF THE DISCLOSURE

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure is directed to a method for manufacturing a device for forming at least one focused beam in a near zone, from an electromagnetic wave incident on said device. The method is remarkable in that it comprises:
 depositing a dielectric material layer with a first refractive index on a substrate layer;
 creating at least one cavity by a microfabrication technique in said dielectric material layer, said device for forming at least one focused beam in a near zone comprising said substrate layer and said dielectric material layer;
 filling said at least one cavity with a material having a second refractive index lower than said first refractive index;
 determining a deviation between a measured focused beam radiation angle obtained from said device for forming at least one focused beam in a near zone and an expected focused beam radiation angle;
 modifying locally at least one of the two refractive indexes according to said deviation.

In a preferred embodiment, the method for manufacturing is remarkable in that when said deviation is positive, then said modifying comprises doping locally the dielectric material having said first refractive index value.

Hence, when the measured focused beam radiation angle obtained from said device for forming at least one focused beam in a near zone is greater than an expected focused beam radiation angle, then the modification of indexes consists in doping locally the dielectric material having the first refractive index value.

In a preferred embodiment, the method for manufacturing is remarkable in that when said deviation is negative, then said modifying comprises doping locally the material having said second refractive index value.

Hence, when the measured focused beam radiation angle obtained from said device for forming at least one focused beam in a near zone is smaller than an expected focused beam radiation angle, then the modification of indexes consists in doping locally the material having the second refractive index value.

In a preferred embodiment, the method for manufacturing is remarkable in that said modifying locally comprises using at least one technique belonging to a group comprising:
 neutron irradiation;
 chemical vapour deposition;
 partial polymerization.

In a preferred embodiment, the method for manufacturing is remarkable in that said microfabrication technique belongs to a group comprising:
 optical lithography;
 e-beam lithography.

In a preferred embodiment, the method for manufacturing is remarkable in that it comprises depositing a superstrate layer on said dielectric material layer.

In a preferred embodiment, the method for manufacturing is remarkable in that said at least one cavity is a through-hole in said dielectric material layer.

In a preferred embodiment, the method for manufacturing is remarkable in that said at least one cavity surrounds an element within said dielectric material layer.

In a preferred embodiment, the method for manufacturing is remarkable in that said at least one cavity is targeted to be cylindrical or cone-shaped.

In a preferred embodiment, it is proposed a device for forming at least one focused beam in a near zone, wherein said device is obtained from a method for manufacturing as mentioned previously.

BRIEF DESCRIPTION OF THE DRAWINGS

The above and other aspects of the invention will become more apparent by the following detailed description of exemplary embodiments thereof with reference to the attached drawings in which:

FIGS. 21(a), (b), and (c) present different normalized power density distributions in the xz-plane for the ring-type nanojet lens with dimensions $R_1=370$ nm, $L_z=370$ nm, $W=500$ nm, refraction indexes ($n_1=1$, $n_2=1.49$), and variable ring width illuminated by a unit-amplitude plane wave: (a) $\lambda_0=450$ nm, (b) $\lambda_0=550$ nm, (c) $\lambda_0=650$ nm;

FIGS. 22(a), (b), and (c) present, for the same wavelength of FIG. 21, different normalized power density distributions in the xz-plane for the ring-type nanojet lens with dimensions $R_1=370$ nm, $L_z=740$ nm, $W=500$ nm and refraction indexes ($n_1=1$, $n_2=1.49$) illuminated by a unit-amplitude plane wave: (a) $\lambda_0=450$ nm, (b) $\lambda_0=550$ nm, (c) $\lambda_0=650$ nm;

FIG. 35(a) present a CAD model of a hollow ring-type NJ element having a form of a double-layer circular cylinder ($R_1$=300 nm, $R_2$=700 nm, H=500 nm) created in glass plate (n1=1.5 nm) placed on top of a photoresist layer (n2=1.7);

FIG. 35(b) presents a normalized field intensity in YZ-plane when illuminated by a plane wave ($\lambda_0$=365 nm) from above.

DETAILED DESCRIPTION

In one embodiment of the disclosure, in order to overcome the limitations mentioned in the background section, a technique for the near-field focusing and beam forming based on the use of a hollow structure is proposed.

Indeed, the inventors of the present disclosure have reached the conclusion that diffraction of a plane electromagnetic wave on a dielectric object having an abrupt change level of its surface, also called a step, can result in the formation of condensed optical beams (so-called nanojets), that occur in a vicinity to the step, and are oriented towards the medium with higher refractive index value. The number of beams and shape of each individual beam can be controlled by the variation of the step size and shape of the step edge line, whereas the beam radiation angle and the field intensity enhancement in each individual beam can be controlled by the variation of the refraction index ratio at the boundary of the object in the vicinity of the step and the step base angle.

Unlike the well-known diffracted beams predicted by the Fresnel theory, the nanojet beams are low-dispersive (they show no or small wavelength dependence). Moreover, the nanojet focusing component (or device) according to the present disclosure can produce multiple independent beams (having identical or non-identical shape), which is not possible with Fresnel diffractive lenses. These unique features make the nanojet-based focusing component (or device) according to the present disclosure attractive for many today and future applications.

FIGS. 2 to 11 allow understanding the physical phenomena explaining the formation of nanojet beams according to the present disclosure.

Figure 2A:
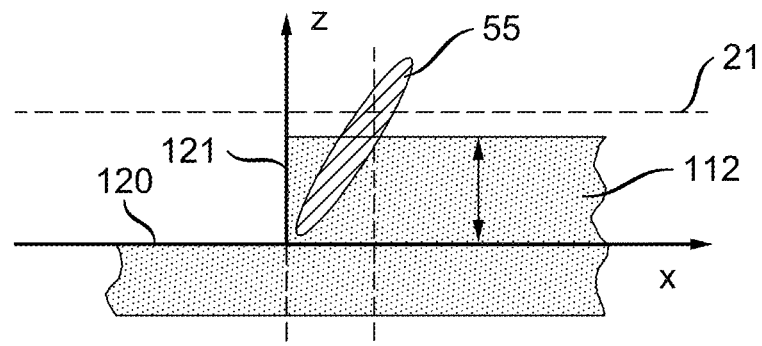
FIGS. 2(a), (b), and (c) is a schematic drawing of a nanojet beam(s) produced by a dielectric layer with a step, with FIG. 2(a) a side view and FIGS. 2(b) and 2(c) top views according to two alternate embodiments.
Figure 2B:
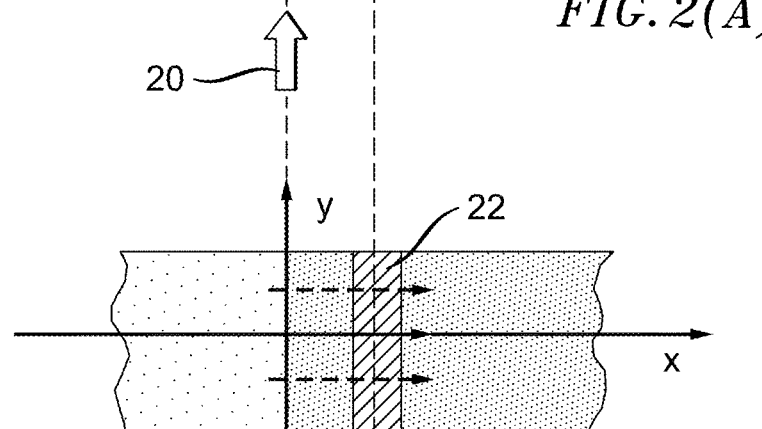
Figure 2C:
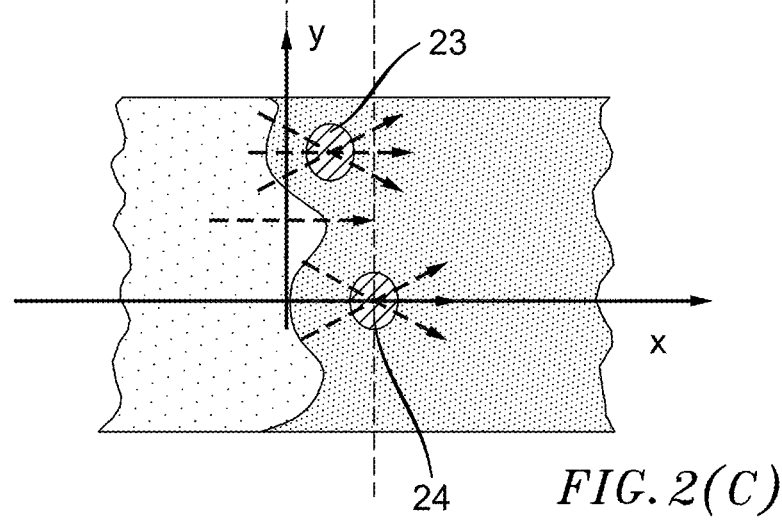

FIG. 2 illustrates a technique, where an abrupt change occurs in the level of the surface of a dielectric layer 112, thus forming a step in the layer. FIG. 2(a) shows a side view of the dielectric layer 112. FIGS. 2(b) and 2(c) respectively show top views in case of a step with a straight (FIG. 2(b)) and curved (FIG. 2(c)) edge lines.

As shown in FIG. 2(a), the device is illuminated by a plane wave 20, incident on the device from below along z-axis with a propagation vector being orthogonal to the base surface of the dielectric layer 112. As schematically shown by the dashed arrows in FIGS. 2(b) and 2(c), a nanojet beam 55 originates from the base edge of the step, which comprises a horizontal part 120 and a lateral part 121 (which may also be tilted with respect to the z-axis forming an arbitrary base angle).

Spots referenced 22 to 24 indicate the corresponding hot spots in the near-field distribution formed in the imaging plane 21. The specific field distribution with two hot spots 23, 24 observed in FIG. 2(c) is associated with the shape of the step edge line having two concave segments responsible for the formation of the two independent nanojet beams.

It should be noted that the boundary curvature of the cavity is a tool for changing the nanojet beam shape, position and field intensity enhancement level.

Figure 3A:
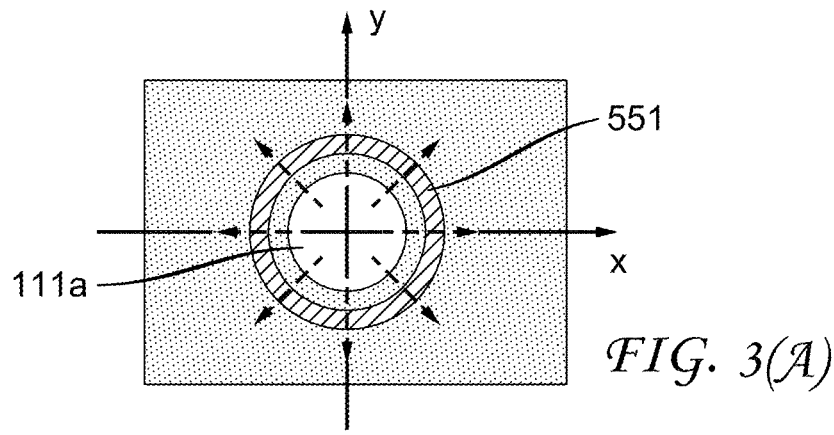
FIGS. 3(a), (b), and (c) are schematic drawings of the field intensity distribution in the imaging plane for three exemplary cylindrical cavities with different cross-sections illuminated by a plane wave propagating along z-axis, i.e. from the plane of the figure.

FIG. 3, which presents a schematic drawing of the field intensity distribution in the imaging plane 21 for three exemplary cylindrical cavities with different cross-sections. More precisely, FIG. 3(a) shows a cavity 111a with a circular cross-section: the dashed arrows schematically show that nanojet beams originate from the base edge of this cavity 111a. The ring 551 indicates the hot spot in the near-field distribution formed due to the nanojet beams associated with different segments of the circular base edge line.

Figure 3B:
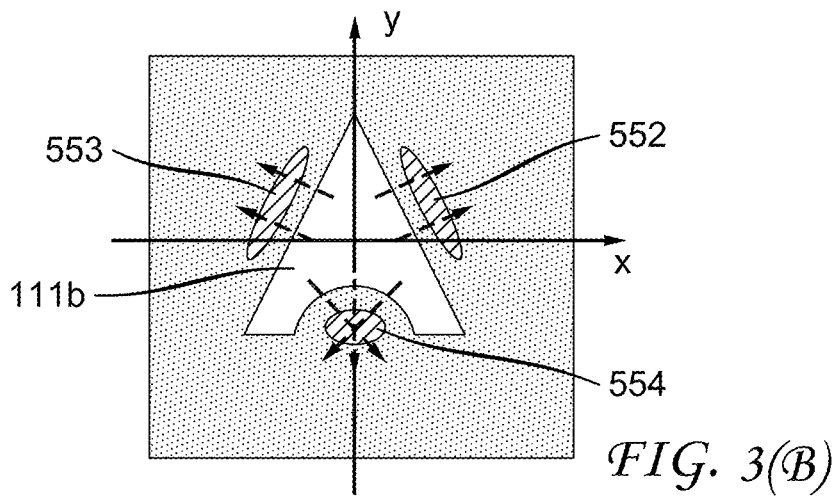

FIG. 3(b) shows a non-symmetric cavity 111b, whose cross-section in xy-plane is somehow triangular, but with one of the three edges of the triangle which is concave. Such a circa triangular cavity 111b creates three spots 552, 553 and 554, one of which (554) is enhanced, thanks to the concave face.

Figure 3C:
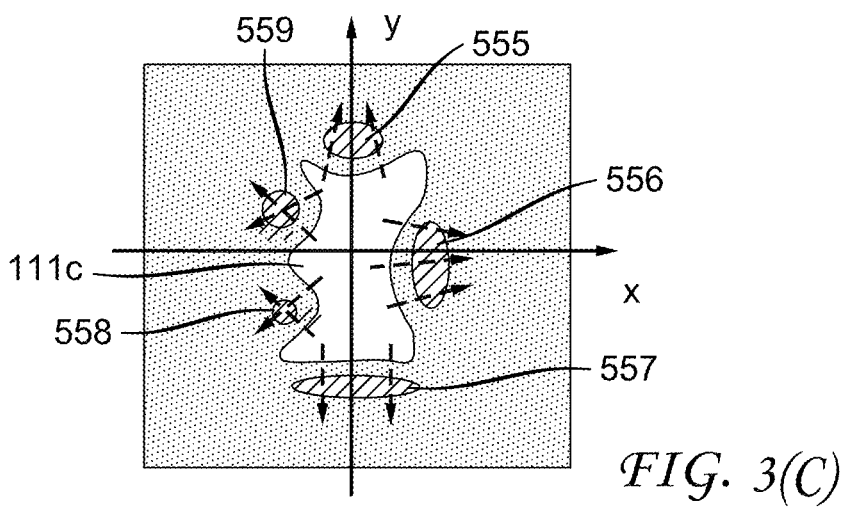

FIG. 3(c) shows a cavity, which is arbitrary-shaped with five straight or concave segments. Spots 555 to 559 indicate the hot spots in the near-field distribution formed due to the nanojet beams originating from the base edge of the step, as schematically shown by the dashed arrows. The specific field distribution with five hot spots observed in FIG. 3(c) is linked to the specific shape of the edge line having five straight or concave segments responsible for the formation of five independent nanojet beams.

Figure 4:
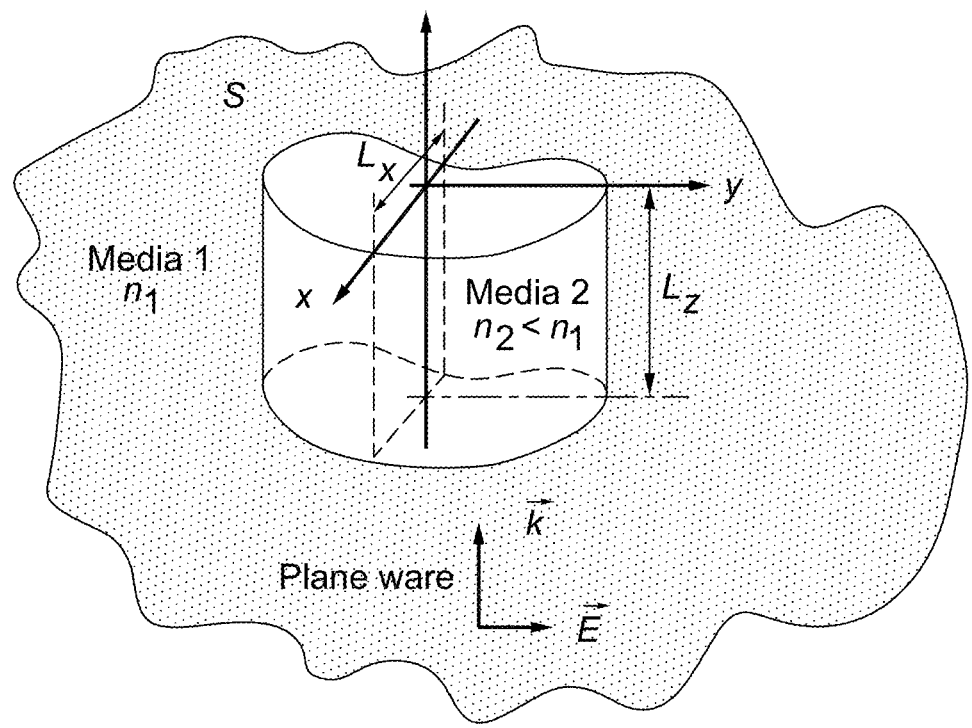
FIG. 4 illustrates the topology and notations of a cavity formed in a layer of dielectric material according to an embodiment of the present disclosure.
Figure 5A:
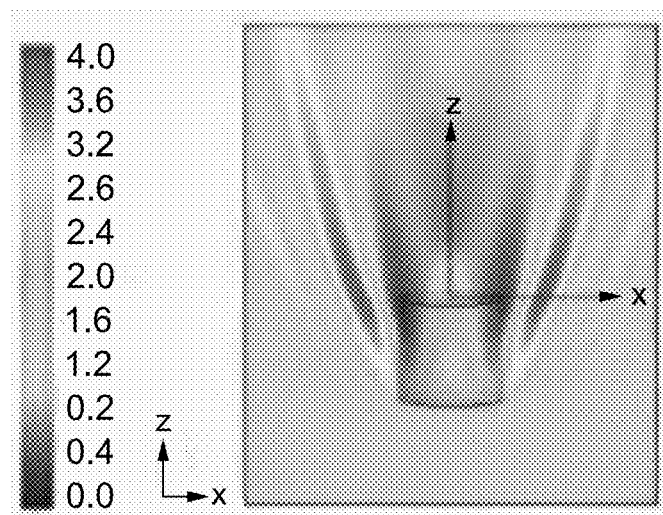
FIGS. 5 (a). (b), (c), (d), and (e) illustrate the formation of a nanojet beam by the hollow cylindrical cavity of FIG. 4, having a circular cross-section, when illuminated by a plane wave at different wavelengths ($n_1$=1.49, $n_2$=1)
Figure 5B:
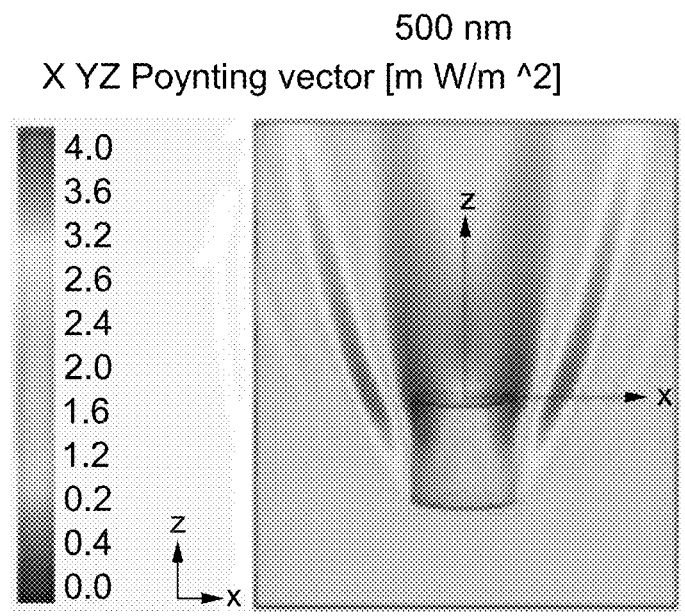
Figure 5C:
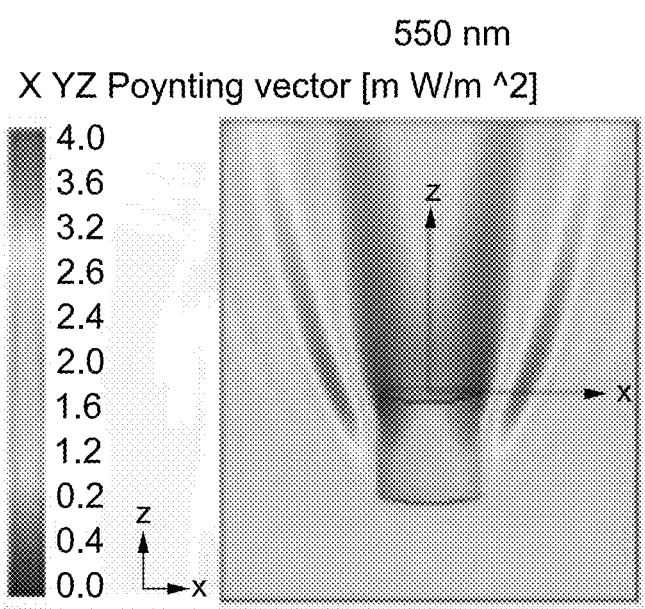
Figure 5D:
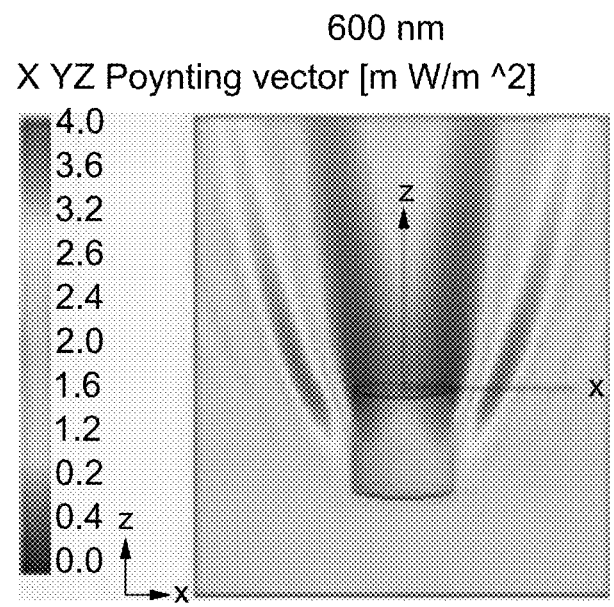
Figure 5E:
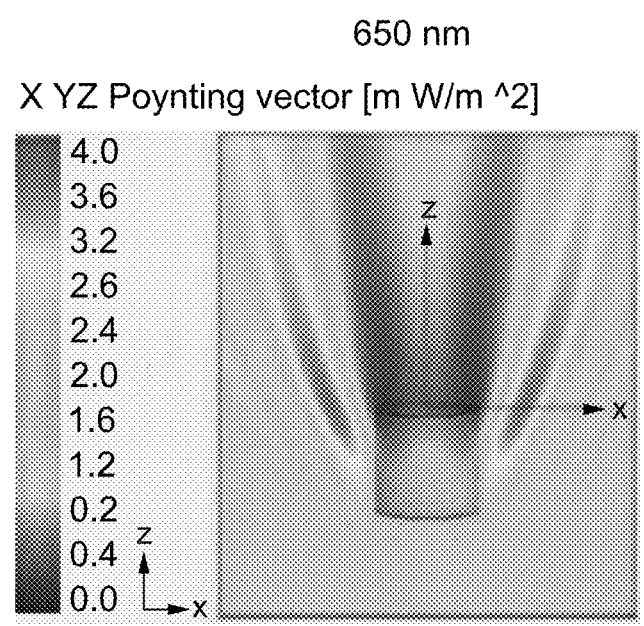

FIG. 4 illustrates an embodiment of the present disclosure, according to which the step formed at the surface of a layer of dielectric material is in fact the edge of a cavity made in the layer of dielectric material 112. The present disclosure is of course not limited to such an embodiment, and any abrupt change of level at the surface of the dielectric material is sufficient for generating the physical phenomenon, which will be described hereafter. Such a step can indeed be considered as the edge of a cavity of infinite size.

It must be understood that, in case of a cavity, the focusing function is to be associated not with the entire structure, but with an elementary segment of the step discontinuity. The other segments of the step discontinuity will contribute to the formation of other nanojet beams that may form all together (i) a wide uniform "blade like" nanojet beam as in case of an infinite step (FIG. 2(b)), or (ii) a ring in case of an arbitrary-large circular cylindrical cavity (FIG. 3(a)), or (iii) an arbitrary number of localized beams of different shapes produced by a curvilinear edge of an arbitrary-shaped cavity (FIGS. 3b and 3c).

For sake of simplicity, we therefore focus hereafter on the example of a cavity formed in the layer of dielectric material 112, like the one illustrated in FIG. 4.

As may be observed, such a cavity is cylindrical, with a cross-section of arbitrary shape. By cylindrical cavity, it is meant here, and throughout this document, a cavity which shape is a cylinder, i.e. a surface created by projecting a closed two-dimensional curve along an axis intersecting the plane of the curve. In other words, such a cylinder is not limited to a right circular cylinder but covers any type of cylinder, notably, but not exclusively, a cuboid or a prism for example.

The cavity may also have the form of a cone. Its main axis may be orthogonal to the surface of the bottom of the cavity, or be tilted. Due to the fabrication tolerance, the cavities may also have imperfect shapes, and it must be understood, for example, that cavities targeted to be shaped as cylinders, may become cone-shaped cavities with S-shape cross-sections during the manufacturing process.

More generally, such cavities are formed as cylinders or cones with an arbitrary cross-section, which can be adapted (optimized) in order to produce a desired near-field pattern, i.e. a desired field intensity distribution in the xy-plane (typically orthogonal to the incident wave propagation direction). This pattern may have one or multiple hot spots with identical (or different) field intensity level.

Non-symmetric cavities are also possible. For example, a cavity which cross-section in the xy-plane is triangular will create three spots. One of them can be enhanced if the corresponding face is concave, as will be explained in greater detail in relation to the figures.

FIG. 4 gives some notations, which will be used hereafter in the document. As may be observed, the cavity is immersed in a host medium Media 1 noted 112 of refractive index $n_1$, and is filled with a material (air, gas, dielectric, polymer material . . . ) Media 2 of refractive index $n_2$, such that $n_2 < n_1$.

For example, the cavity can have a form of a circular cylinder filled in with vacuum ($n_2=1$) and embedded in a homogeneous non-dispersive dielectric medium with an example refractive index $n_1=1.49$ and illuminated by a linearly-polarized unit-amplitude plane wave $E_y=1$ (V/m) propagating in the positive z-axis direction (see FIG. 4 for notations).

FIG. 5 illustrates the formation of a nanojet beam by such a cavity when illuminated by this plane wave. More precisely, FIGS. 5(a) to 5(e) each correspond to a different wavelength of the incident electromagnetic wave, namely $\lambda_0=450$, 500, 550, 600 and 650 nm, and show near-field maps in the XZ-plane plotted in terms of the power density characterized by the time average Poynting vector defined as:

$$P = E_m^2/2\eta \approx 1.3 n E_m^2 \left[\frac{mW}{m^2}\right],\quad \text{(equation 1)}$$

where $E_m$ is the amplitude of the E-field, $\eta$ is the wave impedance in a host medium and n is the host medium refractive index. Note that according to equation (1), the power density value associated with a unit-amplitude plane wave propagating in a dielectric host medium with a refractive index n is equal $$P_0 \approx 1.3n \left[\frac{mW}{m^2}\right].$$

Hereafter, this value is considered as a reference for the definition of the relative field intensity enhancement (FIE) achieved using different types of nanojet lenses embedded in the corresponding host media:

$$FIE = P/P_0 [a.u.] \quad \text{(equation 2)}$$

where P is the simulated power density characterized by the time average Poynting vector and $P_0$ is the reference power density of the unit-amplitude plane wave propagating in the same host medium.

Figure 6:
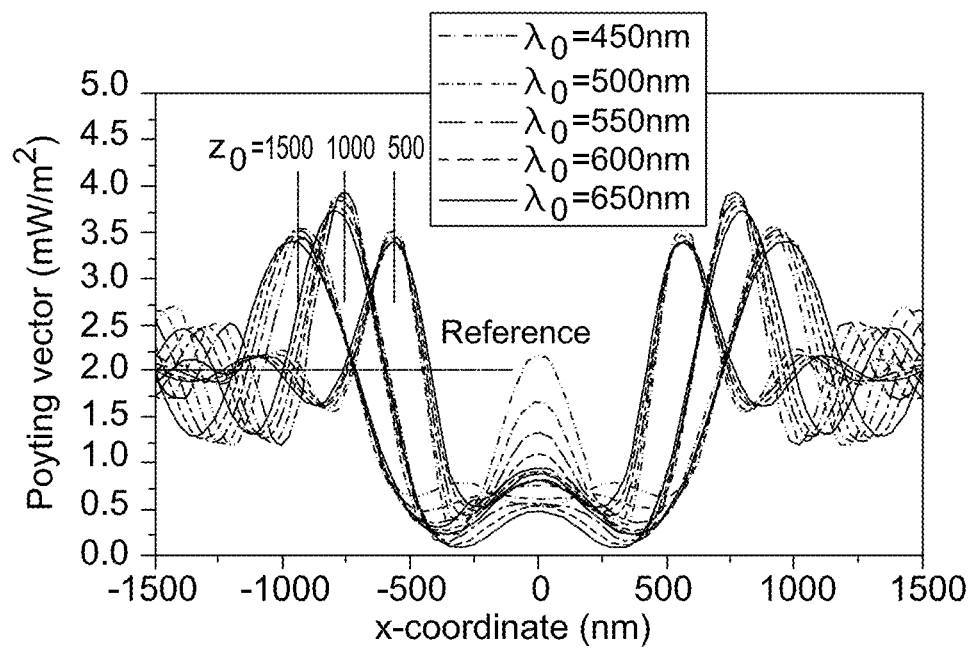
FIGS. 6 and 7 provide an analysis of the nanojet beam radiation angle of FIGS. 5(a) to 5(e)
Figure 7:
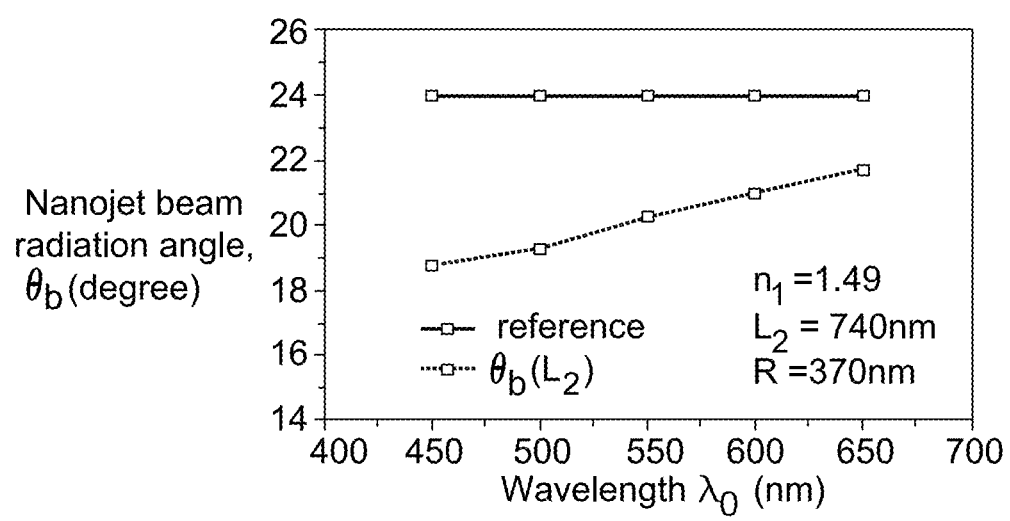

As may be observed in FIG. 5, the shape of the nanojet beam and its direction remain stable in a wide wavelength range. The detailed analysis of the nanojet beam radiation angle is reported in FIGS. 6 and 7. FIG. 6 illustrates the Poynting vector in the XZ-plane at three different planes defined as $z=z_0-L_z$, for the five different wavelengths of FIG. 5. FIG. 7 illustrates the nanojet beam radiation angle calculated based on the positions of maxima in FIG. 6 as a function of wavelength.

These data extracted from near-field maps reveal that the variation of the nanojet beam radiation angle does not exceed 3° for the wavelength range from at least 450 to 750 nm. As it is seen in FIG. 6, the major contribution to the angle variation comes from the beam tilt above the cylinder ($z_0=1500$ nm, where $z_0$ is a relative position of the imaging plane defined with respect to the cavity bottom, i.e. $z_0=z-L_z$), whereas the beam shape (at $z_0=500$ nm) remains stable for the entire wavelength range. Such a behavior is not typical for Fresnel-type diffractive lenses and thus requires detailed explanations.

The origins of the nanojet beams can be explained by the combination of three electromagnetic phenomena, which occur in the vicinity of the base edge of the hollow cavity (or more generally in the vicinity of the abrupt change of level in the surface of the dielectric material), namely:
  diffraction from the index-step discontinuity associated with the base 120 of the cavity (or, more generally with the surface of lower level of a step formed in the host medium), refraction of the diffracted wave at the vertical edge 121 of the cavity (or more generally on the lateral surface of the step), and interference of the refracted wave and the incident plane wave outside the cavity (or more generally in the host medium).

A schematic drawing illustrating these three phenomena is given in FIG. 8. As in FIGS. 5, 6 and 7, we assume that host media is an optically-transparent non-dispersive dielectric material with a refractive index $n_1=1.49$ (e.g. plastic or glass) and the cavity is filled with vacuum or air, $n_2=1$. The incident plane wave arrives from below in the diagram.

Figure 8A:
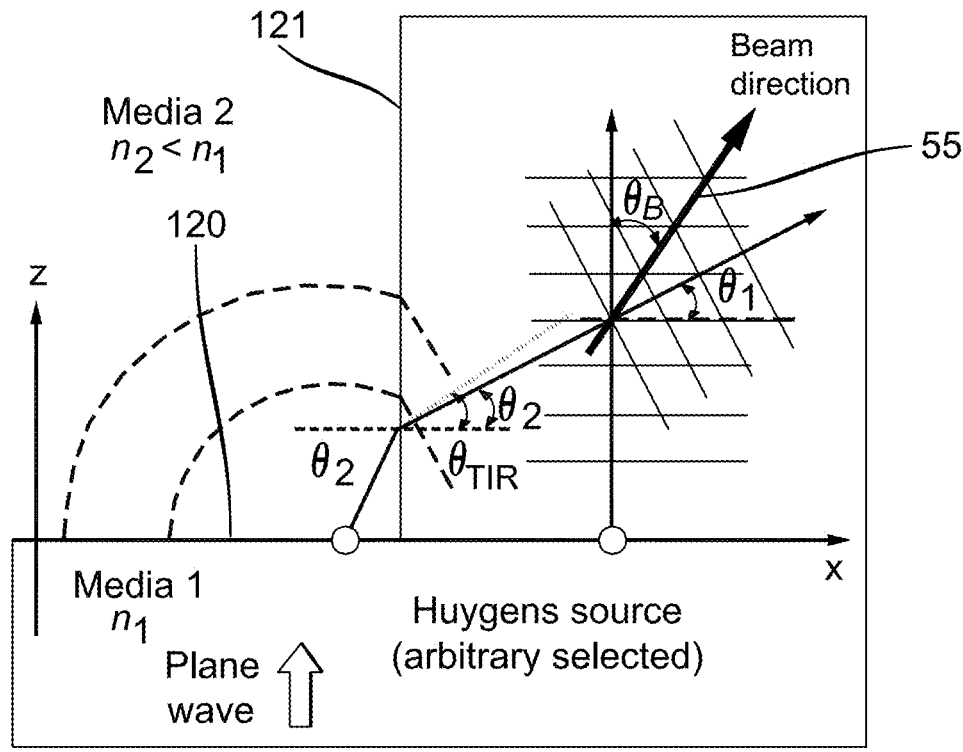
FIGS. 8(a) and 8(b) illustrate the complex electromagnetic phenomenon underlying at least some embodiments of the present disclosure.
Figure 8B:
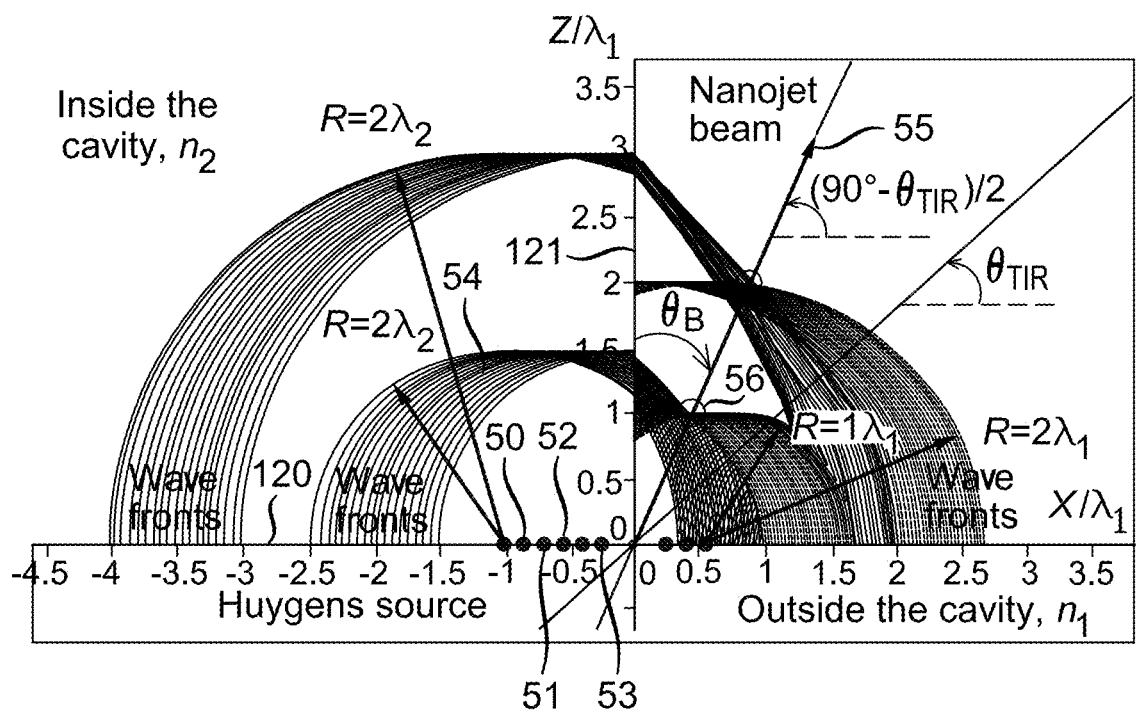

The key elements of the complex electromagnetic phenomena illustrated in FIGS. 8(a) and 8(b) are the following:

The incident plane wave induces currents at the dielectric-air boundary 120 associated with the cavity base (or more generally when reaching the step of index in the host medium induced by the abrupt change of level in its surface);

These induced currents are considered as Huygens secondary sources 50 to 53;

In line with the diffraction theory, the spherical waves 54 radiated by the Huygens sources cause some power leakage towards the 'shadow region', i.e. beyond the lateral boundary 121 of the cavity;

While crossing the lateral (vertical) boundary, the waves radiated by the Huygens sources experience refraction that causes a tilt of the refracted wave on a certain angle in accordance with the Snell-Descartes's law.

In FIG. 8(b), we can notice that outside the cavity the wave fronts coincide for different Huygens source positions along the cavity base line, thus creating a local field enhancement. The planar shape of these fronts evidences for the creation of a directive beam propagating out of the cavity.

Finally, outside the cavity the refracted wave is constructively interfering 56, 57 with the plane wave incident from below giving rise to the nanojet beam 55.

The nanojet beam creation is hence explained by phenomena that are non-dispersive in nature, namely (i) edge diffraction, (ii) refraction of the wave at the interface of two dielectric media, and (iii) interference. This explains why the shape of the beam and its radiation angle remain stable versus wavelength, as may be observed in FIGS. 5(a) to 5(e).

Moreover, the nanojet beam radiation angle is defined by the Snell's law and, thus, is only a function of two parameters:

ratio between the refraction indexes of the host media and cavity materials, and the base angle of the cavity. For sake of simplicity, in the foregoing, we only consider a cavity with the base angle equal 90° thus having a cylindrical shape with vertical edges.

Last, the nanojet beam-forming phenomenon is associated with the edge (not a full aperture) of the cavity and occurs in the 2-D vertical plane orthogonal to the cavity cross-section (see FIG. 4 for notations).

As follows from FIG. 8(b), the main contribution to the formation of the planar wave front of the refracted wave outside the cavity comes from the Huygens sources 50-53 located close to the lateral edge 121 of the cavity. Because of this, the refraction angle of the wave radiated outward the cavity is close to the critical angle for the wave incident on the same boundary from outside (FIG. 8(a)):

$$\theta_1 \approx \theta_{TIR} \quad \text{(equation 3)}$$

where $\theta_{TIR}=\sin^{-1}(n_2/n_1)$ is the critical angle for a diopter with indices $n_1$ and $n_2$.

The nanojet beam 55 is finally created as a result of the interference between the refracted wave and the plane wave incident from below. Thus, the angle of radiation of the nanojet beam ($\theta_B$) is defined by a vector sum of the two waves as schematically shown in FIG. 8(a). These considerations lead one to the following approximate formula for the radiation angle of the nanojet beam:

$$\theta_B \approx \left(\frac{\pi}{2} - \theta_{TIR}\right)/2 \quad \text{(equation 4)}$$

According to equation (4), in the case of a host medium with index $n_1=1.49$ ($\theta_{TIR}=41.8°$), the nanojet beam radiation angle should be $\theta_B \sim 24°$ that is slightly larger than observed in the full-wave simulations (see FIG. 5). This difference is explained by the assumptions made in the qualitative analysis. First, this analysis does not take into account the difference in the amplitude of the diffracted/refracted wave and the incident plane waves. Second, it does not take into account the rays launched by the Huygens sources located close to the cavity edge from outside that experience the total internal reflection on the cavity lateral edge. Being totally reflected, these rays also contribute to the formation of nanojet beam. Note that these two effects are related to the total internal reflection phenomenon and thus cannot be accurately characterized using Snell/Fresnel model. Nevertheless, these both effects (i) depend on the ratio of refraction indexes of the two media and (ii) result in reducing the nanojet radiation angle. Thus, the actual nanojet radiation angle can be smaller than that predicted by equation (4).

FIGS. 8(a) to 8(c) illustrate near-field maps of the nanojet beam produced by cylindrical cavities ($n_1=1.49$, $n_2=1$, R=370 nm) of different heights ((a) H=$L_z$=370 nm, (b) H=$L_z$=740 nm, (c) H=$L_z$=1110 nm) when illuminated by a unit-amplitude plane wave from below. As may be observed, the nanojet phenomenon is well pronounced for the cavity size varying from about one to a few wavelengths in the host medium, namely $\frac{1}{2}\lambda_1 < L_z < 3\lambda_1$.

The minimum height is needed to form the planar wave front 60 illustrated in FIG. 8(b) that gives rise to the nanojet beam. However, the height of the cavity (or the height of the step) should not be too large as compared to the length of the nanojet beam, in order for it to be useful outside the focusing component or device.

Figure 9A:
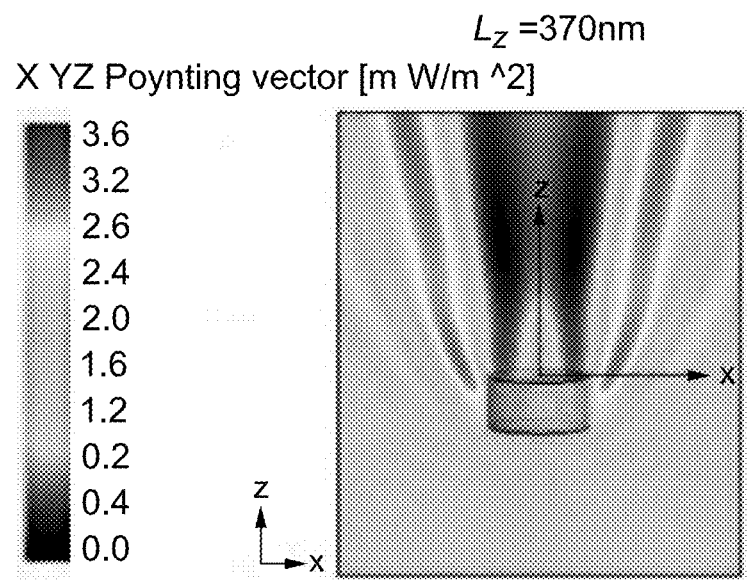
FIGS. 9 (a), (b), and (c) illustrate near-field maps of the nanojet beam produced by hollow cylindrical cavities of different heights when illuminated by a unit-amplitude plane wave from below according to embodiments of the present disclosure ($n_1$=1.49, $n_2$=1)
Figure 9B:
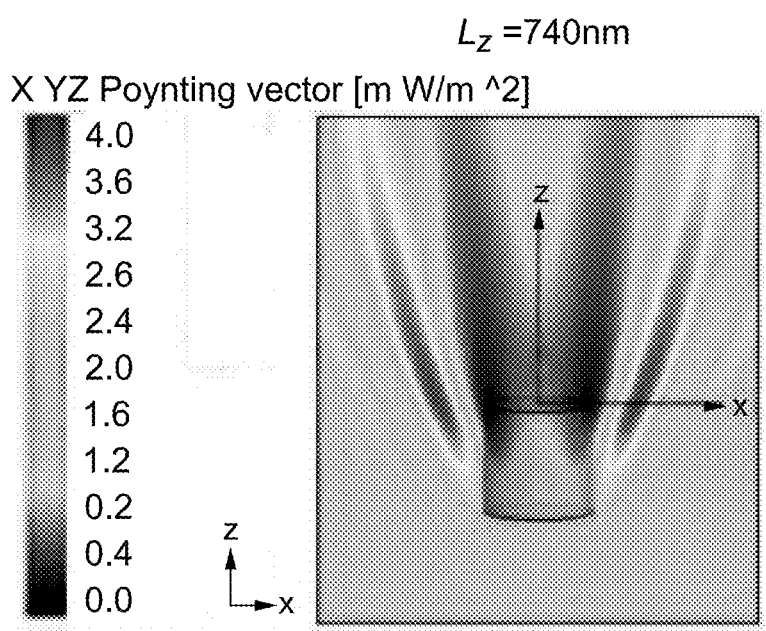
Figure 9C:
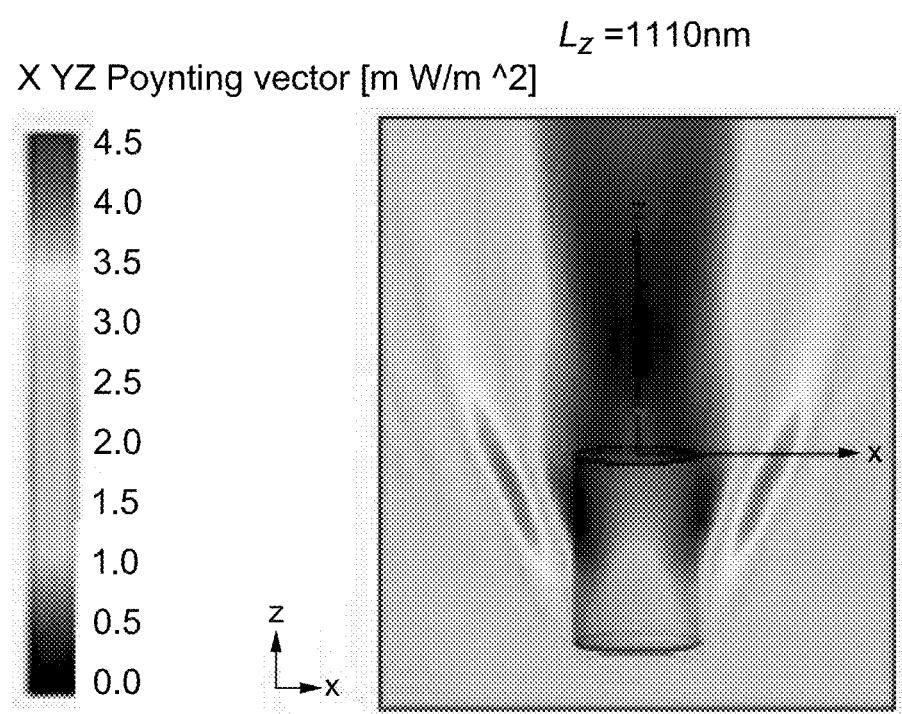

As shown on FIGS. 9(a) to 9(c), the length of the nanojet beam can vary from a few to several wavelengths in the host medium depending on the cavity shape and size.

Based on the 2-D ray-tracing analysis of FIG. 8(b), the main contribution in the formation of the nanojet beam comes from the feeds located close to the cavity lateral surface (or to the lateral part of the step). The corresponding 'effective aperture' responsible for the formation of the nanojet beam is estimated as about one half of the wavelength in the medium inside the cavity ($\frac{1}{2}\lambda_2$) that is to be counted from the lateral edge inward the cavity. For the cavity having arbitrary shape, this aperture is to be defined along the line orthogonal to the cavity edge line, S in a plane orthogonal to the incident wave propagation direction (see FIG. 4).

In 2-D case (which may correspond to any vertical cross-section, e.g. in xz-plane), the local field intensity enhancement (FIE) achieved thanks to the nanojet beam formation is about a factor of 2 compared to the incident plane wave (see formula (2) for the definition). A larger FIE can be achieved by modifying the shape of the cavity cross-section and, in particular, the shape of the cavity edge line 5, as will be explained hereafter in greater details.

The nanojet beam width at half power (BWHP) can vary from about $\frac{1}{2}\lambda_1$ (that is order of the diffraction limit) to several wavelengths and more depending on the shape of the cavity.

Figure 10A:
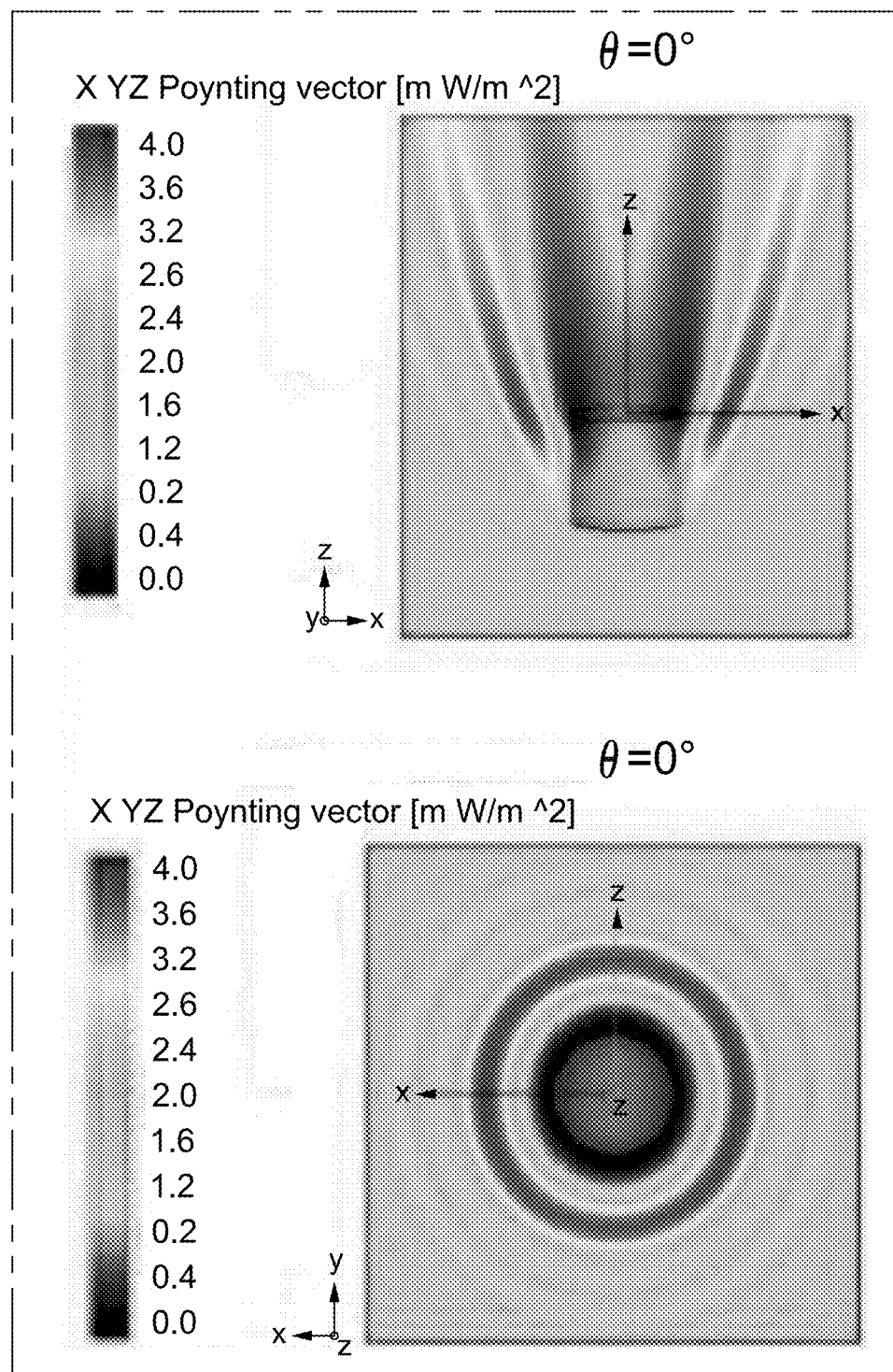
FIGS. 10(a), (b), (c), and (d) show nanojet beams produced by a hollow cylindrical cavity under different angles of incidence of the unit-amplitude $E_y$ plane wave in XZ-plane ($n_1=1.49$, $n_2=1$)
Figure 10B:
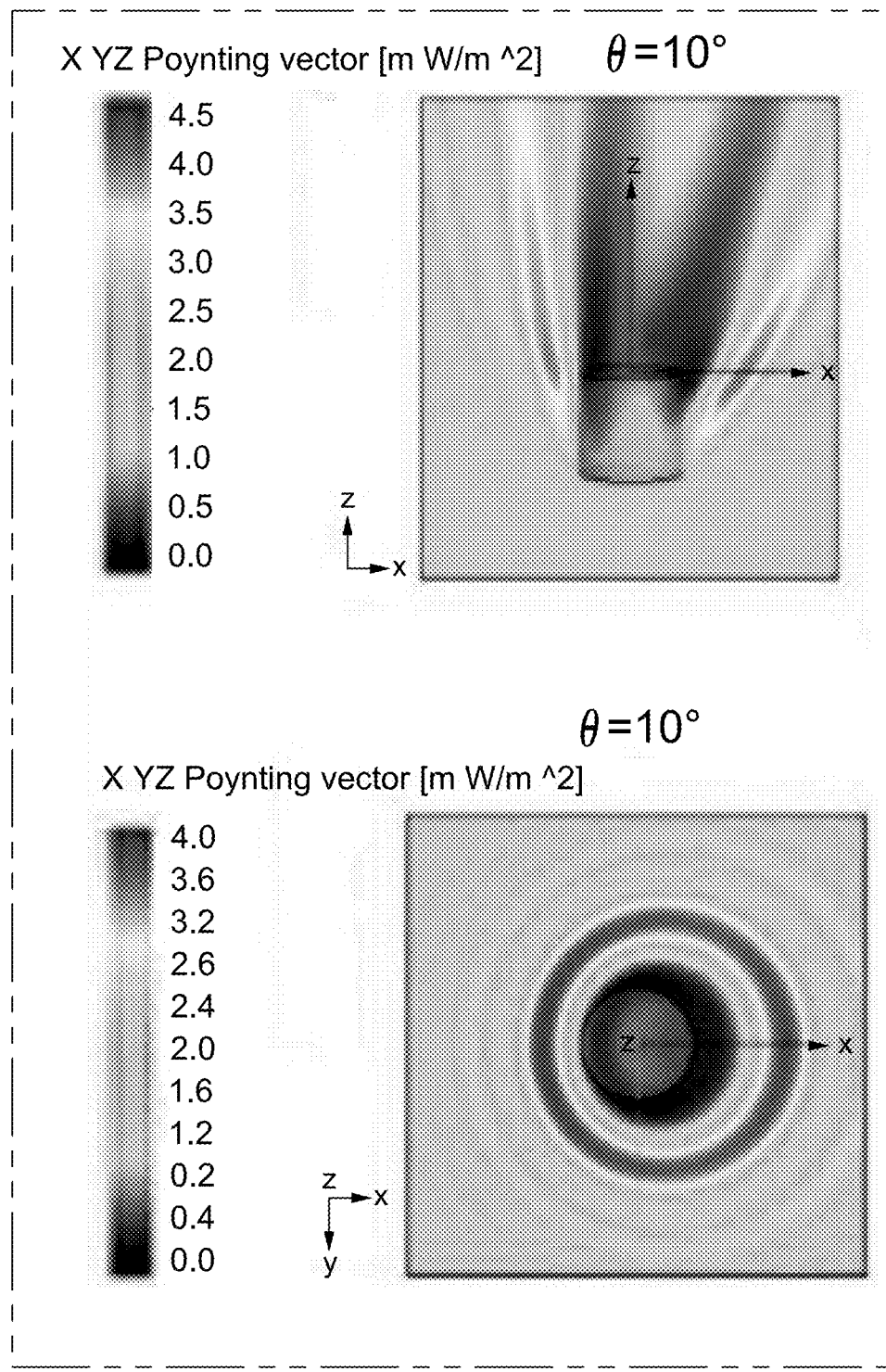
Figure 10C:
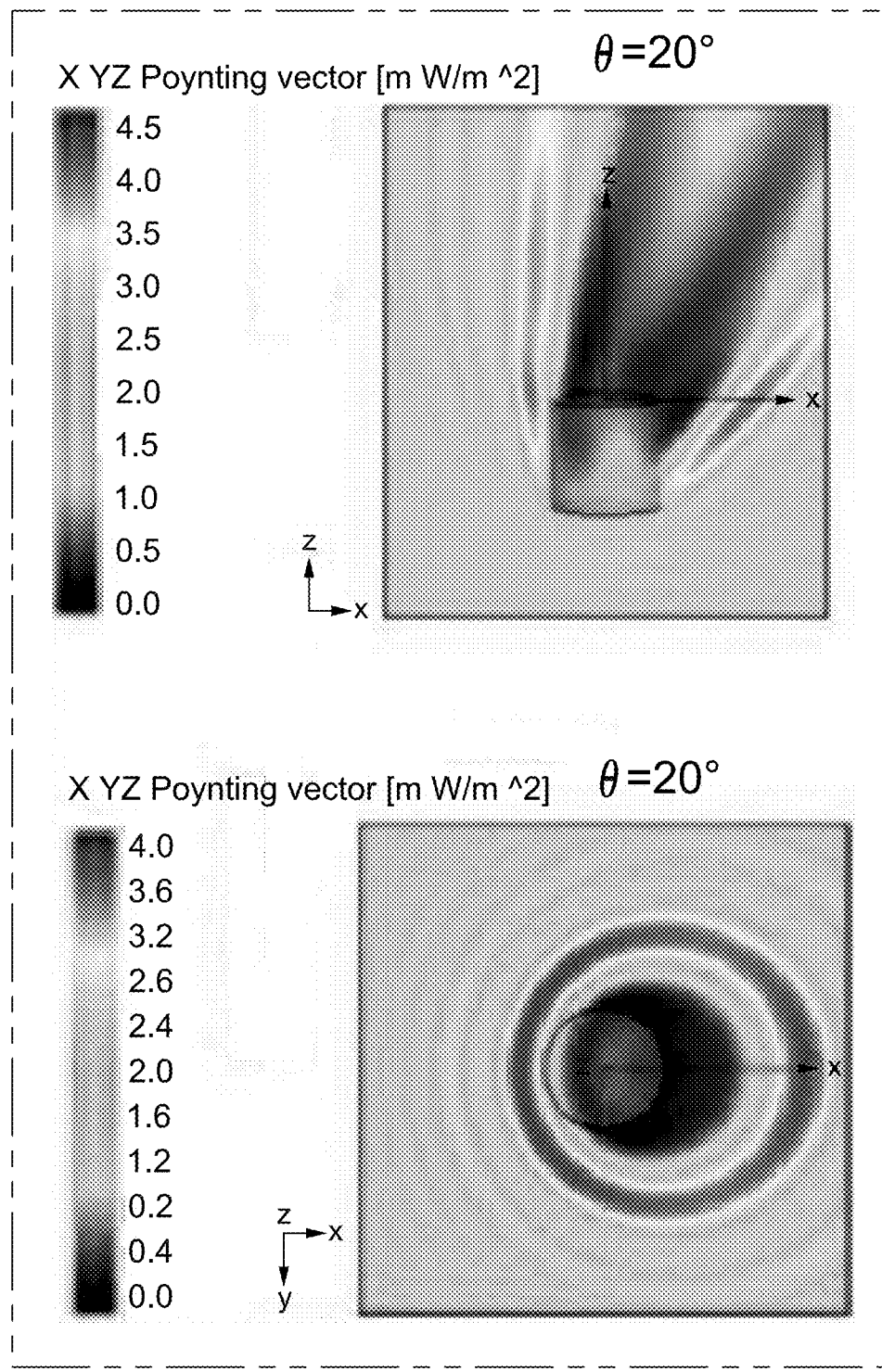
Figure 10D:
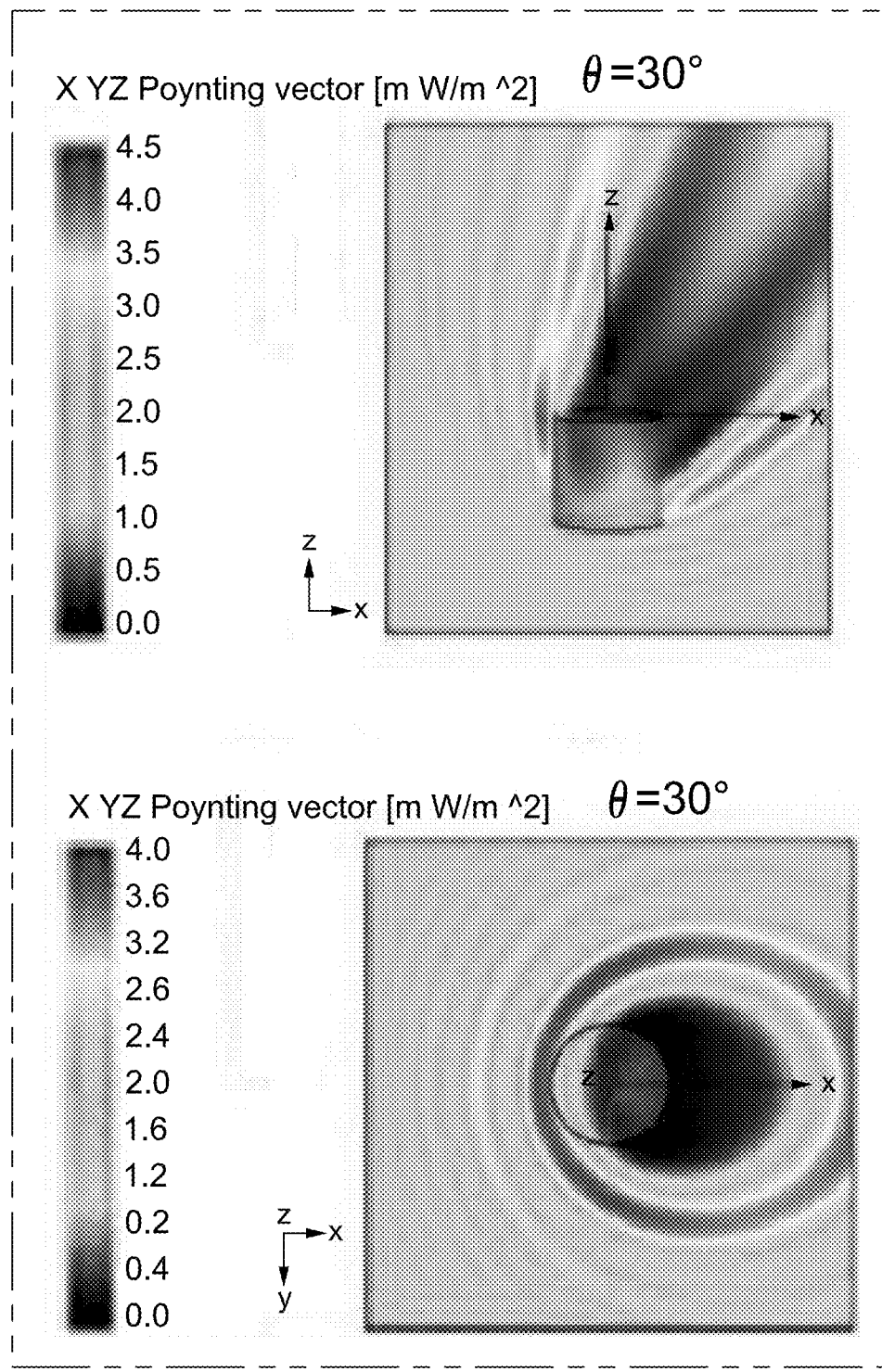

FIGS. 10(a) to 10(d) show nanojet beams produced by a hollow cylindrical cavity ($n_1$=1.49, $n_2$=1, $L_z$=740 nm, R=370 nm) under different angles of incidence of the unit-amplitude plane wave in XZ-plane, namely $\theta$=0° in FIG. 10(a), $\theta$=10° in FIG. 10(b), $\theta$=20° in FIGS. 10(c) and $\theta$=30° in FIG. 10(d).

The symmetry of the near-field patterns in the XY-plane (see FIG. 10(a)) evidences that the beam shape and radiation angle remain nearly constant for both TE (Transverse Electric) and TM (Transverse Magnetic) polarizations of the incident wave.

Moreover, in case of an incline incidence, it may be observed in FIG. 10 that the beam radiation angle changes in correspondence to the angle of incidence of the plane wave. The shape of the beam and field intensity enhancement remain nearly constant for incidence angle up to about $\theta_B$.

Figure 11A:
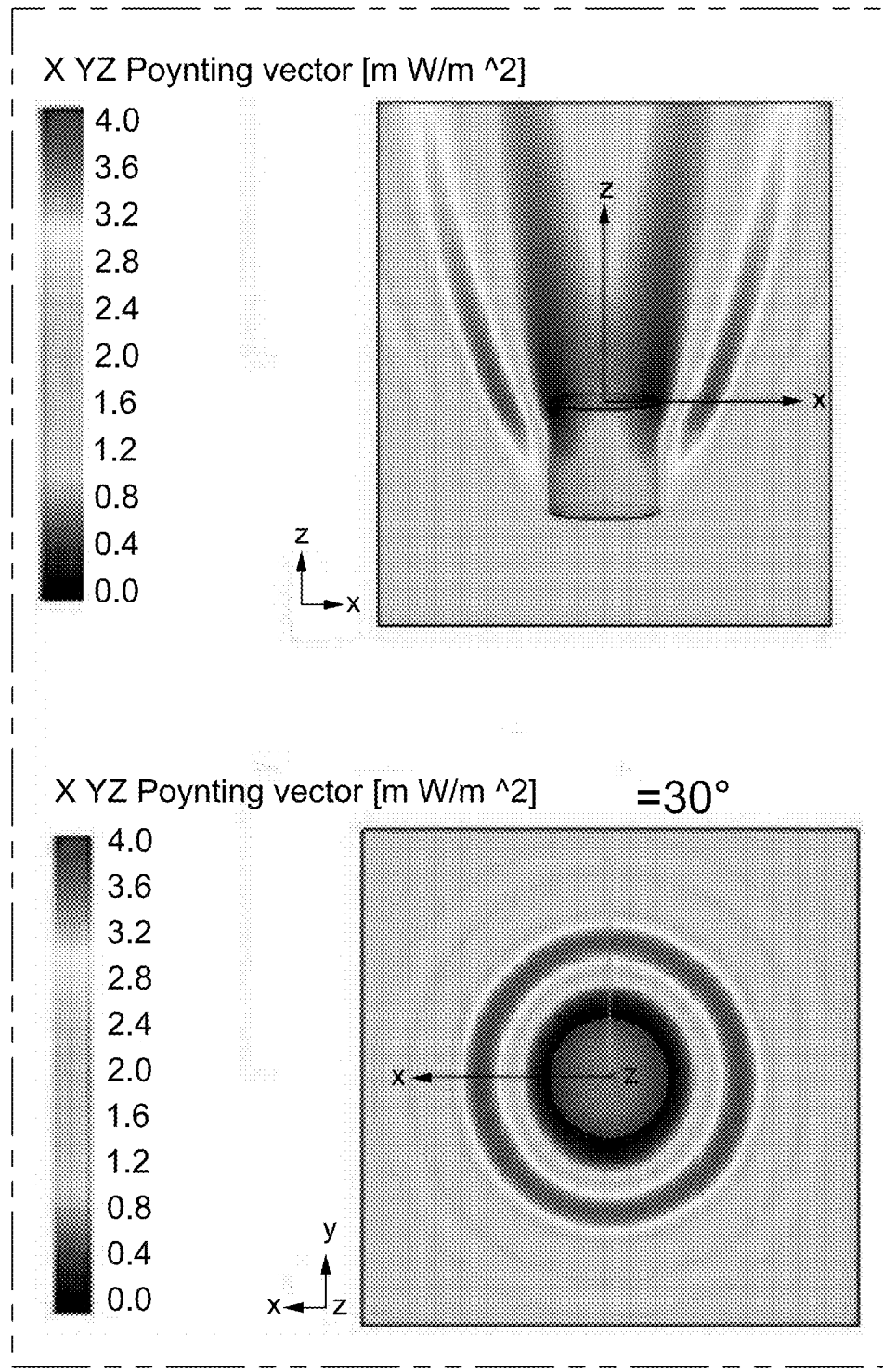
FIGS. 11(a) and (b) illustrate the nanojet beams phenomenon as observed for different host media according to embodiments of the present disclosure.
Figure 11B:
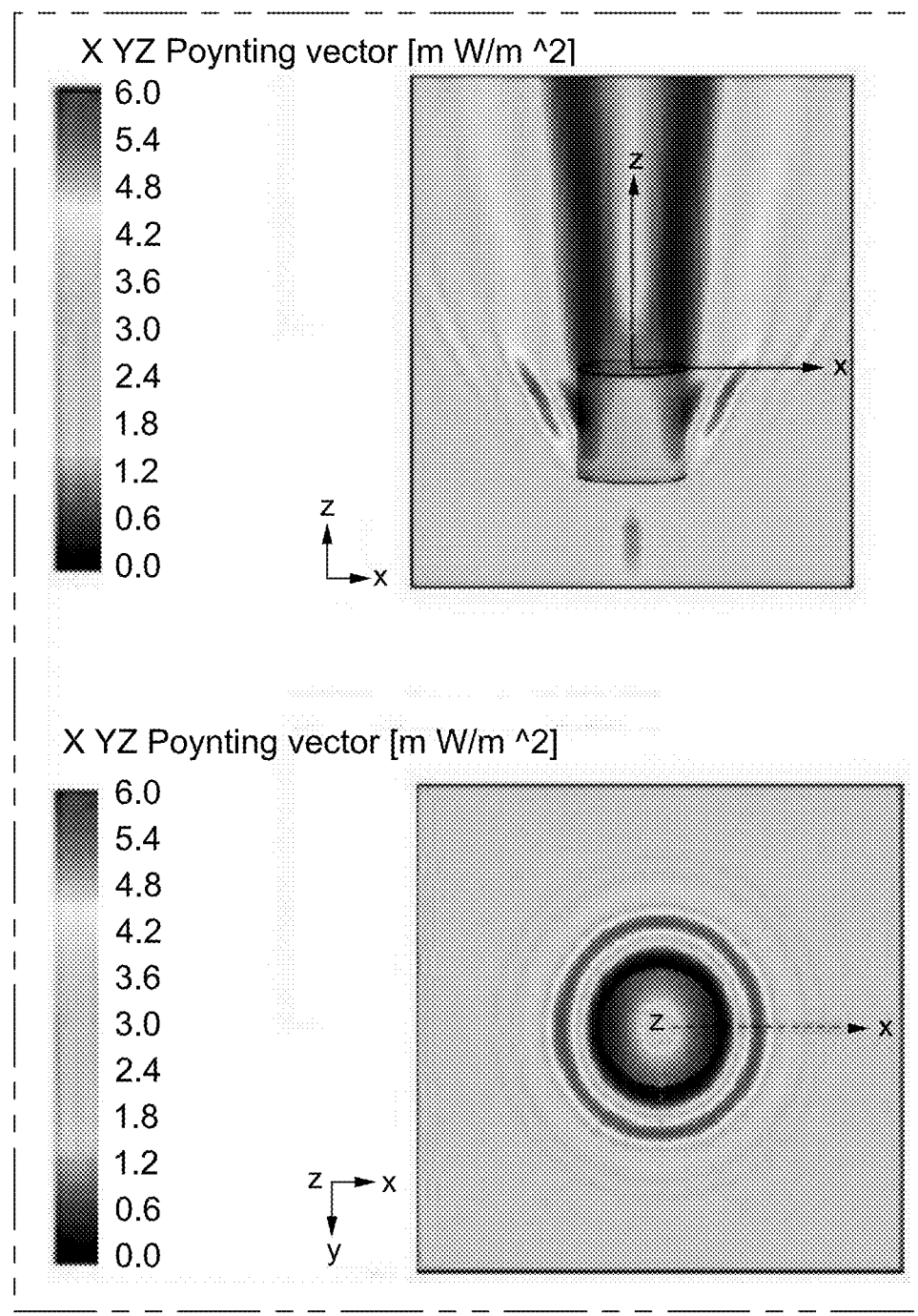
Figure 12A:
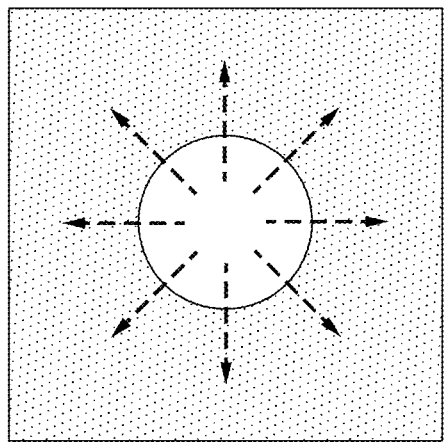
FIGS. 12(a), (b), (c), and (d) show four exemplary cylindrical cavities each having a different shape of the cross-section boundary, namely: (a) circular, (b) square, (c) 8-shape, and (d) rectangular, according to embodiments of the present disclosure.
Figure 12B:
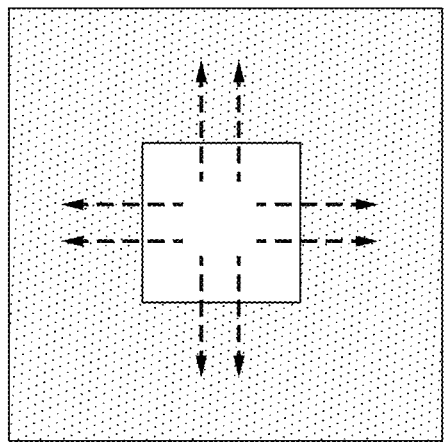
Figure 12C:
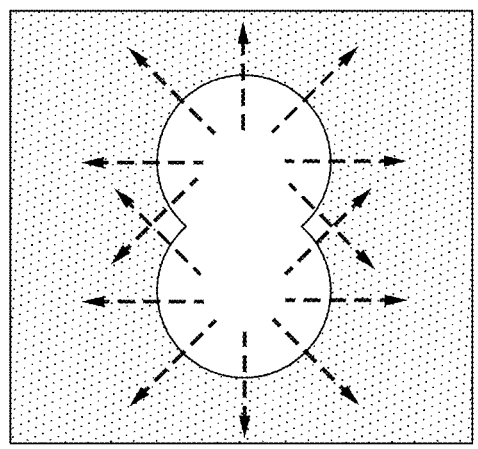
Figure 12D:
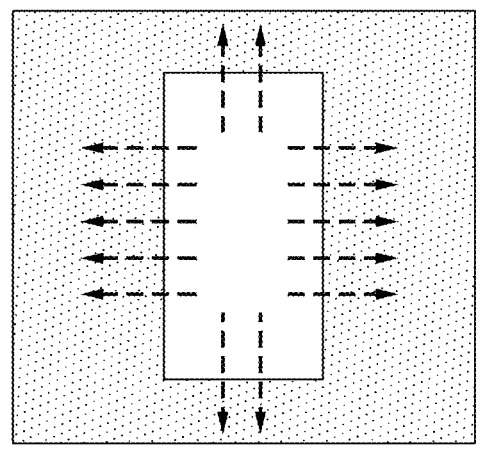

FIG. 11 illustrates the nanojet beams phenomenon as observed for different host media, including standard optical plastics and standard or doped glass. Such nanojet beams are produced by a hollow circular cylindrical cavity having the same physical dimensions ($n_2$=1, $L_z$=740 nm, R=370 nm) but embedded in a host medium of refractive index $n_1$=1.49, in FIG. 11 (a) and $n_1$=2.0, in FIG. 11(b).

The understanding of the nanojet formation phenomena illustrated through FIGS. 2 to 11 allows designing interesting devices, which can be used as focusing components, beam-forming components, or more generally components (or device) for forming any desired field intensity distribution in the near zone. Such components may be used for transforming an incident plane wave into one or multiple independent beams, or, conversely, for transforming an incident wave beam (whatever its wavelength) into a locally plane wave, in accordance with the symmetrical path properties of electromagnetic waves.

As explained above in the present disclosure, the formation of the nanojet beams is associated with the lateral part of the step in the layer of dielectric material, or with the lateral edge of the cavity, but not its full aperture. By optimizing the shape of the cross-section of the cavity S, it is possible to control the shape of the nanojet beam(s) produced by this cavity.

FIG. 12 shows four exemplary cylindrical cavities having each a different shape of the cross-section boundary, namely: (a) circular, (b) square, (c) 8-shape, and (d) rectangular. The dashed arrows schematically show some vertical cut planes and directions of the generated nanojet beams when these cavities are illuminated by a plane wave propagating along z-axis, from the plane of the figures. These cut planes are defined with respect to the direction of the normal vectors defined at the corresponding points of the cavity cross-section boundary. The corresponding simulated near-field maps for each cavity are shown in FIGS. 13(a) to 13(d), which illustrate the power density distribution in xz-plane (y=0) and xy-plane (z=1000 nm-$z_0$) for hollow cavities ($L_z$=$L_x$=R=740 nm), having same height and radius but different cross-section shapes, illuminated by a unit-amplitude plane wave propagation in the positive z-axis direction: (a) circular, (b) square, (c) 8-shape, (d) rectangular. The spots 101 to 104 in the xy-plane identify the nanojet beams, whose shapes and positions are well in line with the predictions given in FIG. 12 (these near-field maps are computed at arbitrary-selected xy-plane $z_0$=1000 nm, defined with respect to the cavity base plane).

Figure 13A:
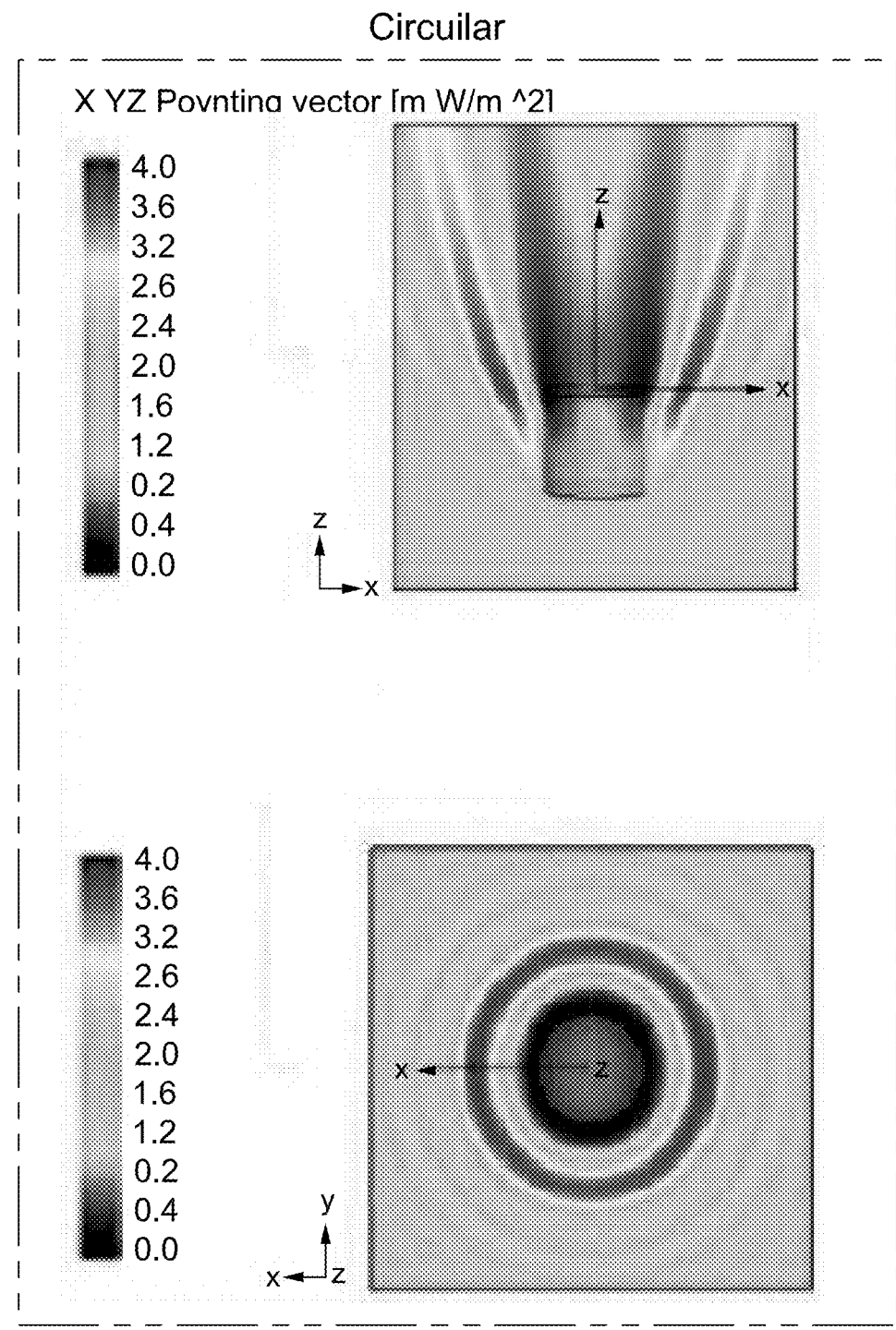
FIGS. 13(a), (b), (c), and (d) show the corresponding simulated near-field maps for each cavity of FIG. 12.

In particular, FIG. 13(a) shows that the axially-symmetrical circular cavity produces a diverging conical beam, whose cross-sections in the vertical (xz) and horizontal (xy) planes are shown in FIG. 13(a) top and bottom figures, respectively. It is interesting to note that this conical beam is nearly-symmetrical (see the near-field pattern in horizontal xy-plane), which is an evidence for the polarization-insensitive behavior of such component (or device). The field intensity enhancement observed in this configuration is a factor of two, i.e. FIE≈2 a.u. (defined in accordance with equation 2).

Figure 13B:
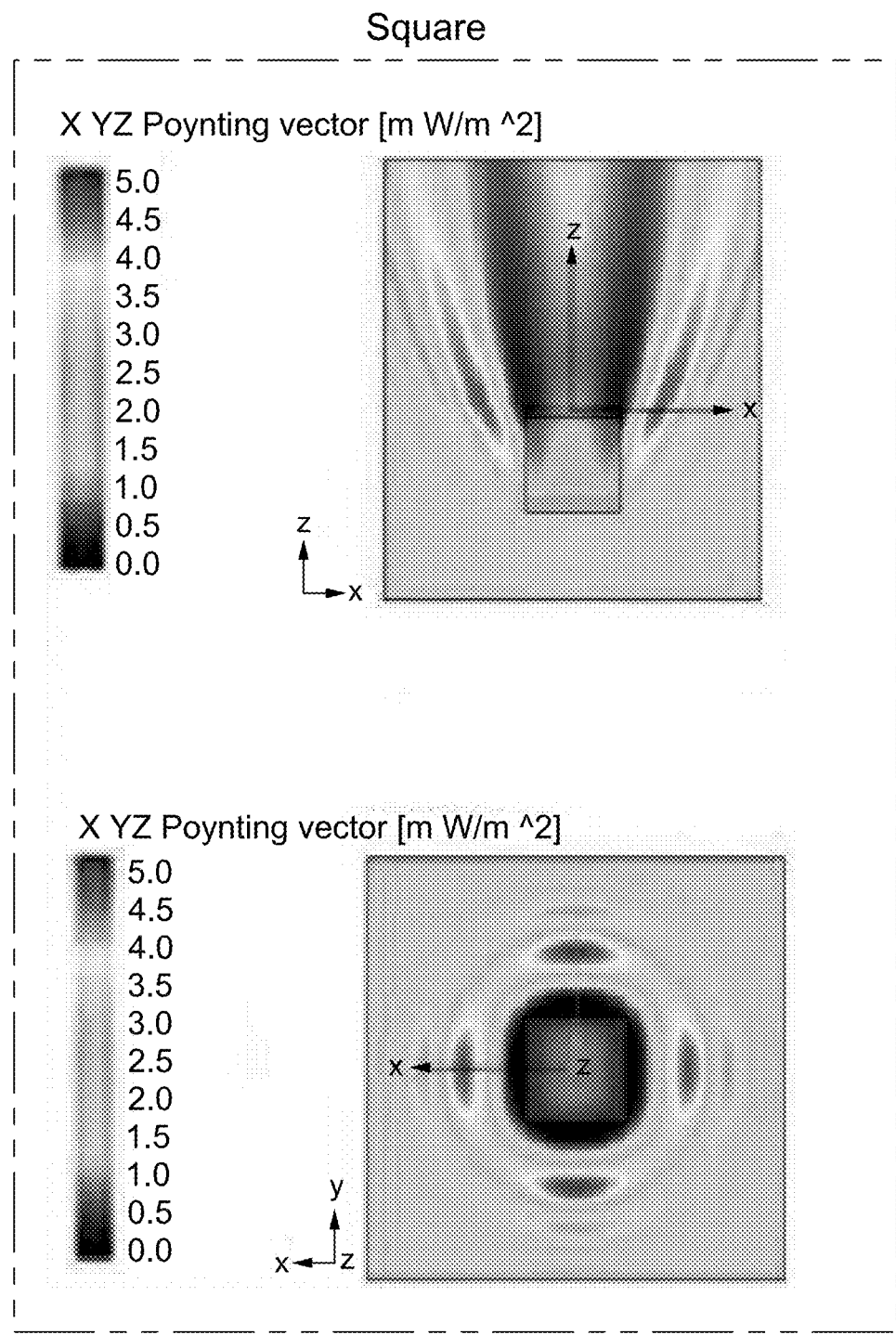
Figure 13C:
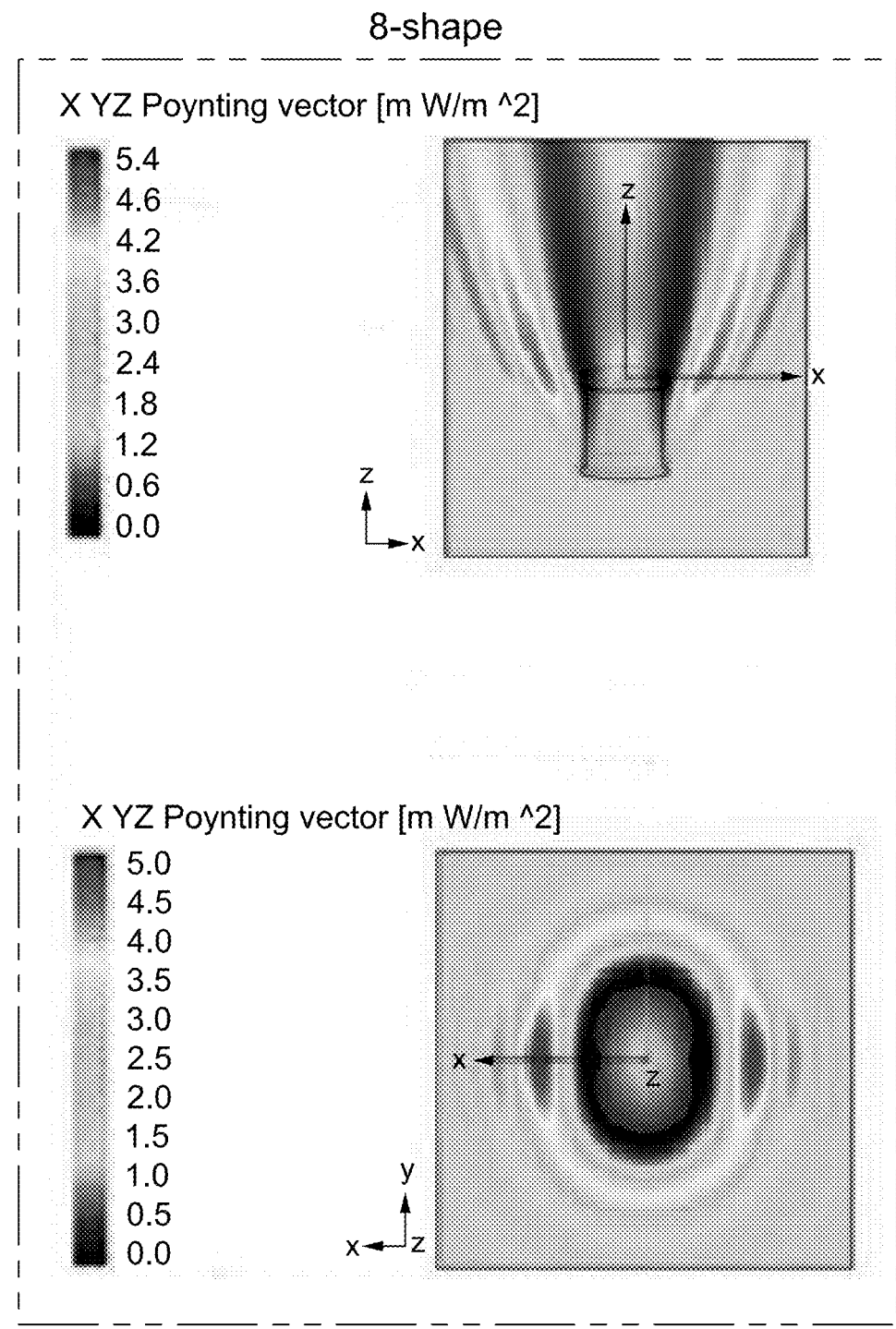

FIGS. 13(b) and 13(c) show how the transformation of the cavity cross-section, S, from the circular shape to rectangular and 8-shape causes the formation of multi-beam near-field patterns with four (referenced 104) and two (referenced 103) nanojet beams, respectively. This beam-forming effect is related to the transformation of the boundary segments from a convex shape to a planar shape and then to concave shape, respectively. The beams observed in FIGS. 13(b) and 13(c) have a radiation angle similar to the one of the conical beam produced by the circular cylinder (FIG. 13(a)). At the same time, the width of the beams in terms of the azimuth angle is different. The larger the internal angle of the concave segment of the cavity cross-section boundary, S, the narrower the beam and the higher the field intensity. In particular, the FIE for the two cavities presented in FIGS. 13(b) (square shape) and 13(c) (rectangular shape) is equal to ~2.5 a.u. and ~2.8 a.u., respectively.

Finally, FIG. 13(d) shows a wide blade-like nanojet beam generated by the hollow rectangular cavity. This example demonstrates the possibility to form wide beams that can be of interest for certain applications requiring uniform illumination of narrow shaped areas.

The boundary curvature of the cavity is hence a tool for changing the nanojet beam shape, position and field intensity enhancement.

The same approach can be used to build more complex components with symmetrical or non-symmetrical cross-sections producing an arbitrary number of identical or different nanojet beams, as depicted in FIG. 3.

However, the nanojet focusing components (or devices) previously described in FIGS. 2 to 12 have some constrains related to the limited field intensity enhancement and fixed radiation angle of the nanojet beam that need to be improved in order to make the nanojet components (also named nanojet lenses or devices) capable of reproducing the focusing functions of their conventional analogs, such as refractive and diffractive microlenses.

In one embodiment of the disclosure, it is proposed to transform the configuration of the cavity in such a way that all the nanojet beams, originating from different segments of the cavity cross-section boundary, recombine and contribute to the formation of a single high-intensity nanojet beam located on the axis of symmetry of the cavity and oriented along this axis, i.e. with no tilt compared to the incident plane wave.

Figure 23A:
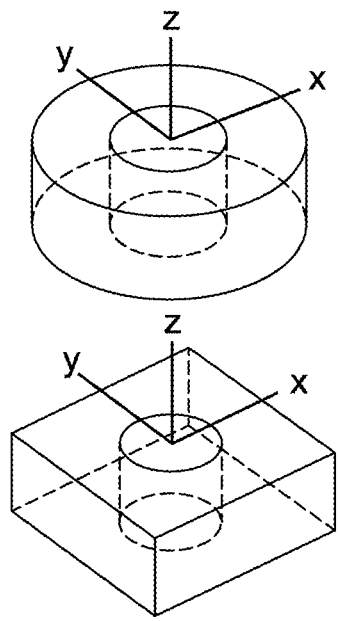
FIGS. 23(a), (b), (c). and (d) presents (a) a geometry of the ring-type nanojet lens with circular and square rings, (b) the power density distribution along z-axis for the ring-type nanojet lenses with circular and rectangular cross-sections and dimension of $L_z=740$ nm, $R_1=370$ nm, $L_x=L_y=2(R_1+W)$ illuminated by a unit-amplitude plane wave with $\lambda_0=550$ nm, (c,d) power density distributions for both lenses in the xz-plane.
Figure 23B:
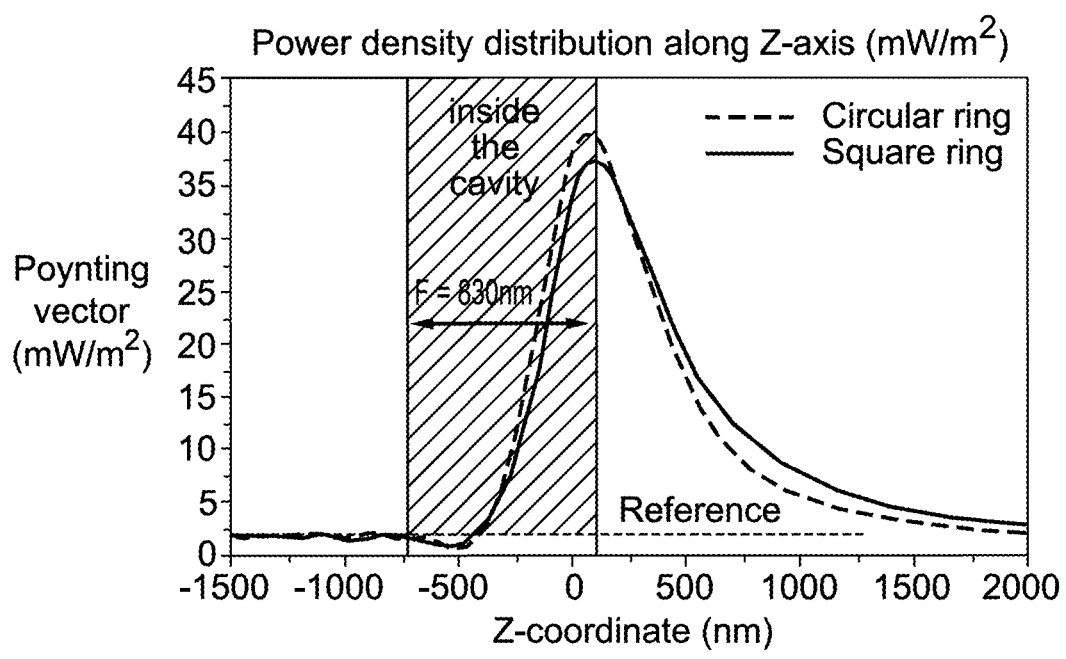
Figure 23C:
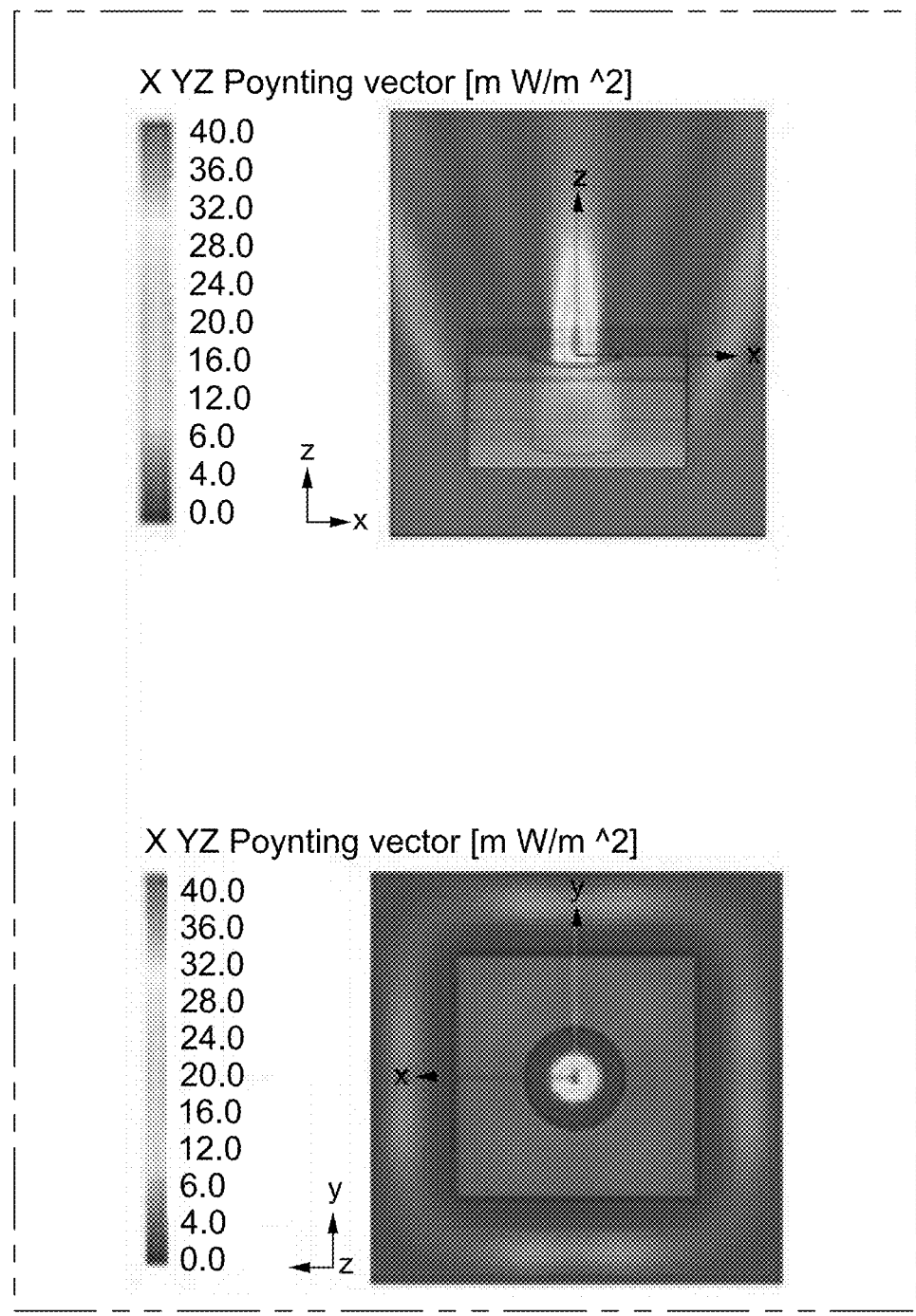
Figure 23D:
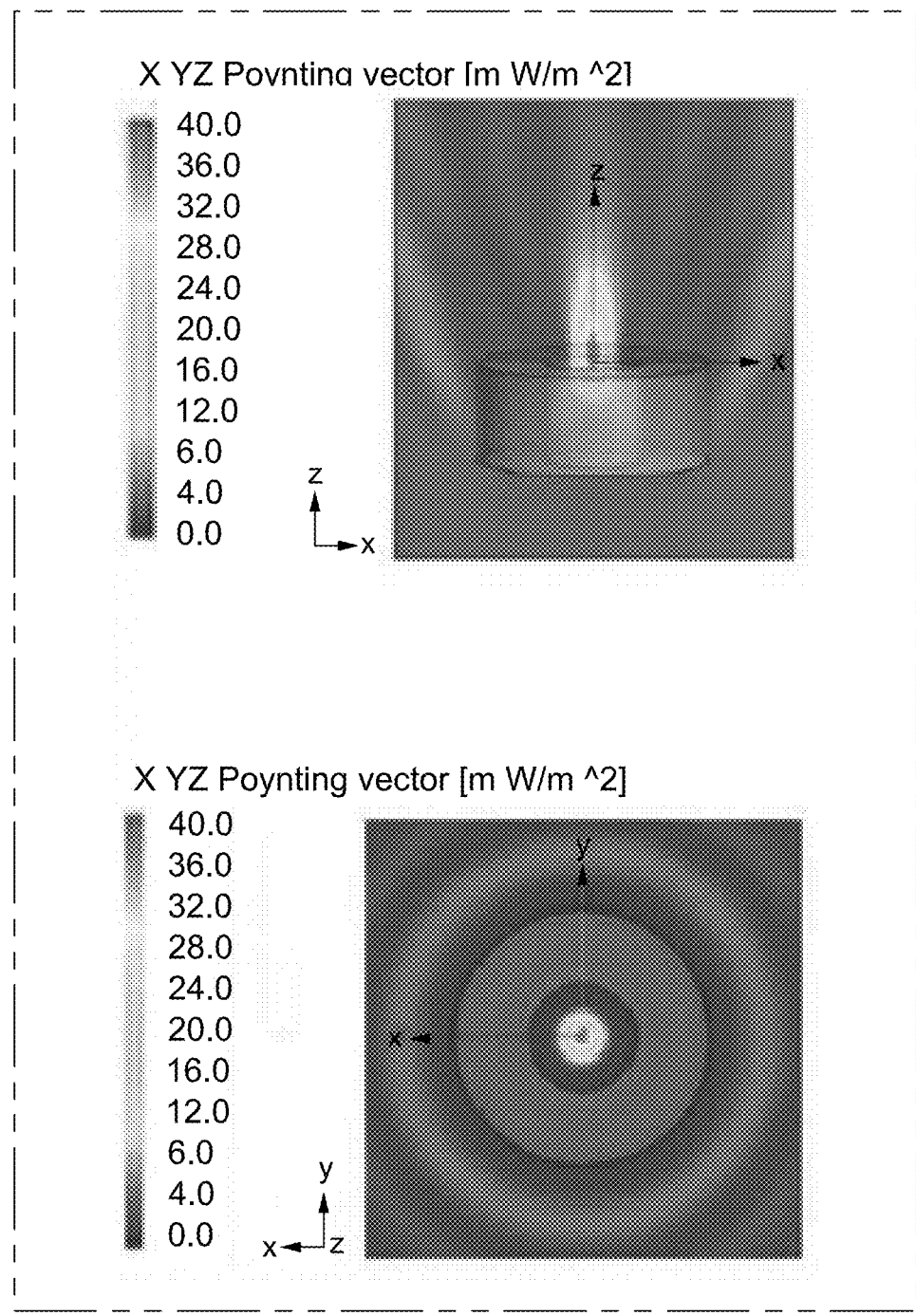
Figure 25:
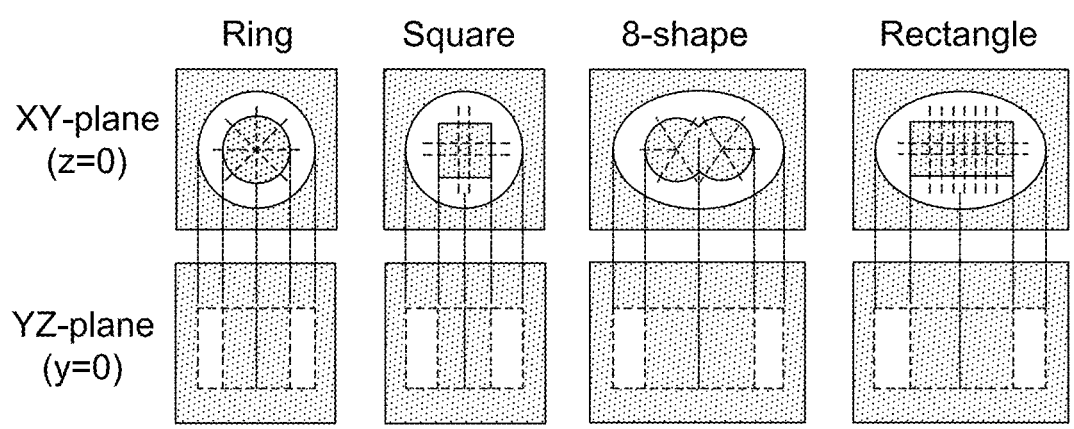
FIG. 25 presents different topologies of the exemplary ring-type nanojet lenses.
Figure 26A:
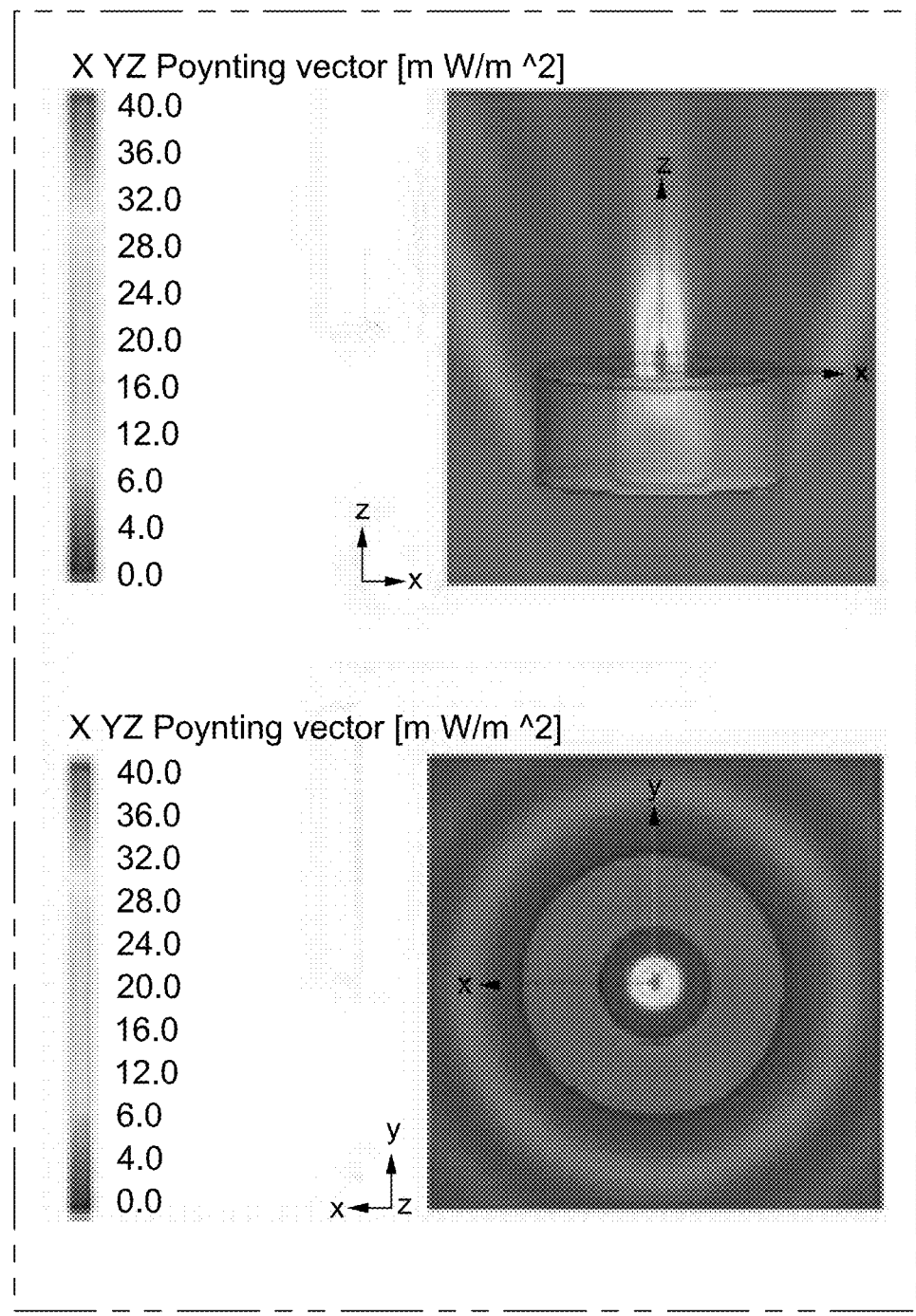
FIGS. 26 (a), (b), (c), and (d) present power density distribution in xz and xy-planes for the ring-type nanojet lenses ($L_z=740$ nm, $W=500$ nm, $n_1=1$, $n_2=1.49$) with different cross-sections of the core cylinder illuminated by a unit-amplitude plane wave $\lambda_0=550$ nm: (a) circle: $R_1=370$ nm, (b) square: $L_x=L_y=2R_1$, (c) 8-shape: $R_1=370$ nm with a distance between the centers d=$R_1$, (d) rectangle: $L_x=8R_1$, $L_y=2R_1$.
Figure 26B:
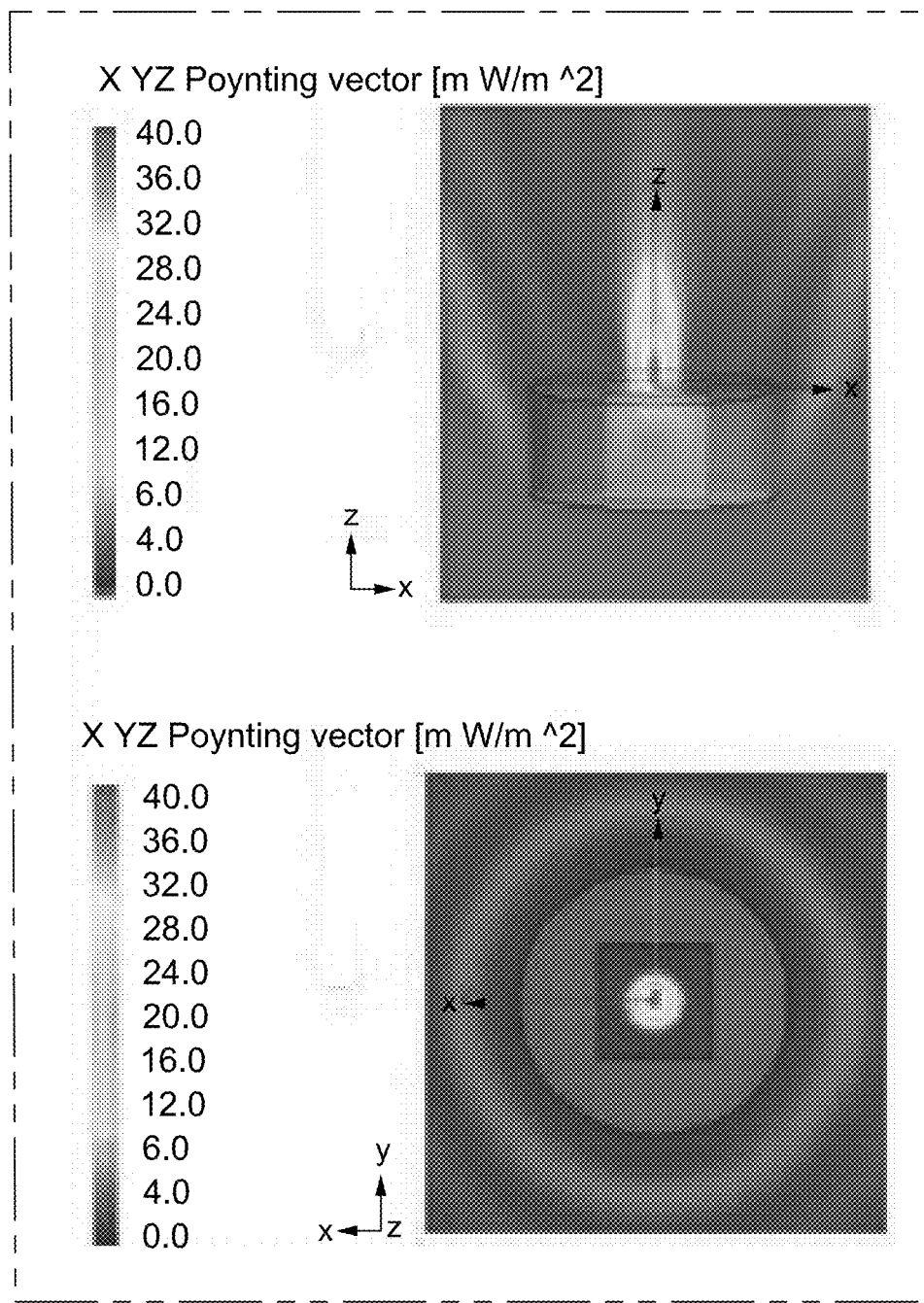
Figure 26C:
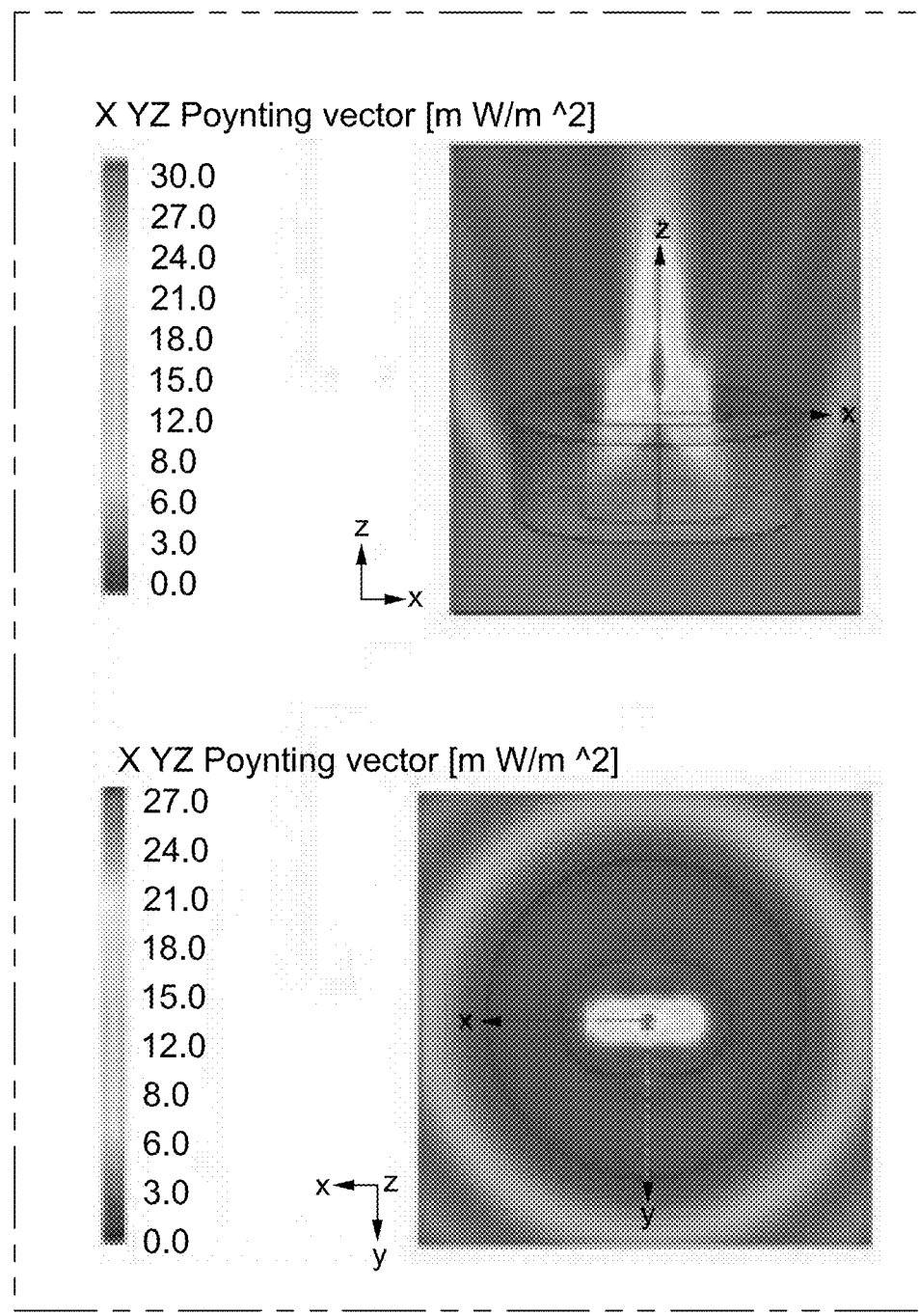
Figure 26D:
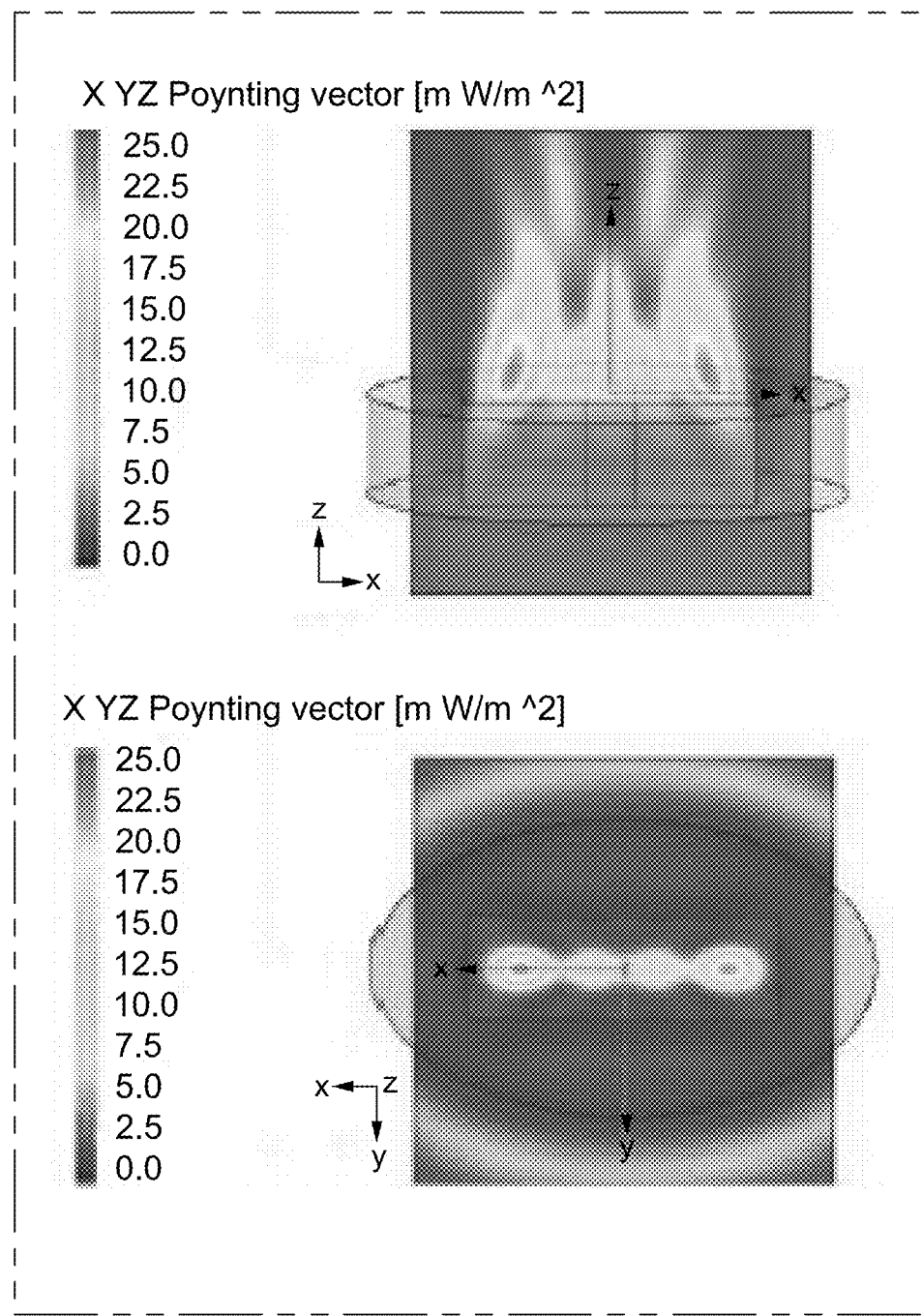
Figure 30:
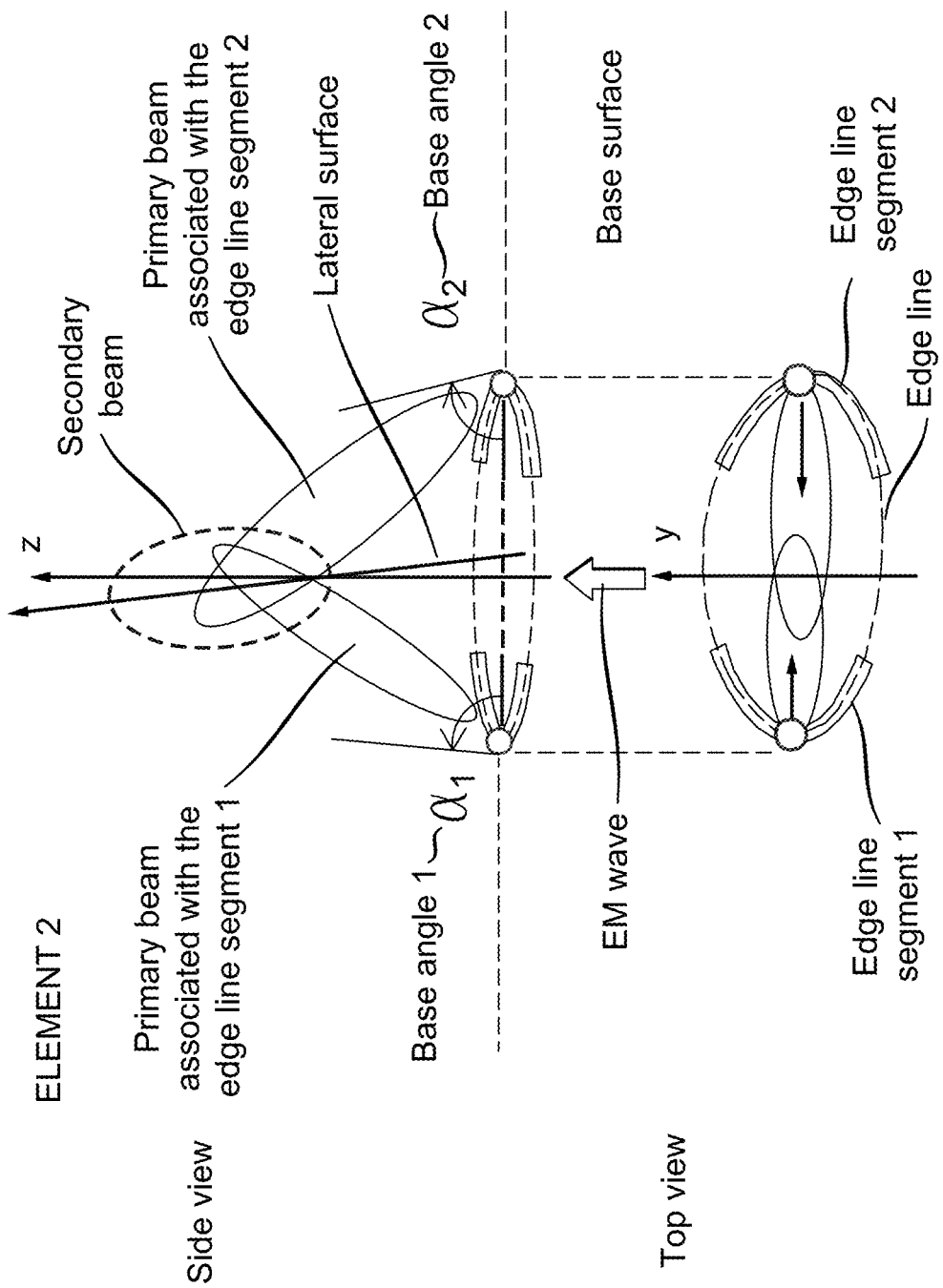
FIG. 30 presents two different views of a second element according to one embodiment of the disclosure.

In order to achieve this, it is proposed to use a device comprising at least one layer of a dielectric material comprising at least partially a first element (for example having the shape of a cylinder or a cuboid as depicted in FIG. 23(a)), such first element having a first refractive index value, such first element comprising at least partially a second element (for example having the shape of a cylinder, or other shapes as depicted in FIG. 25), such second element having a second refractive index value greater than the first index value, and wherein the second element comprises at least a base surface, defined with respect to an arrival direction of an electromagnetic wave, and wherein the at least a base surface comprises at least two opposite edge line segments (see for example the FIG. 30) whose shape (for example the curvature) and associated base angles between the at least a base surface and a lateral surface of the second element, in a vertical plane with respect to said at least a base surface, control a shape of at least one focused beam (see for example the FIG. 30).

It should be noted that the intensity of the at least one focused beam is defined by the length of the two corresponding edge line segments of the at least a base surface.

Figure 1A:
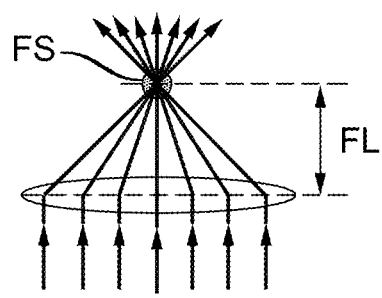
FIGS. 1 (a), (b), (c) and (d) are schematic drawings illustrating operational principles of refractive, diffractive lenses, nanojet microlenses, and terajet solid cuboid lenses.
Figure 1B:
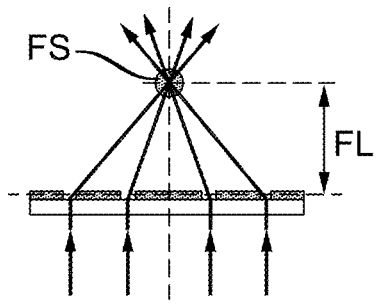
Figure 1C:
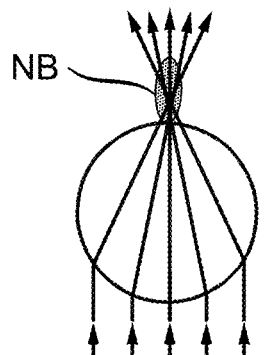
Figure 1D:
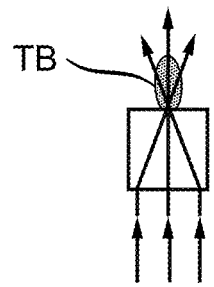
Figure 14A:
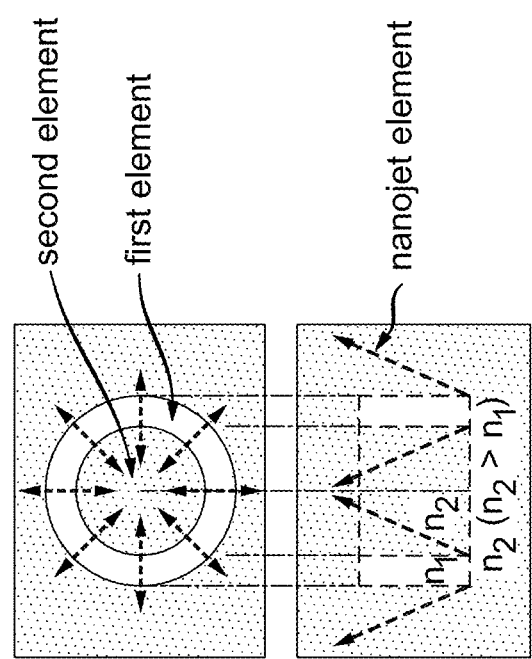
FIGS. 14(a) and (b) presents schematic drawing of the cavity transformation from a single-core cylinder (FIG. 14(a)) to a double-layer ring-type structure with a core filled in with the host medium according (FIG. 14(b)) to one embodiment of the disclosure. The arrows schematically indicate propagation directions for the nanojet beams originating from different segments of the cavity base edge line.
Figure 14B:
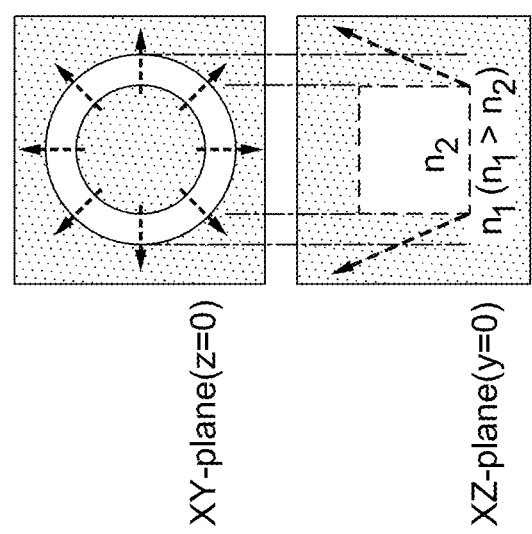

As schematically shown in FIG. 14(b), the desired effect can be achieved by exchanging the index values inside and outside the cylinder. The additional advantages of the proposed ring-type structure include the natural solutions of the problems related to setting the lens in space (that is a critical drawback of the microspheres (FIG. 1(c)) and SCL (FIG. 1(d)) and its possible fabrication using standard optical materials and established planar microfabrication technologies. It should be noted that a nanojet beam generated via the edge of a step propagates in the direction of the media having the higher refractive index value.

Figure 15A:
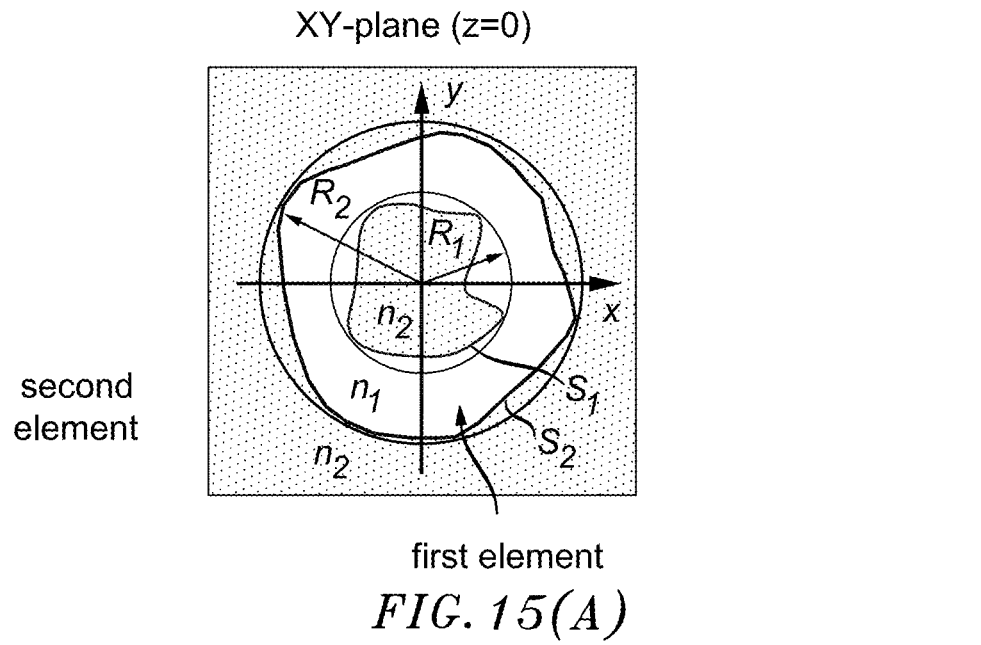
FIGS. 15 (a) and (b) present the topology and notations of the ring-type nanojet lens according to one embodiment of the disclosure.
Figure 15B:
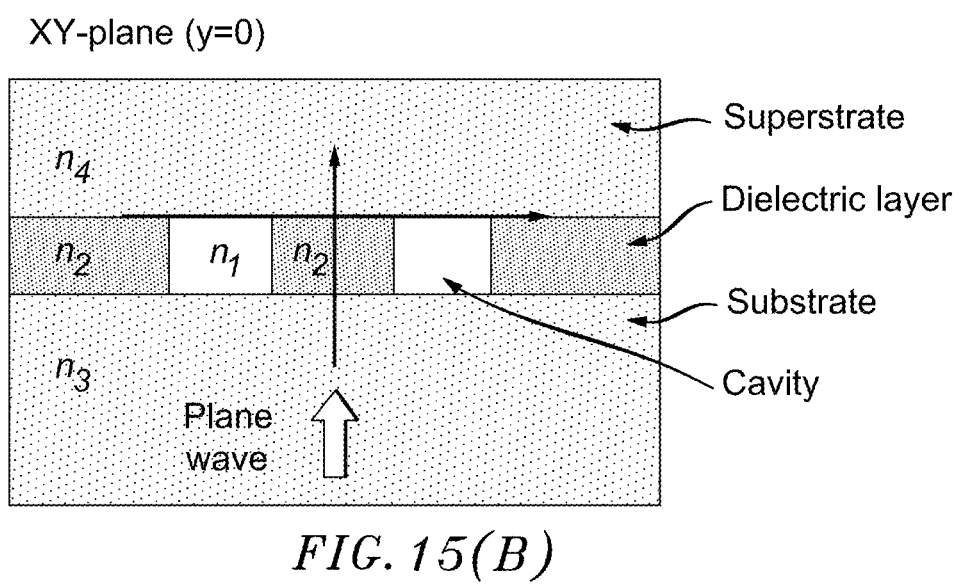
Figure 16A:
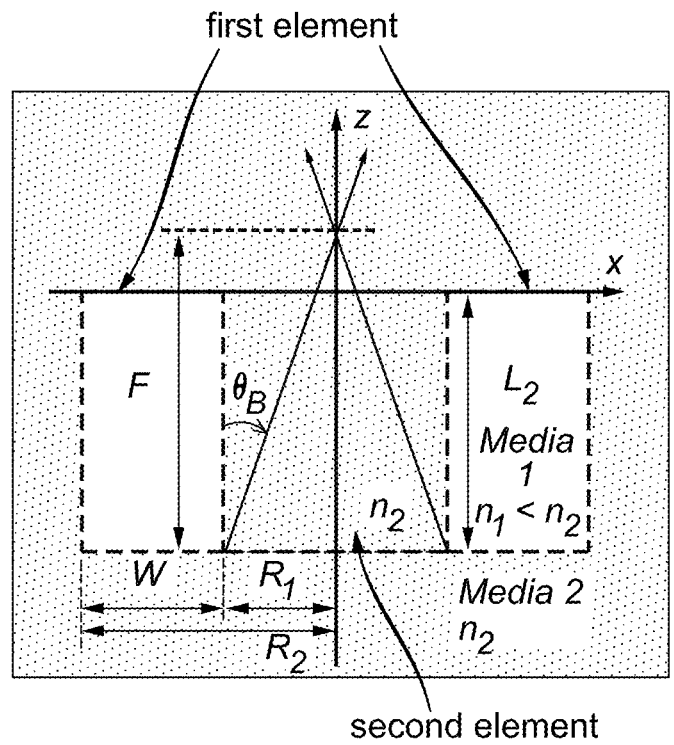
FIGS. 16(a), (b), (c), and (d) present a ring-type nanojet lens according to one embodiment of the disclosure ($n_1=1$, $n_2=1.49$): (a) Side view and notations, (b) Power density distribution along z-axis for the lens with dimensions $L_z=740$ nm, $R_1=370$ nm, $W=500$ nm, (c, d) Power density distribution in the xz (y=0) and xy (z=80 nm from top surface) planes.
Figure 16B:
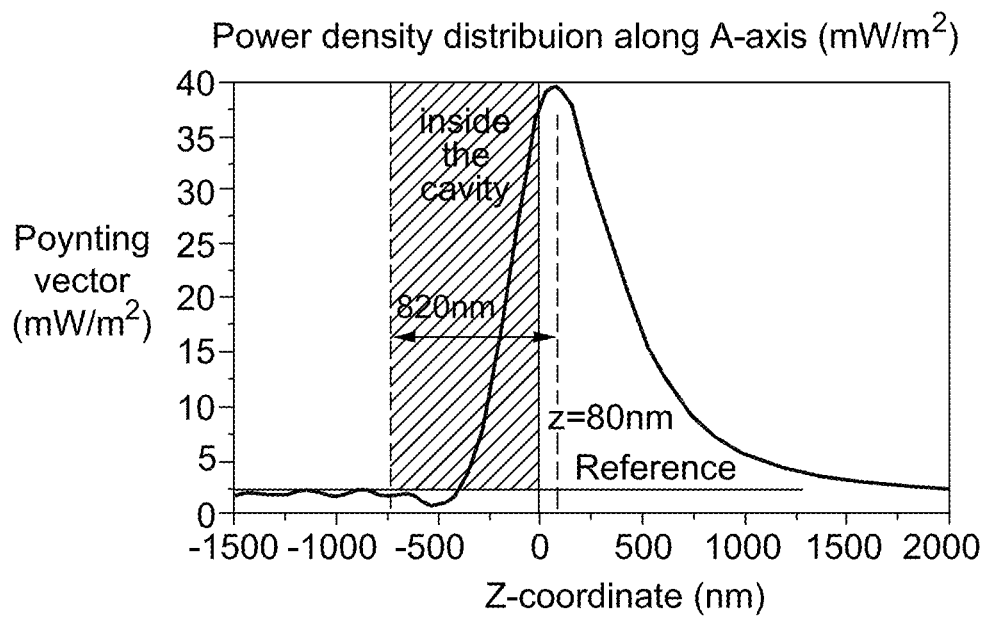
Figure 16C:
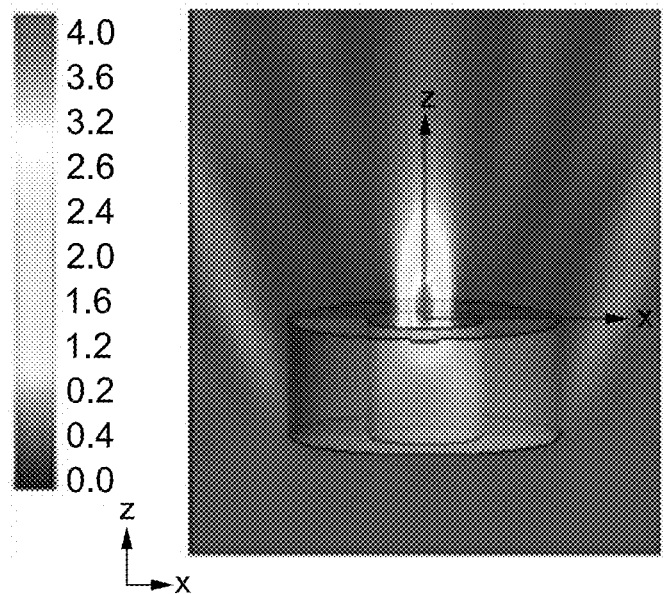
Figure 16D:
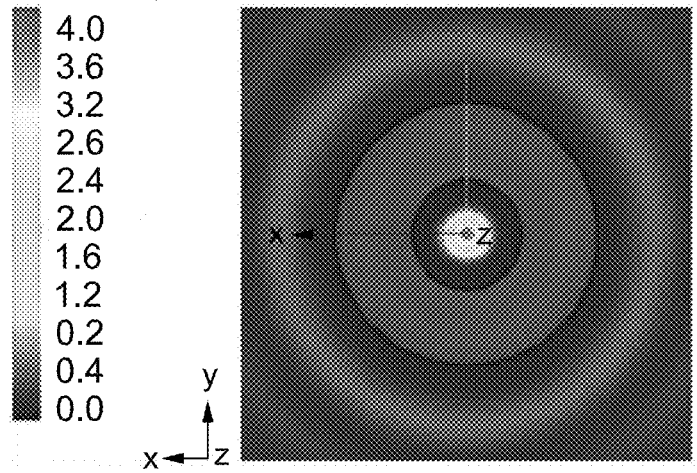
Figure 17A:
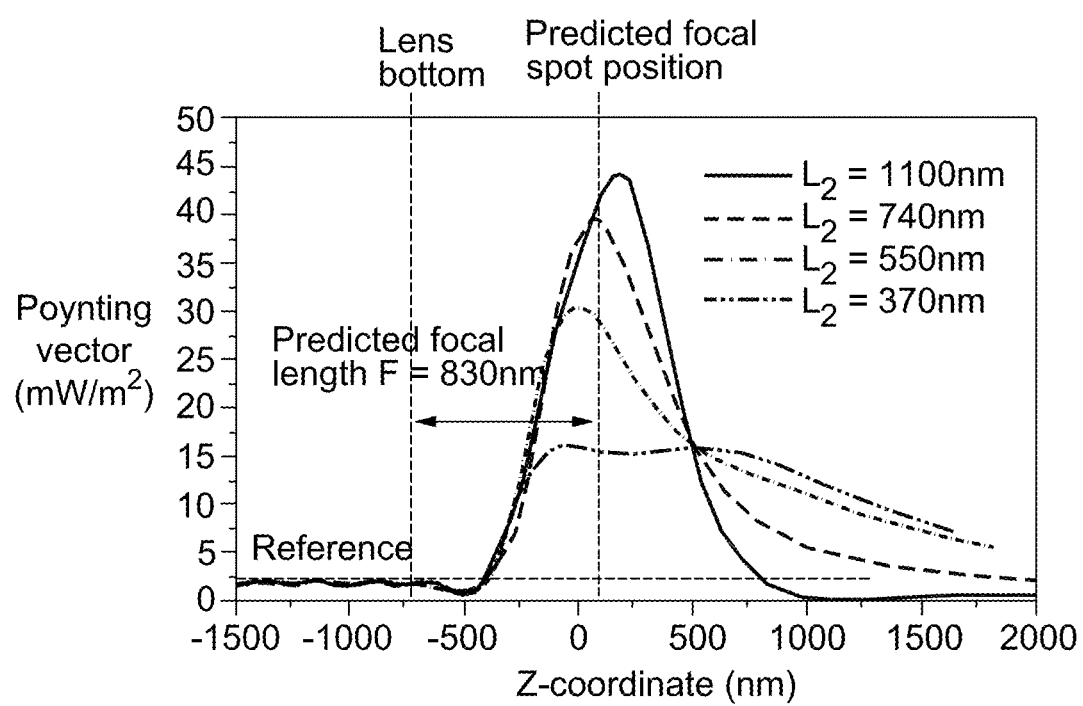
FIGS. 17(a), (b), (c), (d), and (e) present near-field characteristics of the ring-type nanojet lens according to one embodiment of the disclosure, with dimensions $R_1=370$ nm, $W=500$ nm, refractive indexes $n_1=1$, $n_2=1.49$, and variable height illuminated by a unit-amplitude plane wave with $\lambda_0=550$ nm: (a) Power density distribution along z-axis, (b-e) Power density distribution in xz (y=0) plane for the lens height of $L_z=370, 550, 740,$ and $1100$ nm.
Figure 17B:
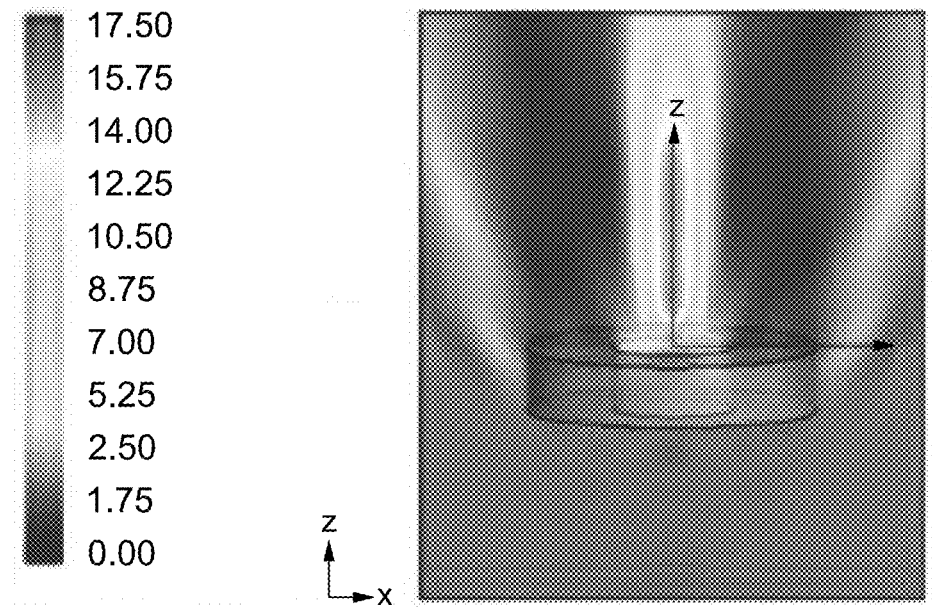
Figure 17C:
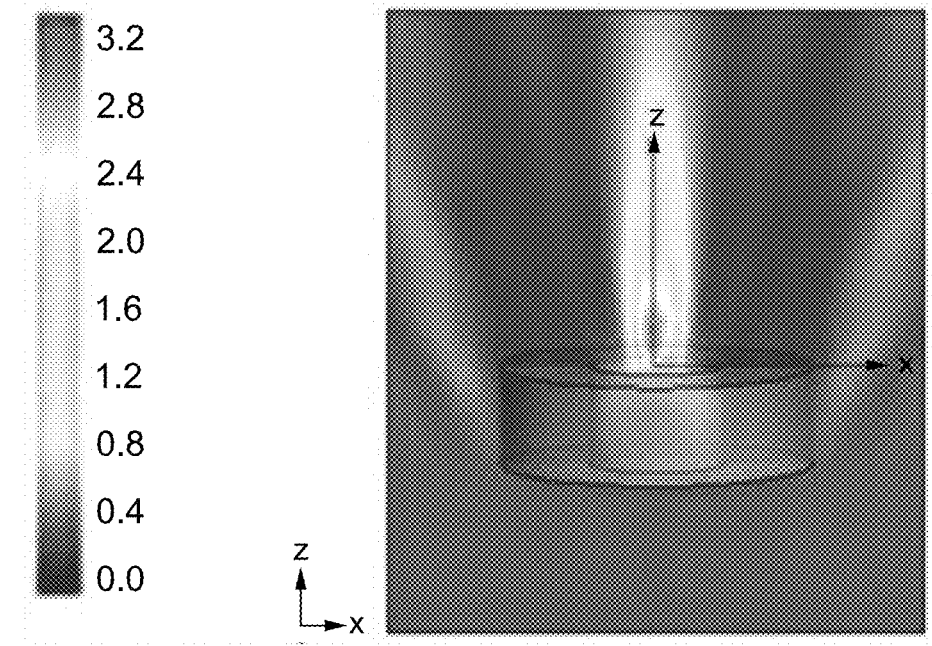
Figure 17D:
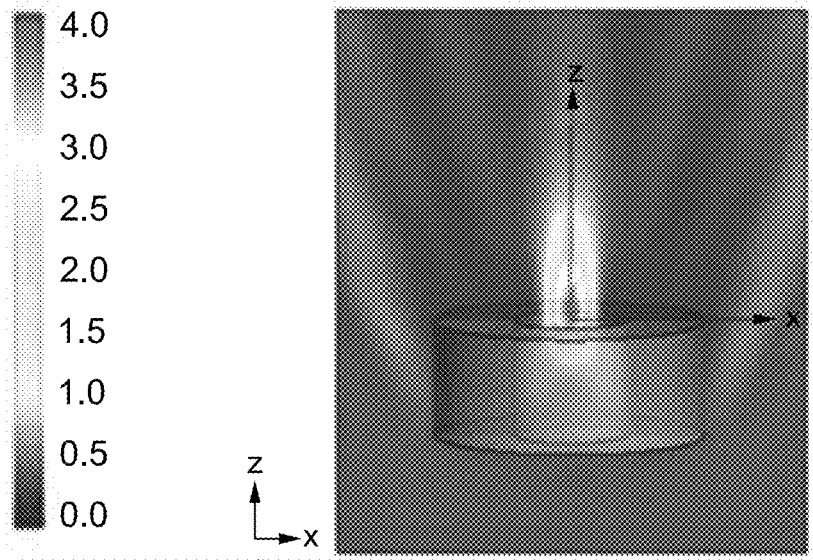
Figure 17E:
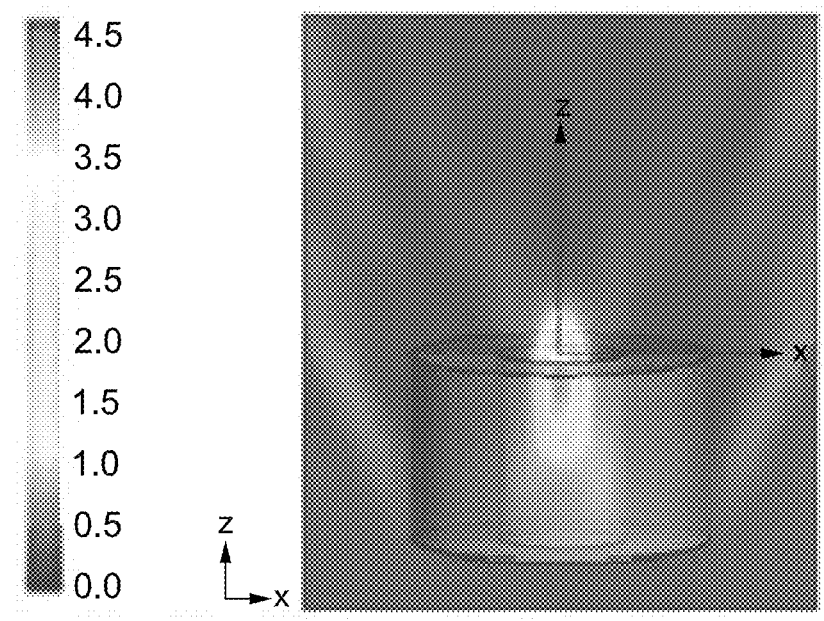
Figure 18A:
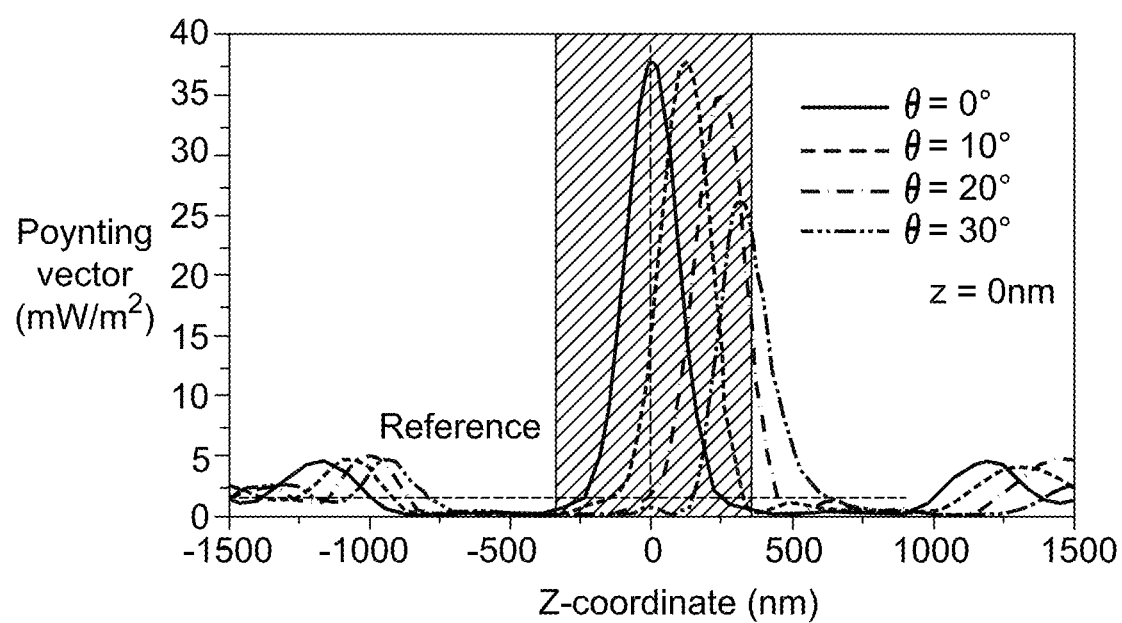
FIGS. 18(a), (b), (c), (d), and (e) present the power density distribution for the ring-type nanojet lens according to one embodiment of the disclosure, with dimensions $L_z=740$ nm, $R_1=370$ nm, $W=500$ nm and refractive indexes ($n_1=1$, $n_2=1.49$) illuminated by a unit-amplitude plane wave with $\lambda_0=550$ nm under different incident angles: (a) along the x-axis (y=z=0), (b-e) in xz-plane for incident angles of 0°, 10°, 20°, 30°, respectively.
Figure 18B:
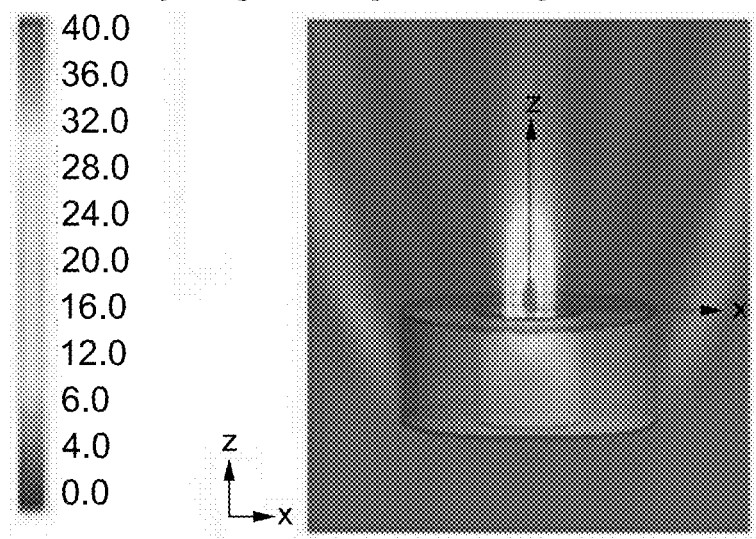
Figure 18C:
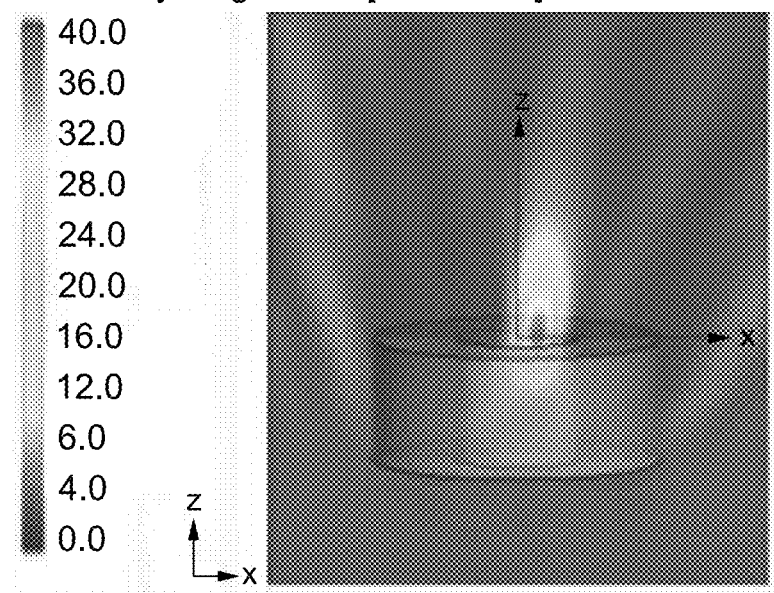
Figure 18D:
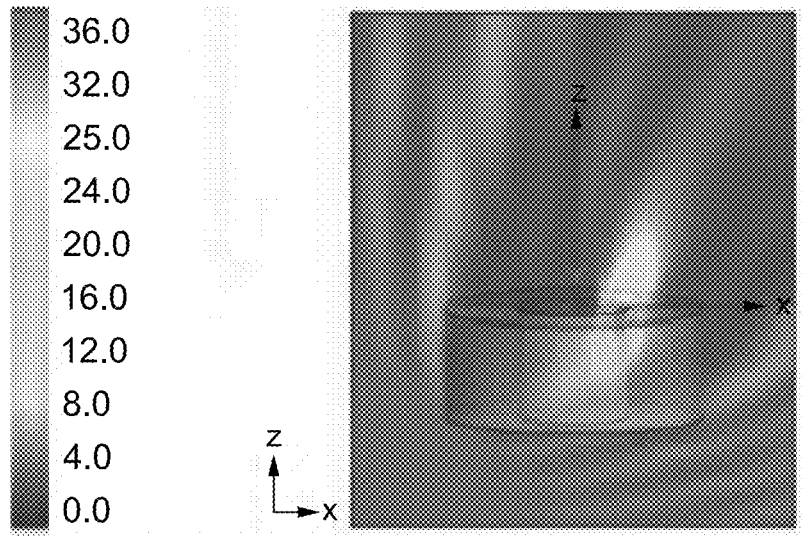
Figure 18E:
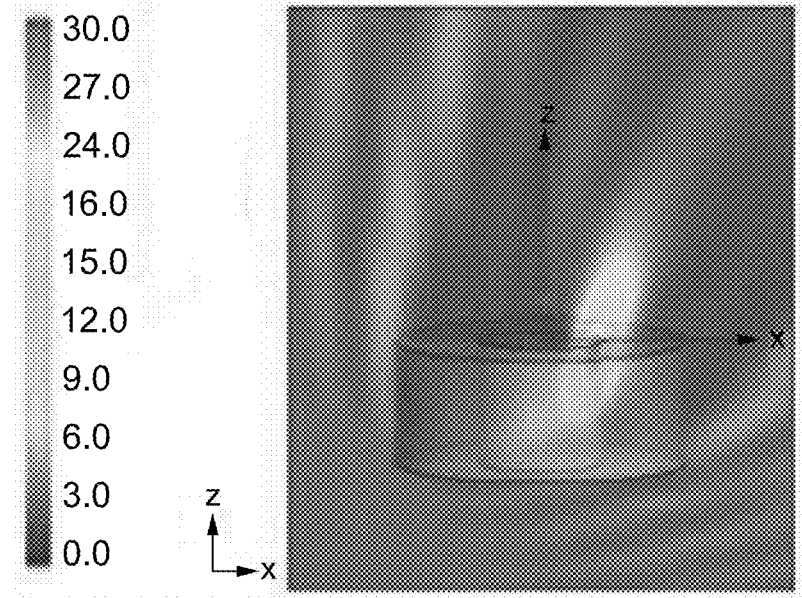

A general topology of the ring-type nanojet lens is illustrated in FIGS. 15 (a) and (b). It has a form of a double-layer cylinder with an arbitrary cross-section embedded in a homogeneous non-dispersive dielectric host medium. Hereafter, we assume that the core of the cylinder has refractive index $n_2>n_1$ and that it is made of a material having the same refractive index as the host media, $n_2=n_3=n_4$. Hence, contrary to the embodiment previously described, the values of the refractive indexes are changed (i.e. previously, we have $n_1>n_2$ (see FIG. 14(a)), and in such embodiment, we have $n_2>n_1$ (see FIG. 14(b)).

For instance, the host media may have a refractive index similar to the one of glass or plastic in the optical range (e.g. $n_2=1.49$) with a ring-type cavity filled in with vacuum or air, $n_1=1$.

In principle, the cylinder cross-section boundaries $S_1$ (core cylinder) and $S_2$ (external cylinder) can have any shape (symmetrical or non-symmetrical). The impact the size and shape of each boundary is investigated later in the description. In one embodiment of the disclosure, the cylindrical structures could be oblique and/or truncated and/or comprise a rounded top surface.

Hereafter, we consider cylindrical structures with vertical edges parallel to z-axis and top/bottom surface parallel to xy-plane. However, as mentioned previously, some conical and prismatic structures with arbitrary base angles can also be used. The variation of the base angles associated with different segments of the base edge line can be used to produce nanojet beams with different radiation angles. This option is not discussed here, but one skilled in the art could handle that question according to the teachings of the present disclosure.

In one of its embodiments, the ring-type nanojet lens can be implemented in a form of a double-layer circular cylinder. In the following analysis, we assume that its core is filled in with a material same as the host medium ($n_2=n_3=1.49$ for instance) and the outer shell (the cavity) is filled in with vacuum or air ($n_1=1$).

Under the above assumption (i.e. double-layer circular cylindrical shape and pre-selected host medium material), configuration of a ring-type nanojet lens is controlled by three parameters, namely: its height along z-axis ($L_z$) and radii of the two cylindrical layers ($R_1$ and $R_2=R_1+W$, where W is the width of the ring).

Focal Length

In a first approximation, the focal length of the ring-type nanojet lens can be derived as a function of the core radius, $R_1$ and nanojet beam radiation angle, $\theta_B$, defined by equation (3). Under assumption that the nanojet radiation angle remains constant for any combination of the ring-type lens height and radii, the focal length of the ring-type lens can be estimated as:

$$F=R_1/\tan(\theta_B), \qquad \text{(equation 5)}$$

where F is the distance from the lens bottom to the point with maximum field intensity (FIG. 16 (a)).

According to equation (5), in case of a hollow ($n_1=1$) ring-type nanojet lens embedded in a host medium with a refractive index $n_2=1.49$, ($\theta_{TIR}\approx42°$), the focal length is estimated as $$F \approx R_1 \bigg/ \tan\left(\frac{90° - 42°}{2}\right) \approx 2.25 R_1.$$

As may be seen in FIG. 17, the actual value of the focal length (defined based on the position of a point with a maximum field intensity value) and the length of the nanojet beam can vary depending on the size and shape of the ring-type cavity. The family of four curves in FIG. 17(a) represents the power density distribution along z-axis for the ring-type lens having a fixed ring dimensions ($R_1=370$ nm, $W=500$ nm) but different height along z-axis, defined by parameter $L_z$. For the lens with a height smaller (or larger) than the focal length, the hot spot is observed closer (further) than expected, with the best agreement observed for the lens with height close to the focal length $L_z\sim F$. Note that all curves in FIG. 17(a) are superimposed in such a way that the lens base position coincides for all configurations).

The increase of the beam length observed in FIG. 17 (a) is explained by the interplay between the nanojet and Fresnel-type focusing mechanisms. The contribution of the latter becomes noticeable because of the insufficient height of the cavity, which prevents formation of the nanojet beam (evidenced by a roughly twice smaller value of the peak power density).

Angle of Incidence

In case of an incline illumination, the nanojet beam angle tilts proportionally to the tilt of the incident wave propagation direction (see the FIG. 18).

Ring Width, W

The width of the ring-type cavity can alter characteristics of the nanojet beam. In particular, it can affect the focal length and beam shape of the ring-type nanojet lens.

Although the nanojet beam formation is associated with the base edge of the cavity, there exists a finite-size effective aperture responsible for its formation (see dashed lines in FIG. 14(b)). This aperture extends to about one half of the wavelength in corresponding media on both sides from the lateral surface of the core cylinder. Thus, a minimum recommended width of the ring-type cavity is estimated as $W \leq \frac{1}{2}\lambda_1$, where $\lambda_1=\lambda_0/n_1$.

Figure 19A:
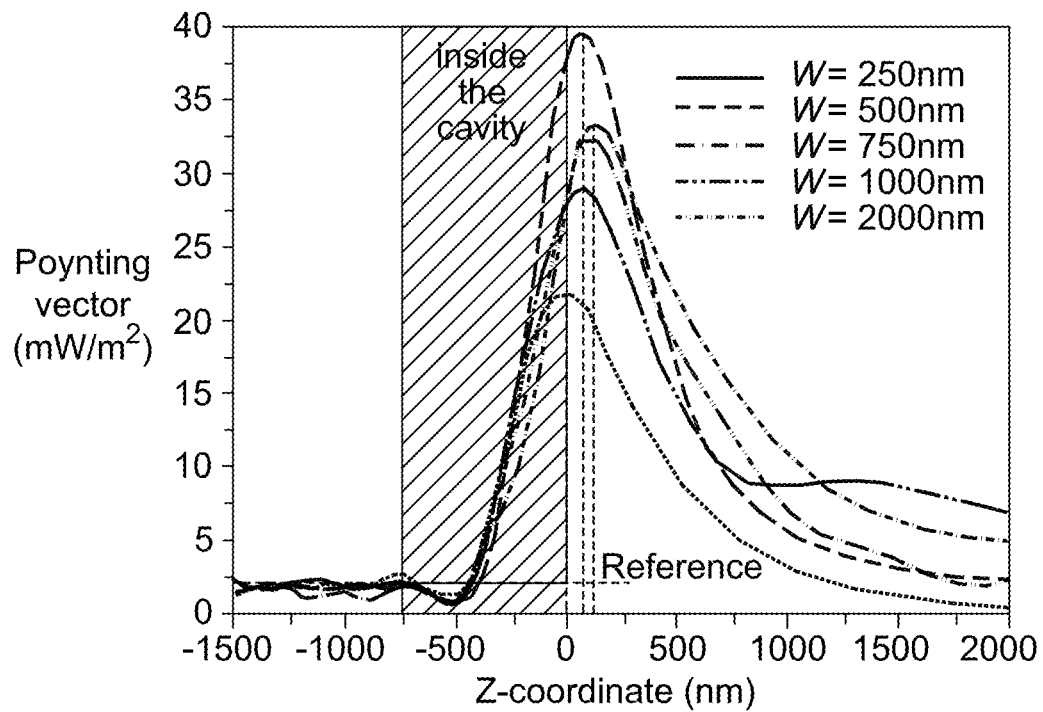
FIGS. 19(a), (b), (c), (d), (e), and (f) present different nanojet beams produced by ring-type lens, according to one embodiment of the disclosure, with dimensions $L_z=740$ nm, $R_1=370$ nm, refractive indexes ($n_1=1$, $n_2=1.49$) and variable width of the ring illuminated by a unit-amplitude plane wave with $\lambda_0=550$ nm: (a) power density distribution along z-axis, (b) maximum value of the power density along z-axis (curve referenced 190, left axis) and focal distance (curve referenced 191, right axis) versus width of the ring, (c-f) power density distributions in the xz-plane for W=250, 500, 750, and 1000 nm.
Figure 19B:
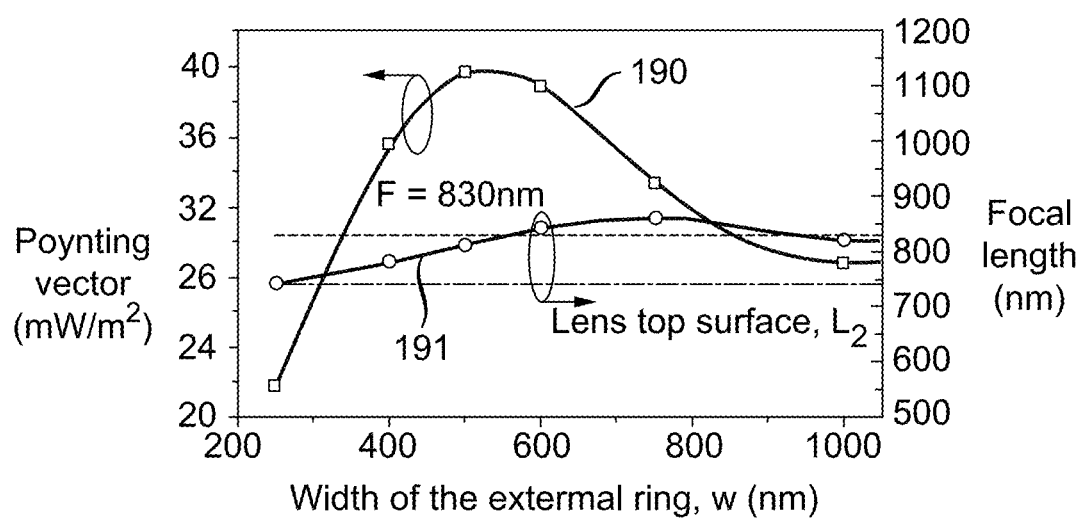
Figure 19C:
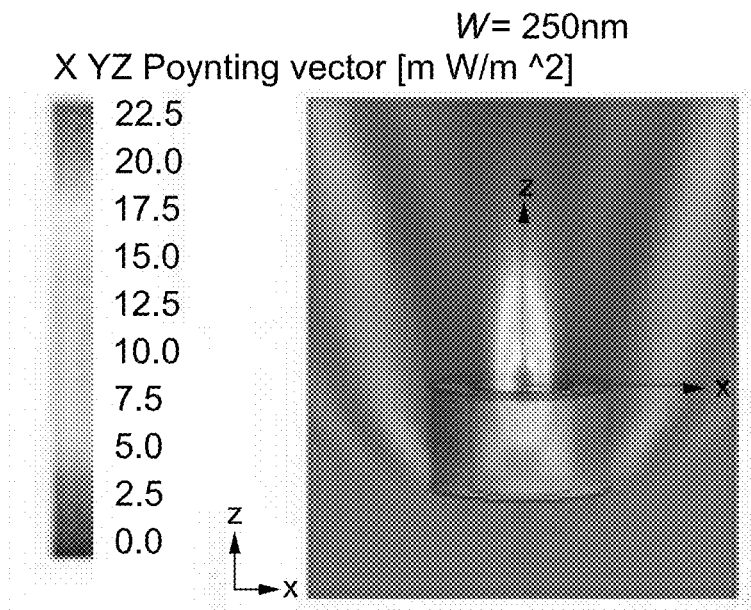
Figure 19D:
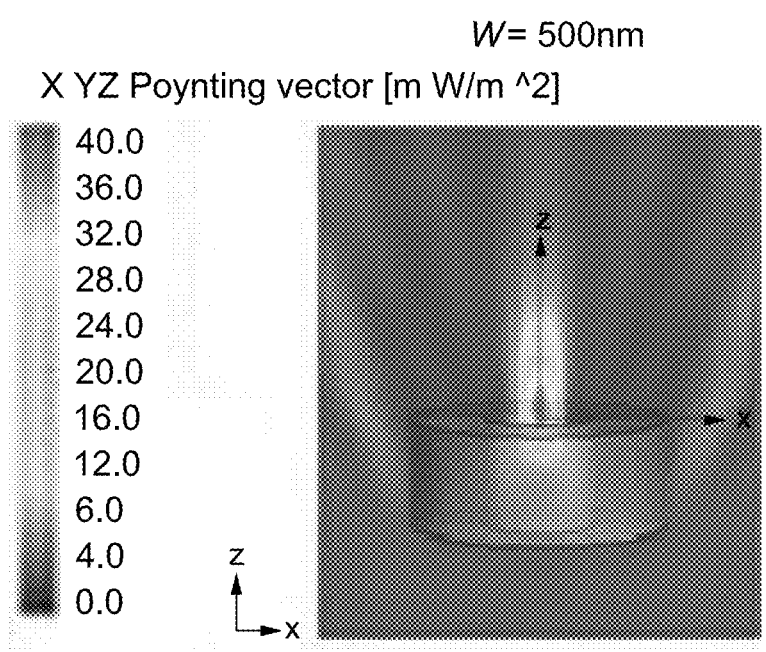
Figure 19E:
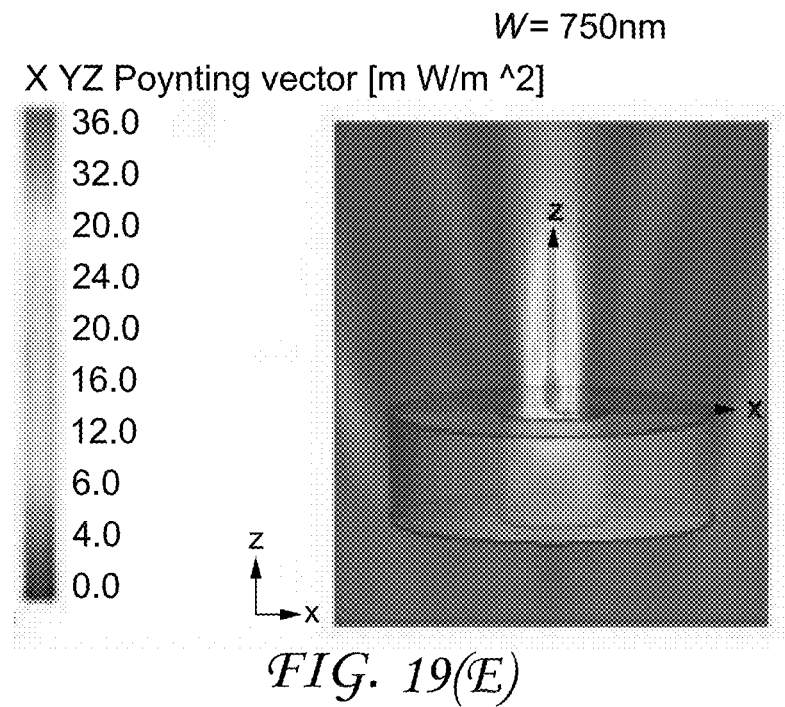
Figure 19F:
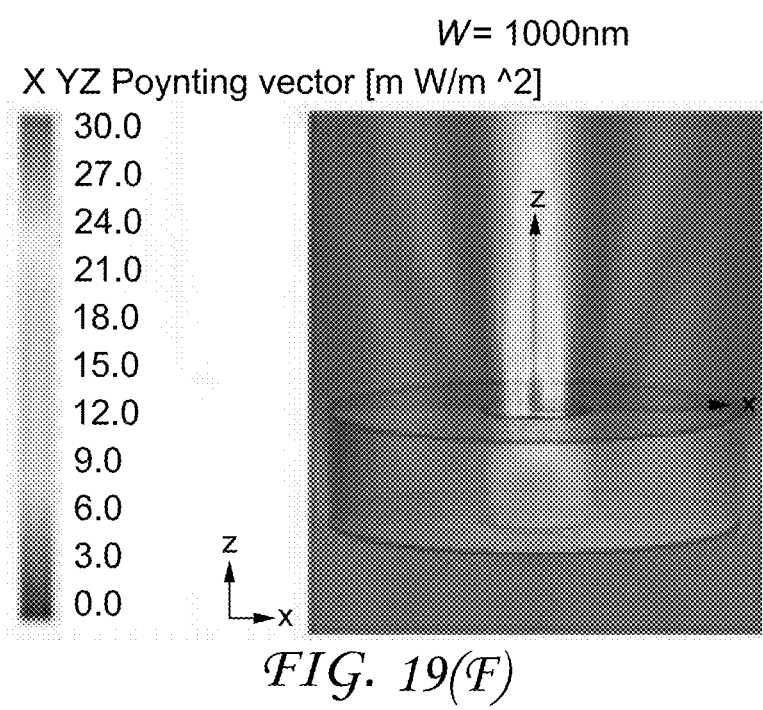
Figure 20A:
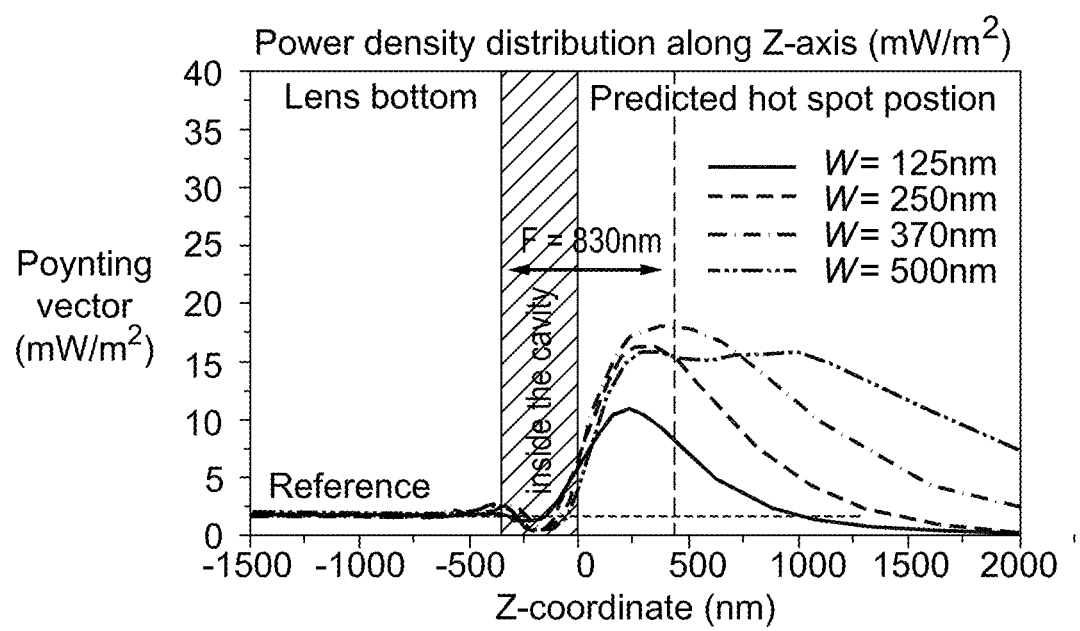
FIGS. 20(a), (b), (c), (d), and (e) present different power density distributions for the ring-type nanojet lens, according to one embodiment of the disclosure, with dimensions $R_1=370$ nm, $L_z=370$ nm, refraction indexes ($n_1=1$, $n_2=1.49$), and variable width of the ring illuminated by a unit amplitude plane wave with $\lambda_0=550$ nm: (a) along z-axis, (b-e) in xz-plane for W=125, 250, 370, and 500 nm, respectively.
Figure 20B:
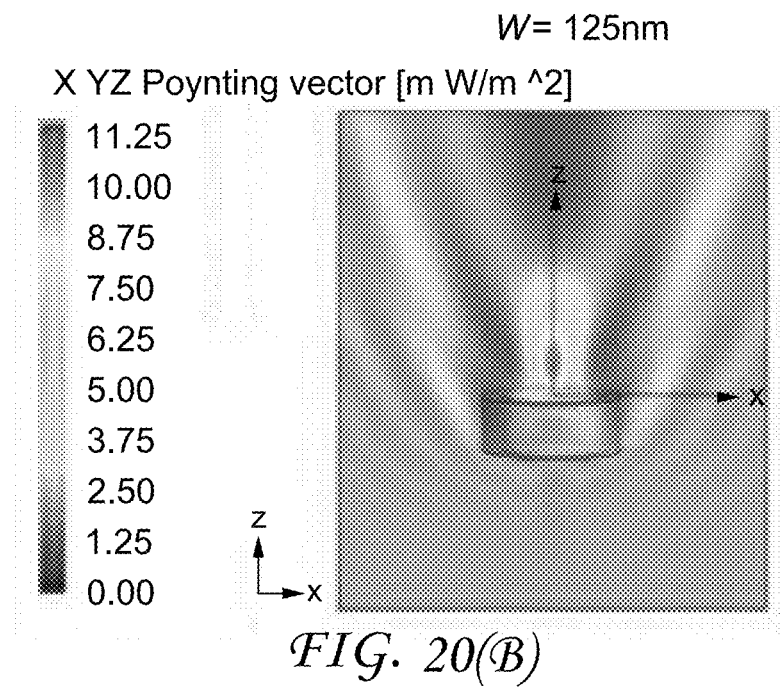
Figure 20C:
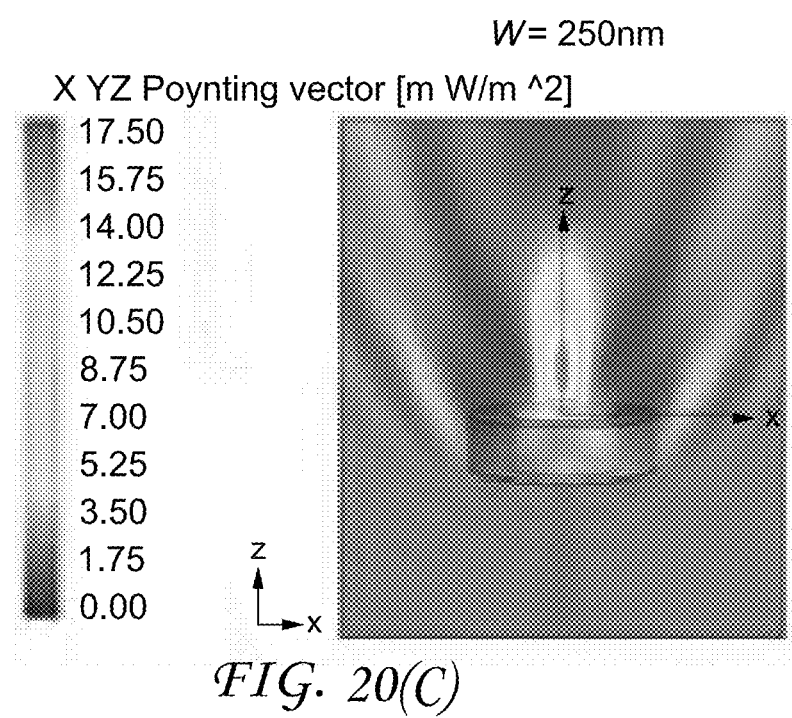
Figure 20D:
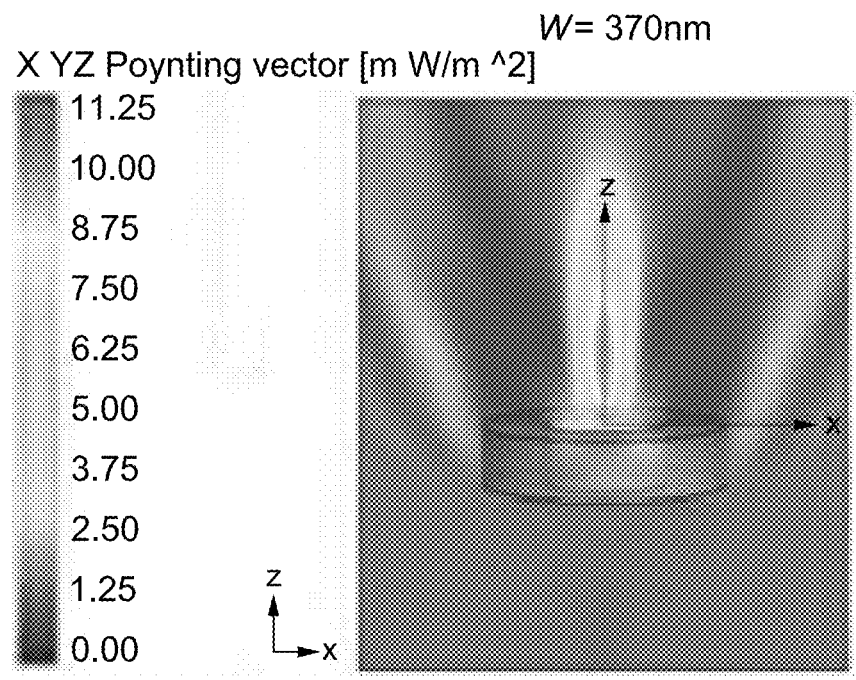
Figure 20E:
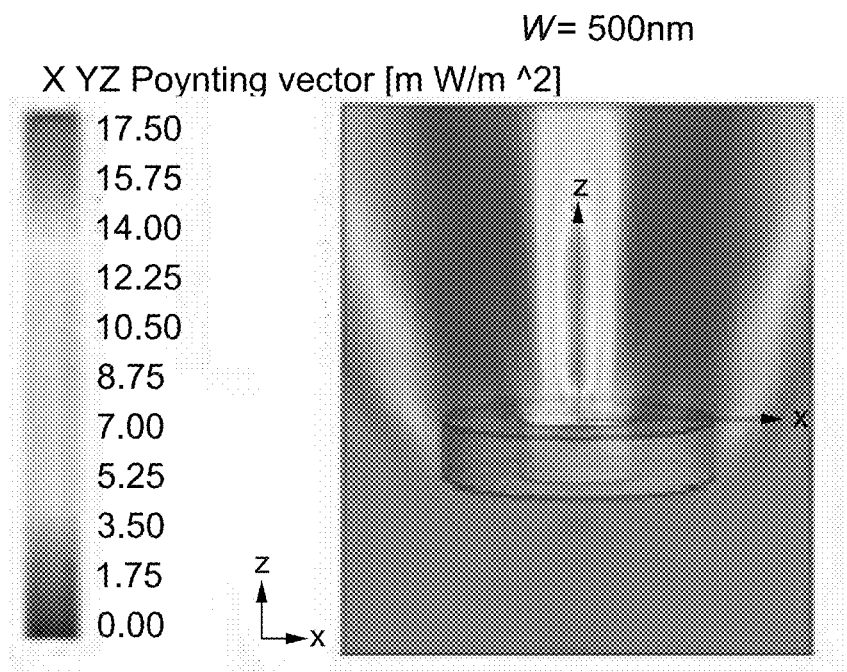

An oversized ring can also affect the nanojet beam formation because of two phenomena associated with the overall size of the ring-type cavity, namely: (i) internal reflections inside the ring-type cavity and (ii) Fresnel-type focusing effect associated with the diffracted waves originating from the top surface of the ring-type cavity. Empirical analysis suggests the upper limit of the width such as $W \approx 3\lambda_1$. For larger rings, the contribution of the ring can become dominant, thus masking the nanojet phenomenon. However, if needed (e.g. for technological needs), the ring width can be enlarged rather arbitrarily without spoiling the nanojet phenomenon (FIG. 19a).

Moreover, for each size (height and radius) of the core cylinder, the size of the ring-type cavity can be optimized in order to:

increase the field intensity in the hot spot (FIG. 19), change the length of the nanojet beam (FIG. 20).

Note that the effects related to the height and width of the ring-type are more narrowband than the nanojet beam phenomenon (FIGS. 21 and 22).

Field Intensity Enhancement by Combining the Nanojet and Fresnel Focusing Effects The impact of the ring width on the maximum field intensity in the hot spot of the ring-type nanojet lens is illustrated in FIG. 19. Here, in FIG. 19 (a), one can see the power density distribution along z-axis for the lens with a fixed core size ($L_z$=740 nm, $R_1$=370 nm) and variable width of the ring. For convenience, the maximum values of the power density observed for different width of the ring are plotted in FIG. 19 (b) together with the hot spot position. The corresponding near-field patterns are given in FIGS. 19 (c)-(f). As we can see, the maximum power density of ~40 mW/m 2 is achieved for the ring width W≈500 nm (i.e. about one wavelength inside the cavity). According to equation (2), the corresponding field intensity enhancement is FIE≈20 a.u. that is 10 times higher than that observed for the hollow cylindrical cavity reported in FIG. 5.

Length of the Nanojet Beam

The impact of the ring width on the length of the nanojet beam is illustrated in FIG. 20. Here, a small height of the lens prevents effective generation of the nanojet beams that is evident by a much lower field intensity compared to larger size lenses reported FIG. 19. Because of this, the contribution of the Fresnel-type focusing mechanism becomes comparable to the nanojet phenomena. As a result, a longer beam with two maxima along z-axis is created.

Bandwidth of the Nanojet and Fresnel-Type Beam Forming Effects

The difference in the physical mechanisms behind the nanojet and Fresnel-type focusing mechanisms results in a different bandwidth of these two phenomena.

The well-known Fresnel type focusing is based on the interference of the diffracted waves originating from the top surface of the ring cavity. Interference of the waves produced by different segments of the ring top surface can lead to the formation of multiple hot spots and beams corresponding to different diffraction orders. Thus, the radiation direction of these beams, as well as positions of the hot spots, strongly depend on the wavelength of the incident wave. On the opposite, the nanojet beams are created independently at each segment of the cavity base edge line. Because of these, the position and shape of the nanojet beam created on the optical axis of the ring-type lens as a result of recombination of nanojet beams produced by different segments of the cavity base edge line, is less sensitive to the incident wave wavelength.

The difference in the dispersive behavior of both types of the focusing mechanisms is illustrated in FIGS. 21 and 22. In FIG. 21, lens dimensions correspond to the case, when its behavior is defined by a superposition of the Fresnel type and nanojet phenomena (this configuration corresponds to the one studied in FIG. 20(e)). Because of this, a significant variation of the nanojet beam length is observed versus wavelength. On the opposite, in FIG. 22, lens dimensions are selected so that the beam shape is well preserved for the entire wavelength range (this configuration corresponds to the one studied in FIG. 19(d)). Such a behavior evidences for the dominant role of the nanojet effect in the formation for the beam.

External Ring Shape, $S_2$

The external shape of the ring can be selected rather arbitrarily.

As we can see in FIG. 23, the variation of the shape of the ring external boundary of the ring (defined by $S_2$) produces only a minor impact on the nanojet beam. For instance, the transformation of the external cylinder cross-section from circular to rectangular results only in a minor decrease (~10%) of the field intensity in the focal spot, whose position remained nearly unchanged for both configurations.

A larger impact can be expected for certain configurations of ring-type lenses, when its performance is defined by an interplay of the Fresnel-type and nanojet phenomena (not shown).

Core Size, $R_1$

The core size is a key parameter of the ring-type nanojet lens. This parameter determines the hot spot position along z-axis and peak field intensity in the nanojet beam region.

Figure 24A:
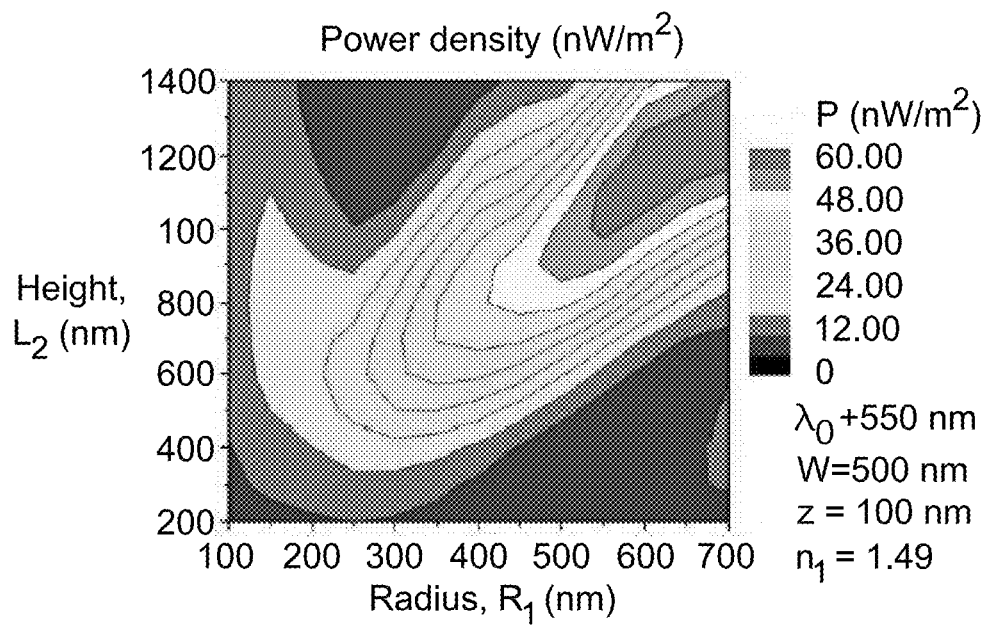
FIGS. 24(a) and (b) disclose the contour plots of the power density in a fixed point (0,0,100 nm) located close to the ring-type lens top surface versus lens core radius and height. The lens has a fixed width is of the ring $W=500$ nm and is illuminated by a unit-amplitude plane wave. The refraction indexes of the media: (a) $n_1=1$, $n_2=1.49$, (b) $n_1=2.0$.
Figure 24B:
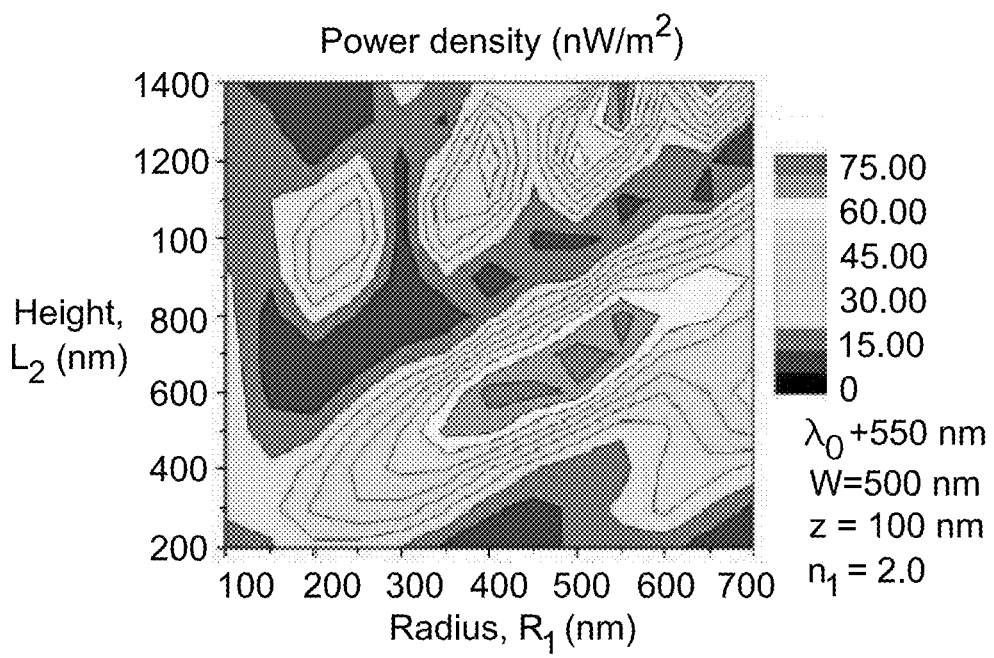

The radius of the core cylinder defines the length and curvature of the edge line and thus the total effective aperture of the nanojet lens. The longer the edge, the more power is trapped and guided towards the nanojet beam, thus increasing the field intensity in the focal spot. In case when the core, substrate, and superstrate are of the same material ($n_2$=$n_3$=$n_4$, see FIG. 15 for notations), a linear increase of the field intensity versus the core cylinder radius is observed (FIG. 24). In case of a ring-type lens structure comprising a stack of several layers of different materials, internal reflections inside the core can appear and alter the nanojet beam formation conditions. The larger the index ratio and the larger the core dimensions, the stronger is a possible impact of internal reflections (i.e. the larger the number of resonant modes that can be supported inside the core cylinder and the higher the quality factors of these modes).

Optimal Combination of the Lens Height and Radius & Impact of the Host Media Material The optimal ratio between the core height and radius as well as the estimated FIE due to the nanojet focusing effect, is a function of the index ratio between the lens core and cavity materials. The full wave analysis of the ring-type nanojet lens with a hollow ring ($n_1$=1) embedded in an unbounded host medium with refractive index $n_2$=1.49 revealed that maximum field intensity is achieved for $L_z/R_1$=2 (FIG. 24(a)). The corresponding field intensity enhancement is estimated as FIE~18 $R_1/\lambda_1$ [a.u.] (valid at least for ½<$R_1/\lambda_2$<2). In case of $n_1$=2.0, the optimal ratio is defined as $L_z/R_1$=1.4 (FIG. 24(b)). The corresponding field intensity enhancement is estimated as FIE~16 $R_1/\lambda_1$ [a.u.] (valid at least for ½<$R_1/\lambda_2$<3).

Core Shape, $S_1$

The shape of the core cylinder can be selected rather arbitrarily and optimized in order to provide a desired shape and size of the nanojet beam (FIGS. 25 and 26).

Figure 27:
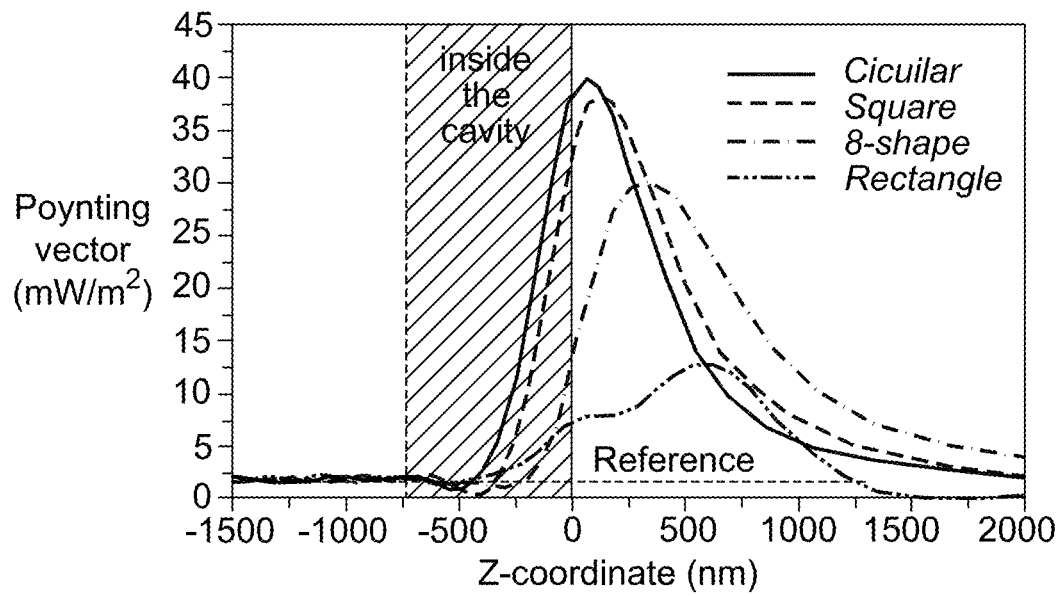
FIG. 27 presents different power density distribution along z-axis (x=y=0) for the ring-type nanojet lenses with different cross-sections of the core cylinder presented in FIG. 26.
Figure 28A:
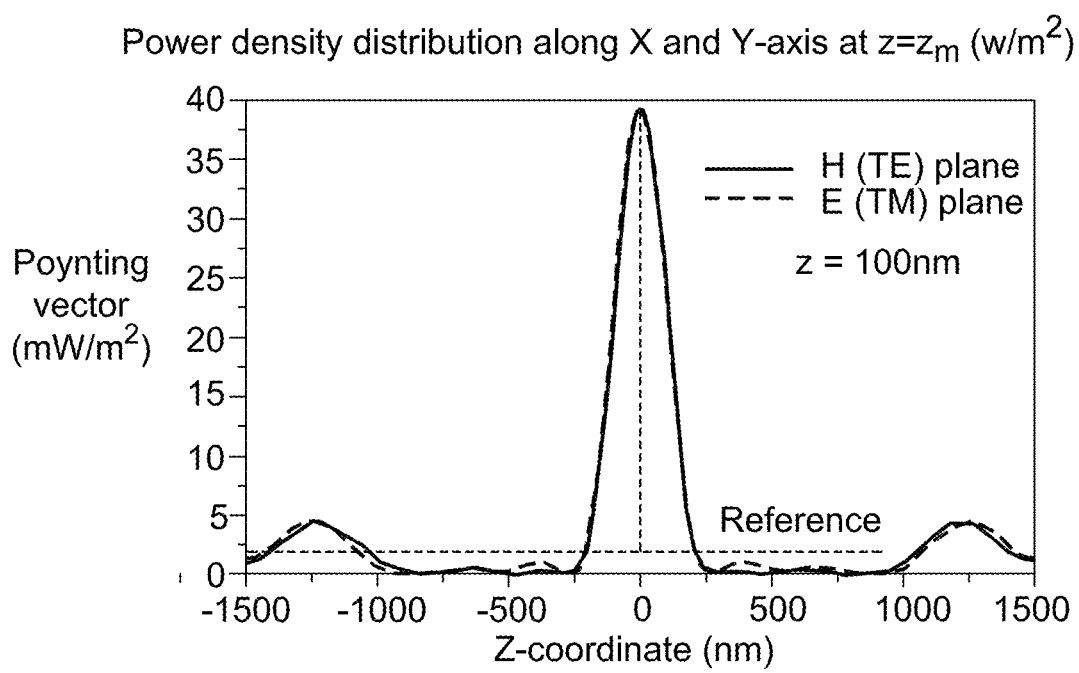
FIGS. 28(a), (b), (c), and (d) present different power density distributions along xz and yz-axis for the ring-type nanojet lenses with different cross-sections presented in FIG. 25.
Figure 28B:
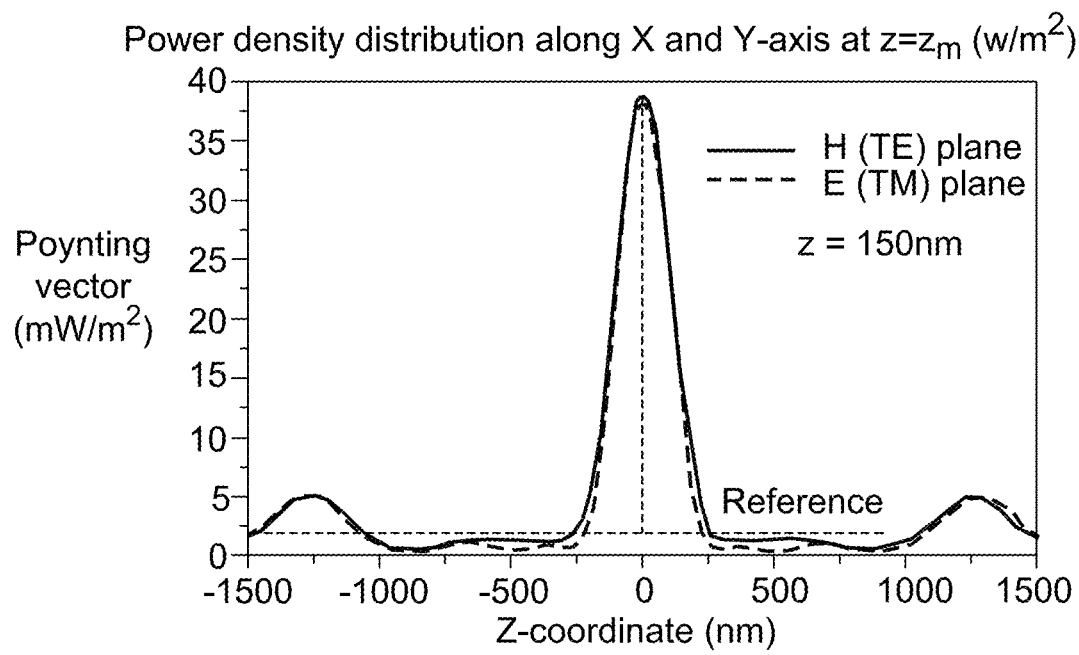
Figure 28C:
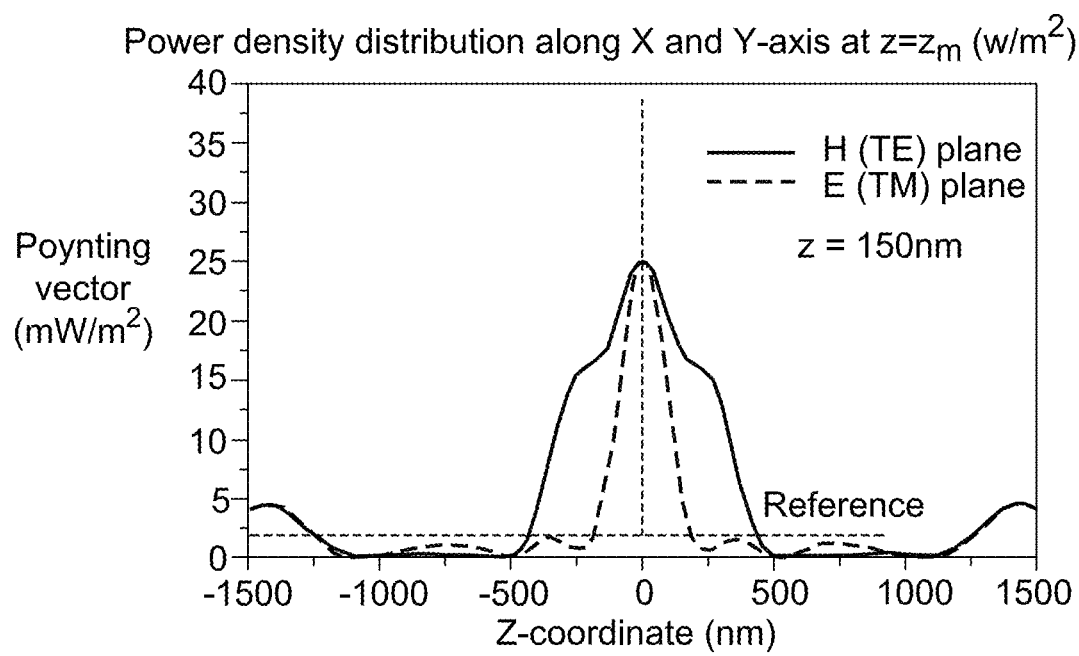
Figure 28D:
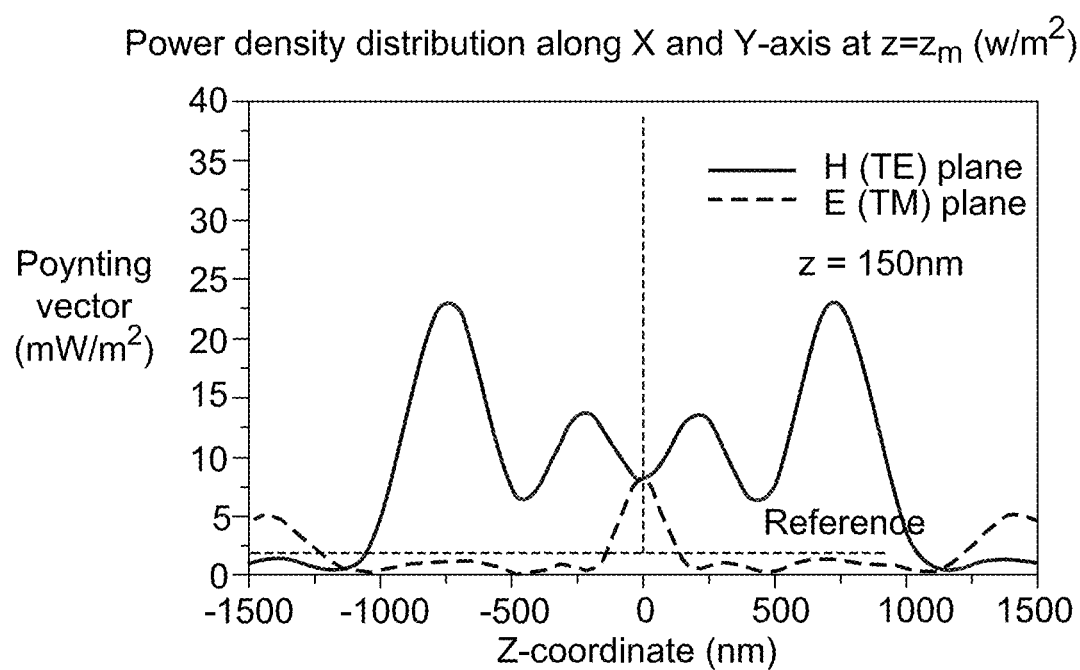

Modification of the core shape of the ring-type nanojet lens enables one to modify the partial contributions of the nanojet beams associated with different segments of the core base edge line. A few exemplary embodiments of the ring-type nanojet lens with cores of a different shape are illustrated in FIG. 25. The beams contributing to the formation of the central nanojet beam are shown schematically by dashed lines. The corresponding power density distributions for each configuration are shown in FIGS. 26-28. As we can see in FIGS. 26(a) and 26 (b), the transformation of the core cylinder cross-section from a circle to square has only a minor (~10%) impact on the maximum value of the power density in the hot spot (best seen in FIG. 27), whereas the hot spot position and beam symmetry are well preserved for both circular and square configurations (FIGS. 28(a) and 28(b)). As we can see in FIGS. 26 (c) and 26 (d), the transformation of the circular core into a more complex 8-type and bar-type shapes results in the formation of asymmetric beams, whose shape reproduces the shape of the core. Apart from the nanojet beam width and length, the transformation of the core shape also affects the maximum power density in the hot spot of the nanojet beam (FIG. 27). As expected, the maximum value is observed for the circular core (thanks to its symmetry) and the lowest for the lens with a bar-type rectangular core. The cross-sectional views of the beams for each configuration are shown in FIG. 28.

Figure 29:
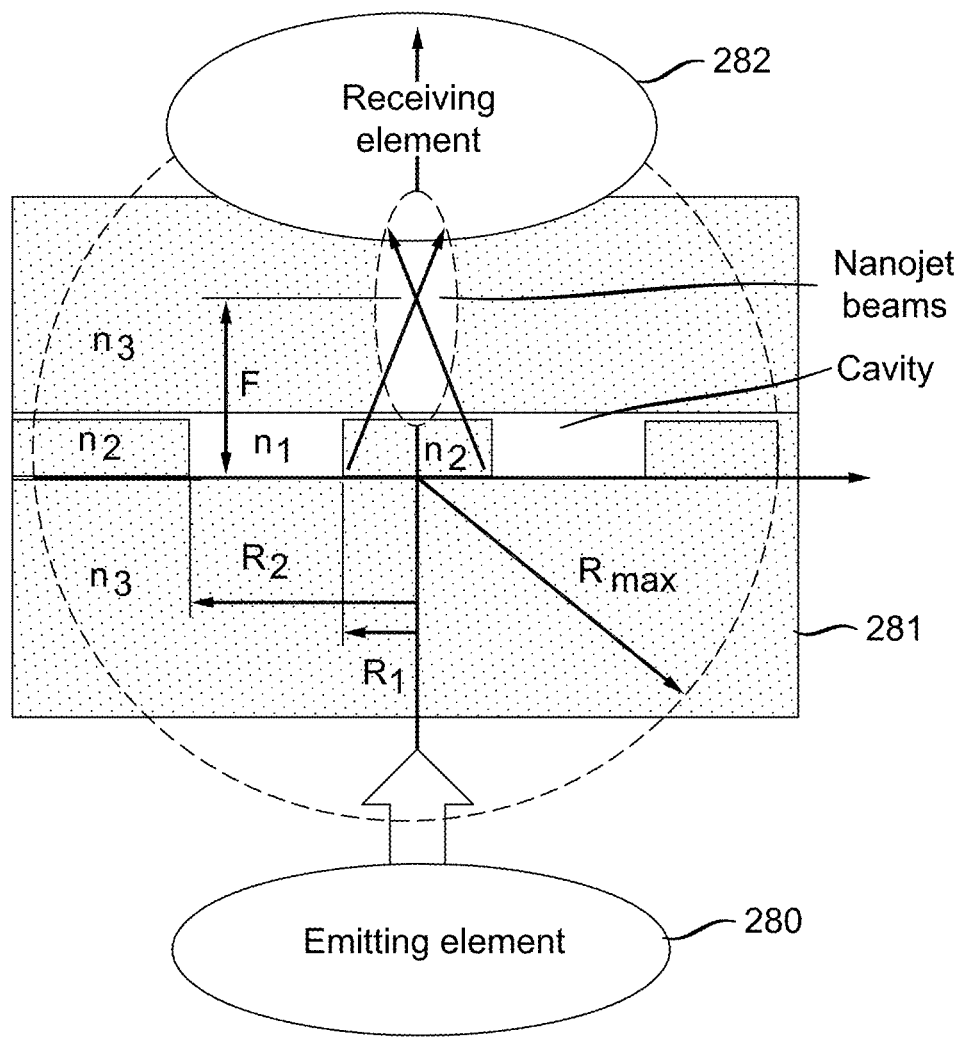
FIG. 29 presents a schematic drawing of a use scenario of a nanojet focusing component (or device for forming at least one focused beam in a near zone) according to one embodiment of the disclosure.

FIG. 29 presents a schematic drawing of a use scenario of a nanojet focusing component (or device for forming at least one focused beam in a near zone) according to one embodiment of the disclosure.

In such embodiment, the emitting element referenced 280 can be any source of the electromagnetic radiation (e.g. visible light) positioned in the near or far zone. The electromagnetic waves, generated by the emitting element 280, can reach the nanojet focusing element referenced 281 (being part of a device for forming at least one focused beam in a near zone or being such device for forming at least one focused beam in a near zone) via free space propagation or through a wave guiding elements, e.g. optical fiber or a glass plate acting as a 2D light guiding structure. Indeed, in one embodiment of the disclosure, it is possible to put, at the position where the nanojet beam is focused, another first and second elements.

A receiving element referenced 282 must be located within a certain distance $D \leq R_{max}$ from the nanojet focusing element 281. The optimal distance depends on the focal length and the nanojet beam shape. It can vary from 0 to a few wavelengths. The value of $R_{max}$ is to be defined depending on the specifications for the systems functionality that can be formulated, for instance, in terms of an acceptable field intensity enhancement. A typical value of $R_{max}$ is estimated as 3 to 10 wavelengths.

In one embodiment of the disclosure, the receiving element 282 can be one of the following element:
- a detector, e.g. a photodiode (for example to be used in optical sensors in photo cameras);
- another focusing, beam-forming or light-guiding element, e.g. lens, grating, optical fiber, etc. (AR/VR glasses, light communication, etc.),
- a target, e.g. quantum dots, nanoparticles or molecules inside a water or blood solution (spectroscopy, microscopy or lab-on-chip device).

It should be noted that, in one embodiment of the disclosure, the nanojet focusing element 281 comprises a multi-layer structure with "cavity(ies)" on one or both surfaces of the sealed substrates. In some configurations, these structures can be directly attached to either the receiving and/or emitting elements.

In one embodiment of the disclosure, the emitting element 280 can handle:
- ambient light coming from a source located far away via free space propagation or through a light guiding system,
- light produced by a local source directly attached to the nanojet component (e.g. photodiode or optical fiber),
- optical beam produced by another focusing element.

It should be noted, that in one exemplary embodiment, the ring-type nanojet lens previously mentioned can be fabricated in a form of a multi-layer structure comprising three layers, namely: (i) glass plate, (ii) thin film with perforated apertures made of an optically transparent photoresist or phase change material, and (iii) another glass plate. Such a structure can be fabricated via photolithography. In another embodiment, the lens can comprise only two layers. For instance, it can be fabricated in an optically transparent plastic and comprising one plate with hollow cavities engraved on its surface attached to another plate using a glue or molecular adhesion. Such a structure can be fabricated, for instance, via a direct laser beam writing method, replication, or molding. This embodiment is potentially more suitable for mass production. The manufacturing processes are given as mere examples, in order to highlight the fabrication feasibility of the device according to the present disclosure, using established microfabrication methods. However, some other manufacturing methods may also exist, or be better suited for a mass production.

Although the top layer (superstrate) is not absolutely required for the generation of the nanojet beams, it provides a twofold potential advantage for the nanojet-based focusing devices.

First, it enables integration of the lens with other components of the optical system (e.g. optical sensors in photo cameras or other light-guiding and beam-forming components inside a dielectric wave guiding system, like in case of AR glasses). Direct integration can help avoid the problems related to the alignment between different components of the focusing system.

Second, the superstrate prevents excitation of the internal reflections inside the core cylinder of the ring-type lens that can, otherwise, spoil the nanojet beam forming phenomenon However, if needed (e.g. for technological needs or design constrains) the superstrate can be removed, subject for a possible degradation of the lens performance due to the internal reflections FIG. 30 presents two different views of a second element according to one embodiment of the disclosure.

These views present at least three parameters associated with said second element that can control the shape and the orientation of the focused beam: the length and the curvature of the edge line segment associated with the base surface, and also the values of the base angles associated with opposite edge line segments.

Figure 31:
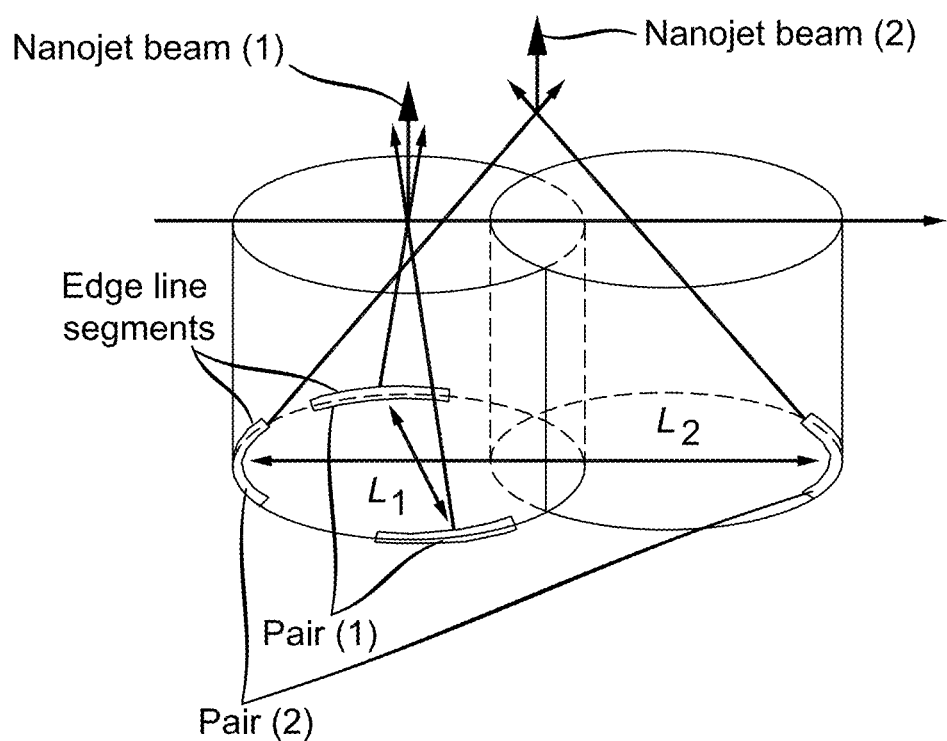
FIG. 31 presents a second element according to one embodiment of the disclosure whose base edge line comprises (at least) two pairs of opposite edge line segments contributing to creation of (at least) two nanojet beams.

FIG. 31 presents a 3D view of a second element according to one embodiment of the disclosure, representing two pairs of opposite edge line segments contributing to the formation of two independent nanojet beams. In case of $L_1 \approx L_2$, the two nanojet beams can recombine in a single beam having a more complex shape (e.g. see FIG. 26(c)). In case of $L_1 \ll L_2$, the nanojet beam (2) may appear at a longer distance from the top surface of the element and have a much lower field intensity value that for nanojet beam (1). For instance, such a situation may occur for $L_2 > 5\lambda$, where $\lambda$ is a wavelength in the host medium (i.e. inside the cavity).

Figure 32:
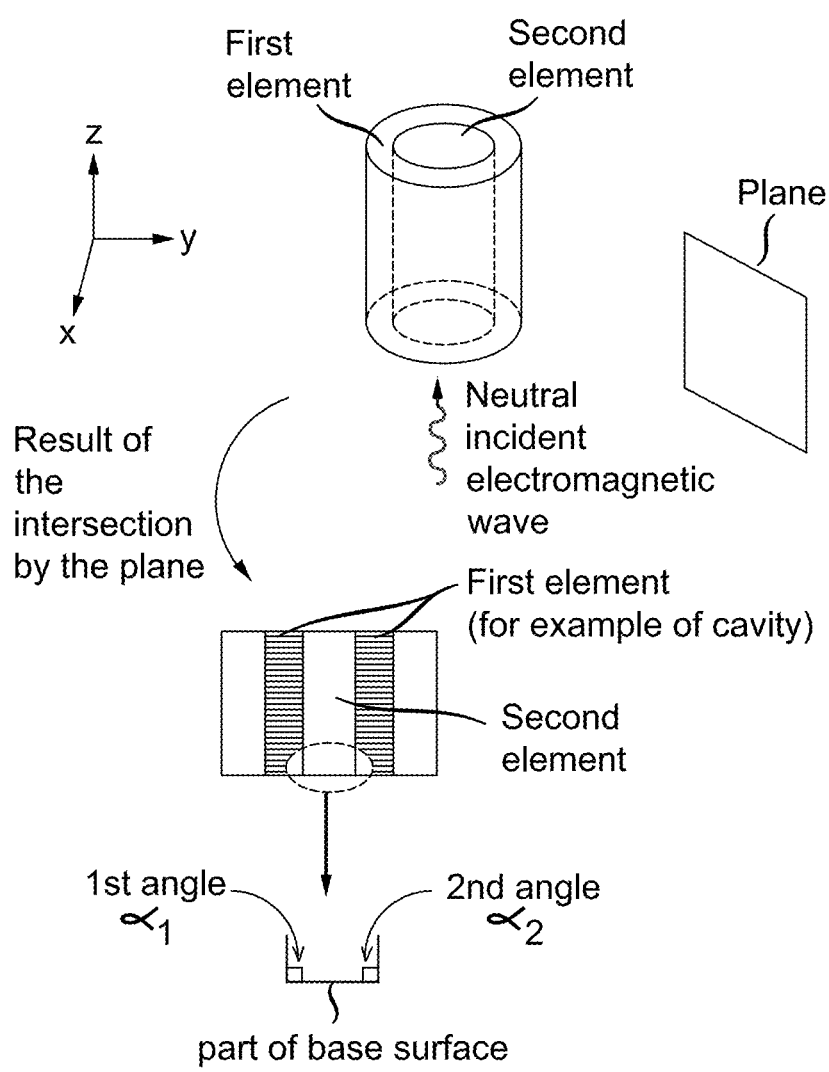
FIG. 32 presents the intersection of a part of the device according to the disclosure by a plane that is parallel to the propagation direction of an incident electromagnetic wave (and more precisely in that case with a normal incident electromagnetic wave with regards to the bottom of dielectric layer)
Figure 33A:
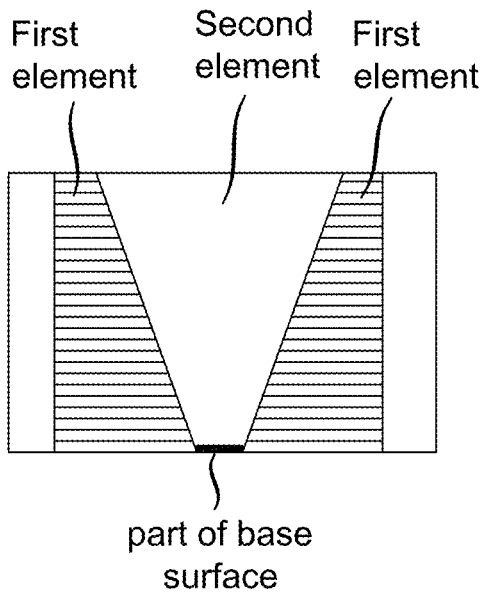
FIGS. 33(a), (b), (c), and (d) present different resulting intersections of a part of the device according to the disclosure, by a plane that is parallel to the propagation of an electromagnetic wave (and more precisely in that case with a normal incident electromagnetic magnetic wave with regards to the bottom of dielectric layer)
Figure 33B:
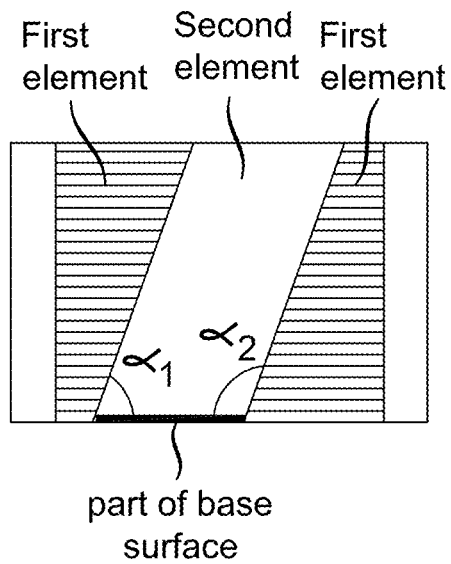
Figure 33C:
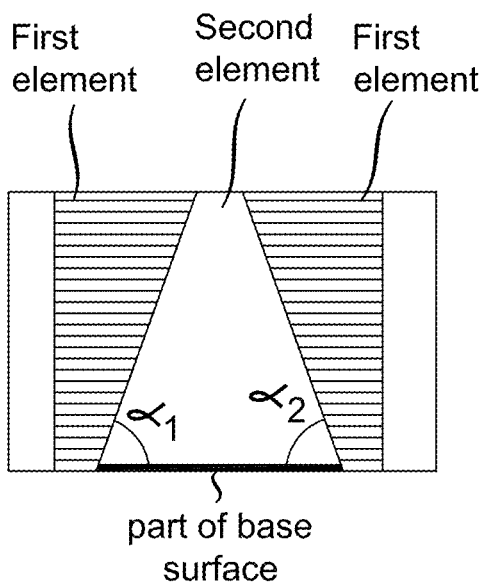
Figure 33D:
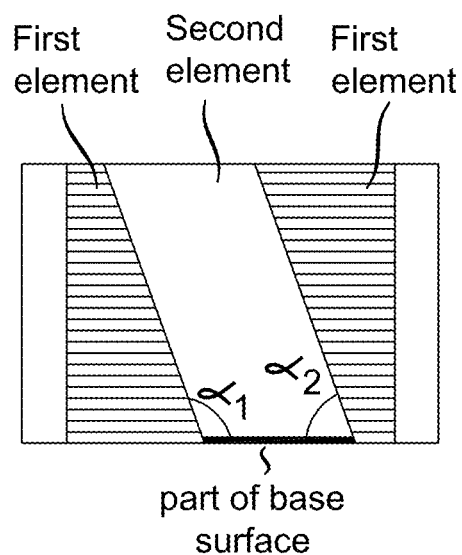

FIG. 32 presents the intersection of a part of the device according to the disclosure by a plane that is parallel to the propagation of an incident electromagnetic wave (and more precisely with a normal incident electromagnetic magnetic wave with regards to the bottom of dielectric layer).

FIGS. 33 (a)-(d), present different resulting intersections of a part of the device according to the disclosure, by a plane that is parallel to the propagation of an incident electromagnetic wave (and more precisely with a normal incident electromagnetic magnetic wave with regards to the bottom of dielectric layer).

It should be noted that the nanojet beams generated thanks to the interference of the two parts of the wave fronts of the incident wave propagating through the base of the first and second elements recombine all together inside the second element giving rise to a focused nanojet beam. In case of a normal incidence of the plane wave, for a lens having symmetrical cross-section and equal values of the previously mentioned base angles associated with opposite base edge line segments, a symmetrical nanojet beam is created on the optical axis of the lens with an orientation along this axis. It should be noted that, in case of an oblique incidence of the plane wave, the beam is tilted proportionally.

One skilled in the art, by varying the shape and size of the first and second elements and, in particularly, by varying the shape of the base edge line and associated base angles, could control the shape, position, and radiation angle of the nanojet beam(s). Hence, it is possible to control the focusing and beam forming characteristics of the nanojet focusing device according to selected parameters.

Figure 34A:
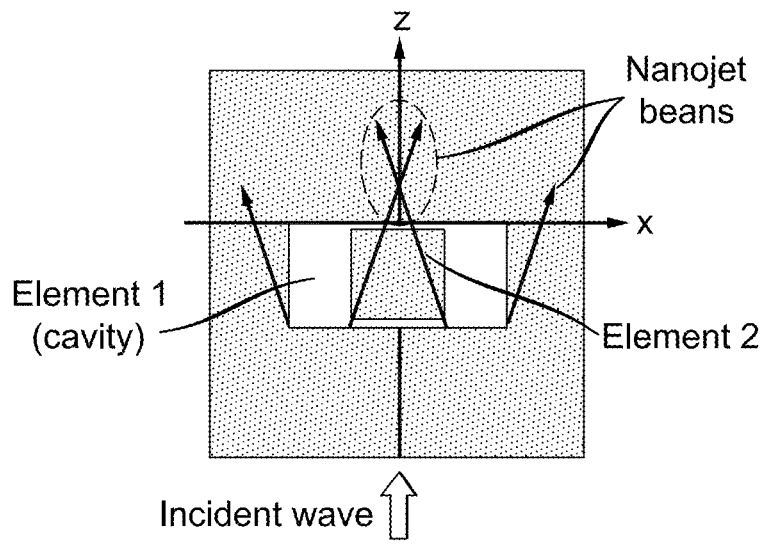
FIGS. 34(a), (b), and (c) present schematic drawings of the nanojet beams produced by a device (or ring-type nanojet element), according to one embodiment of the disclosure, that is illuminated by a unit-amplitude plane wave: (a) which is incident from below, along z-axis, (b) which is incident from left, along x-axis. The arrows from the first element indicate the nanojet beams.
Figure 34B:
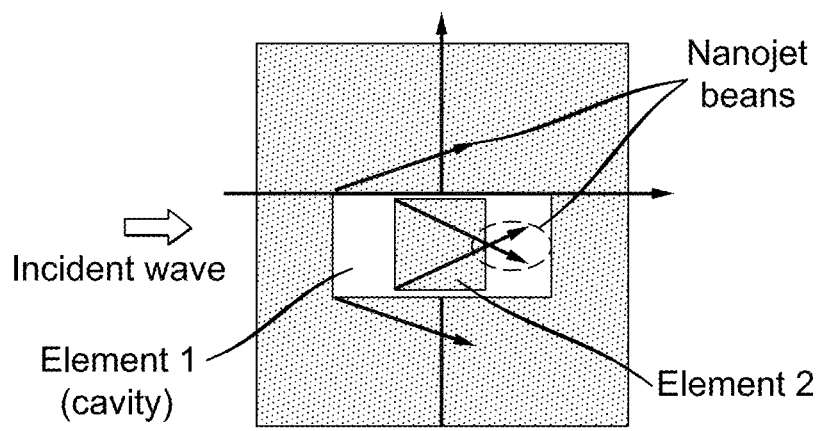
FIG. 34(c) presents the power density distribution in xz-plane when the device according to one embodiment of the disclosure (i.e. comprising the ring structure) is illuminated from the left (along x axis)

FIG. 34 presents schematic drawings of the nanojet beams produced by a device (or ring-type nanojet lens), according to one embodiment of the disclosure, that is illuminated by a plane wave: (a) which is incident from below, along z-axis, (b) which is incident from left, along x-axis. The arrows from the first element indicate the nanojet beams. FIG. 34(c) presents the power density distributions in xz-plane when the device according to one embodiment of the disclosure (i.e. comprising the ring structure) is illuminated from the left (along x axis).

Figure 35C:
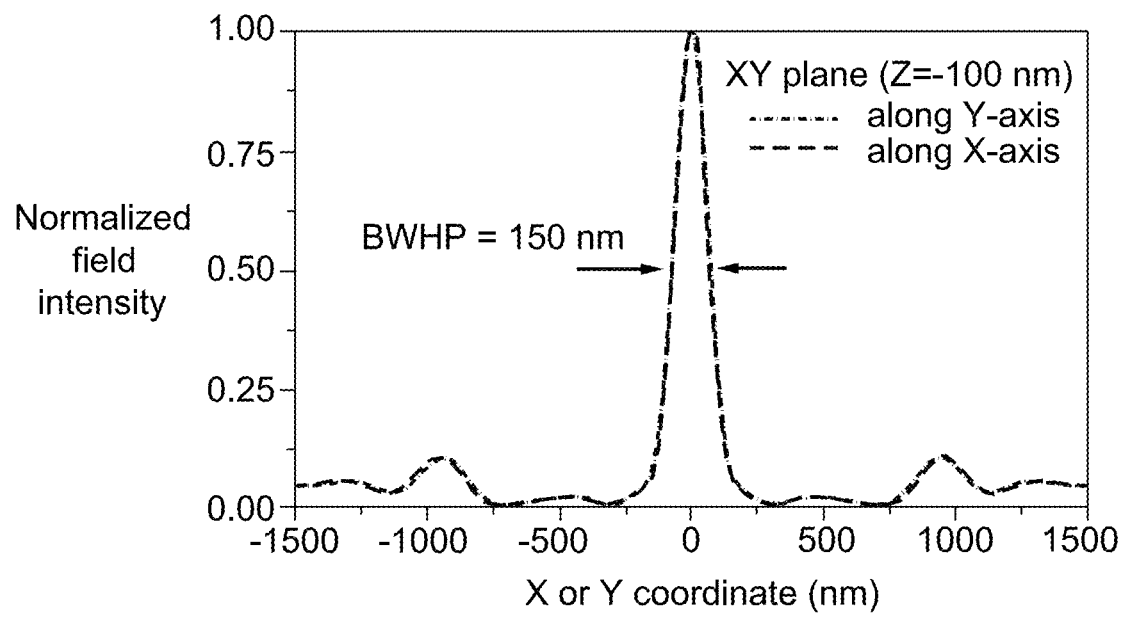
FIG. 35(c) presents a normalized field intensity distribution along X and Y axes at Z=−100 nm.
Figure 35D:
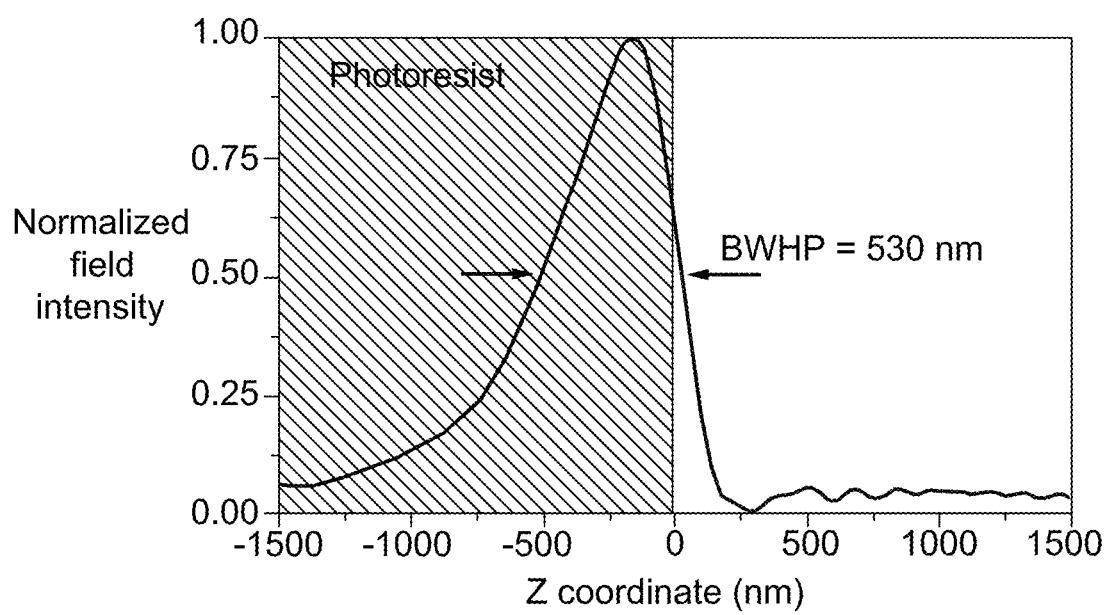
FIG. 35(d) presents a normalized field intensity distribution along Z-axis.

The FIG. 35 presents (a) a normalized field intensity in XZ-plane for the ring-type NJ microlens illuminated by a plane wave ($\lambda$=365 nm) with 20° incidence angle defined with respect to the vertical axis, and (b) a normalized field intensity distribution along X-axis at Y=0 nm, Z=−100 nm for two different incident angles of the plane wave, 0° and 20°. Parameters of the structure are the same as in FIG. 34.

Figure 36A:
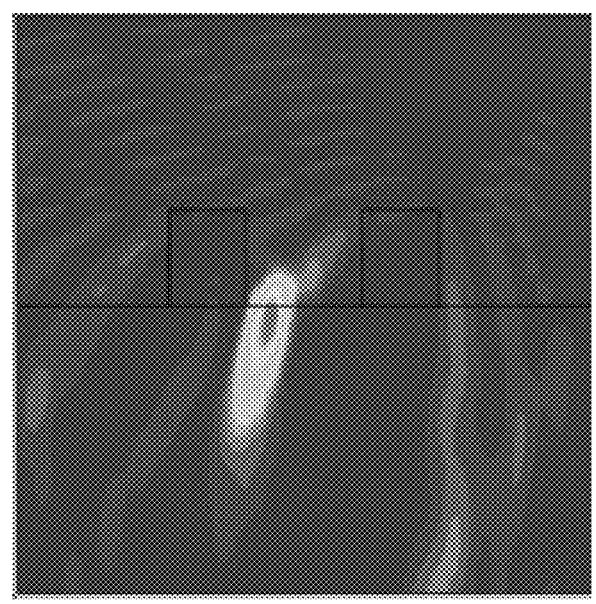
FIGS. 36(a) and (b) present (a) a normalized field intensity in XZ-plane for the ring-type NJ microlens illuminated by a plane wave ($\lambda$=365 nm) under 20° if defined with respect to the vertical axis, and (b) a normalized field intensity distribution along X-axis at Y=0 nm, Z=−100 nm for two different incident angles of the plane wave. Parameters of the structure are the same as in FIG. 35.
Figure 36B:
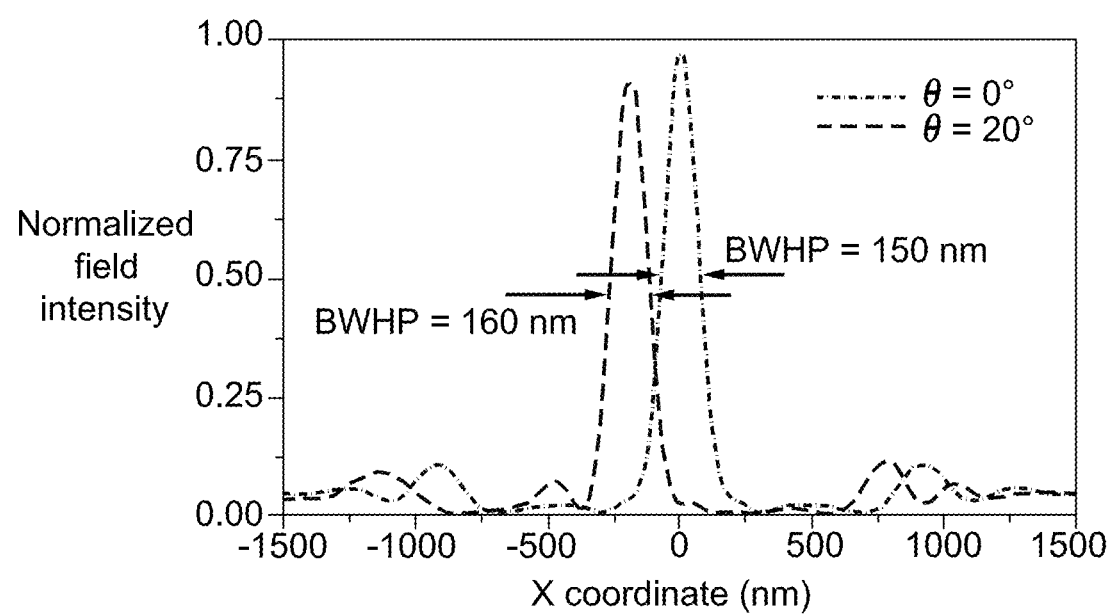

FIG. 36 illustrates a specific embodiment of the present disclosure, according to which the focusing component is based on a 2×2 array of hollow cuboids embedded in a host medium. FIG. 36a illustrates the topology of such a component, while FIG. 36b provides simulation results of the time-averaged power distribution when the component is illuminated by a unit-amplitude plane wave propagating along z-axis ($n_1$=1.49, $L_x$=$L_y$=$L_z$=2$\lambda_1$, S=0.5$\lambda_1$).

The component of FIG. 36a comprises four hollow cuboids ($n_2$=1) 140 embedded in an optically transparent host medium 112 with refractive index $n_1$>$n_2$. For instance, this can be a glass, plastic (e.g. PMMA), or polymer (e.g. PDMS (Polydimethylsiloxane)).

A nanojet beam is generated on the axis of the 2×2 array of hollow ($n_2$=1) cuboids 140 embedded in a homogeneous dielectric medium 112 with a refractive index $n_1$=1.49 that is a typical value for glass and plastics in the optical range. Analysis shows that, by optimizing the size, shape and relative positions of the cuboids with respect to the host medium refractive index and wavelength of the incident plane wave, a nanojet beam can be generated with the beam full width at half power (FWHP) of ~$\lambda$/2$n_1$ and FIE of at least a factor of 5.

Figure 37A:
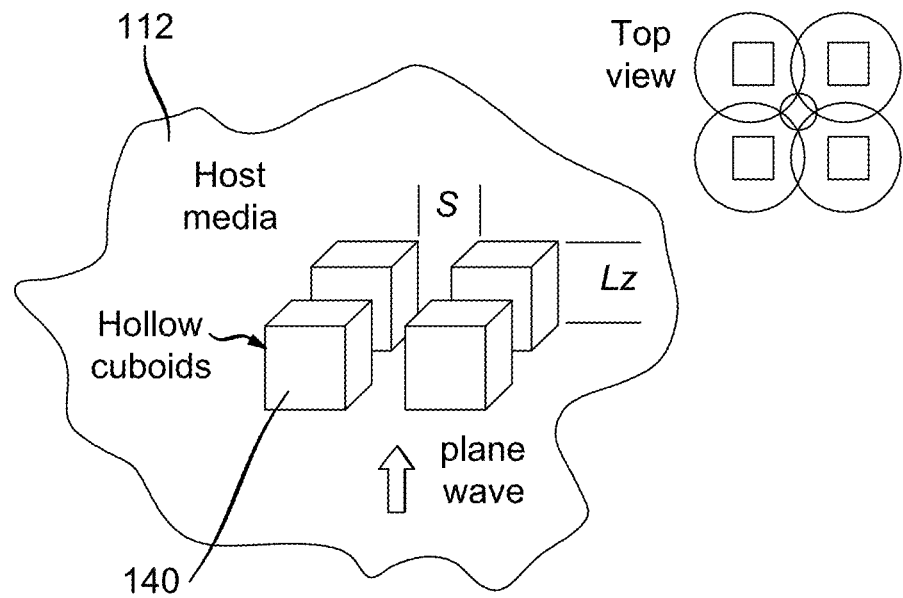
FIGS. 37(a) and (b) illustrate a specific embodiment of the present disclosure, according to which the focusing component is based on a 2×2 planar array of identical hollow cuboid-shaped cavities embedded in a host medium.
Figure 37B:
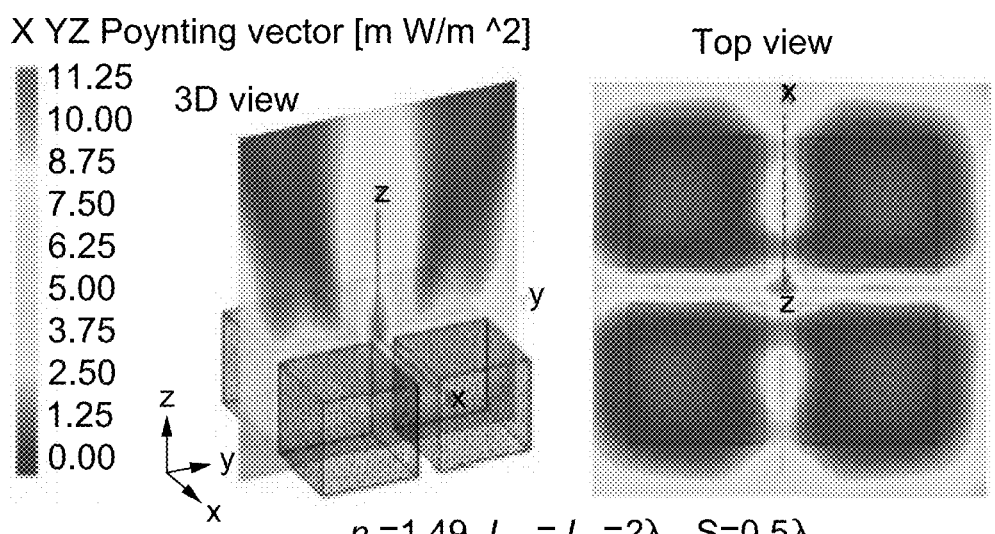

FIG. 37 illustrates an alternate embodiment of light guiding means, in which the hollow rectangular cuboids 140 are replaced with hollow cylinders 141, oriented along the plane wave propagation direction. As in FIG. 36, FIG. 37a illustrates the topology of such a component, while FIG. 37b provides simulation results of the time-averaged power distribution when the component is illuminated by a unit-amplitude plane wave propagating along z-axis ($n_1$=1.49, $L_z$=2$\lambda_1$, R=$\lambda_1$, S=0.5$\lambda_1$).

FIG. 38 illustrates yet another embodiment, in which a 2×2 array of hollow cylinders 141 is created at the boundary of the dielectric medium 112 and free space, e.g. on the surface of a glass or plastic plate. When illuminated by a plane wave from the media side, such a component produces a nanojet beam in free space close to the surface of the plate 112. This embodiment can be advantageous for applications that require an air gap between the focusing component and the object under test that is a typical scenario for optical data storage, microscopy, spectroscopy, and metrology systems.

Figure 38A:
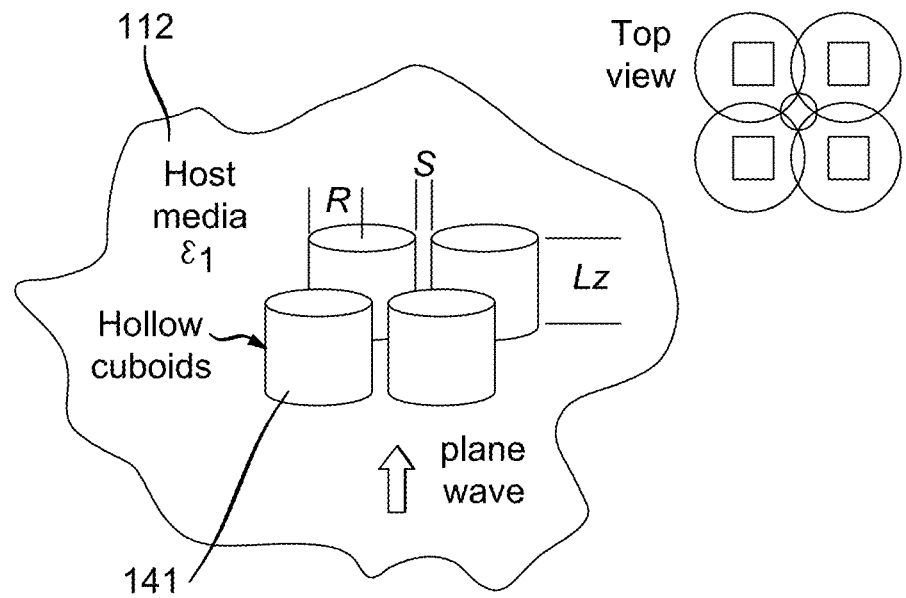
FIGS. 38(a) and (b) illustrate an alternate embodiment, in which the hollow cuboid-shaped cavities of FIG. 35 are replaced with hollow circular cylinders, oriented along the plane wave propagation direction.
Figure 38B:
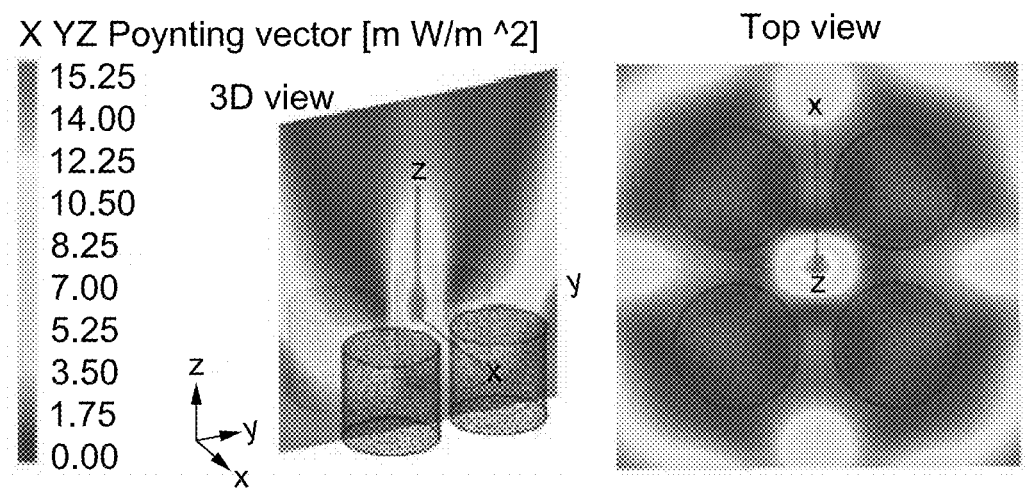

As in FIG. 37, FIG. 38a illustrates the topology of such a component based on a 2×2 array of hollow cylinders created at the interface of the dielectric medium and free space, while FIG. 38b provides simulation results of the time-averaged power distribution when the component is illuminated by a unit-amplitude plane wave propagating along z-axis ($n_1$=1.49, $L_z$=2$\lambda_1$, R=$\lambda_1$, S=0.5$\lambda_1$).

Figure 39A:
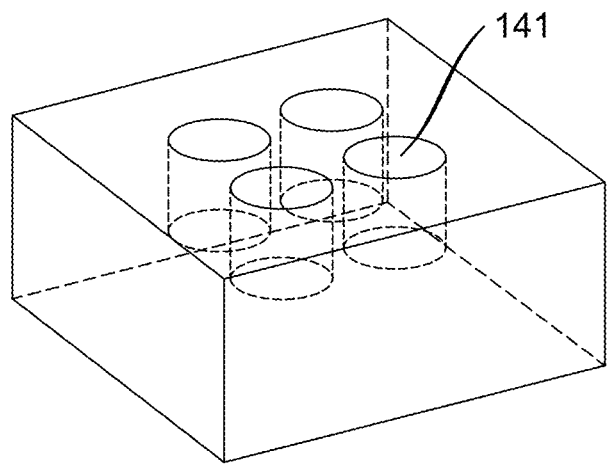
FIGS. 39(a) and (b) illustrate yet another embodiment, in which a 2×2 array of hollow circular cylinders is created at the boundary of the dielectric medium and free space.
Figure 39B:
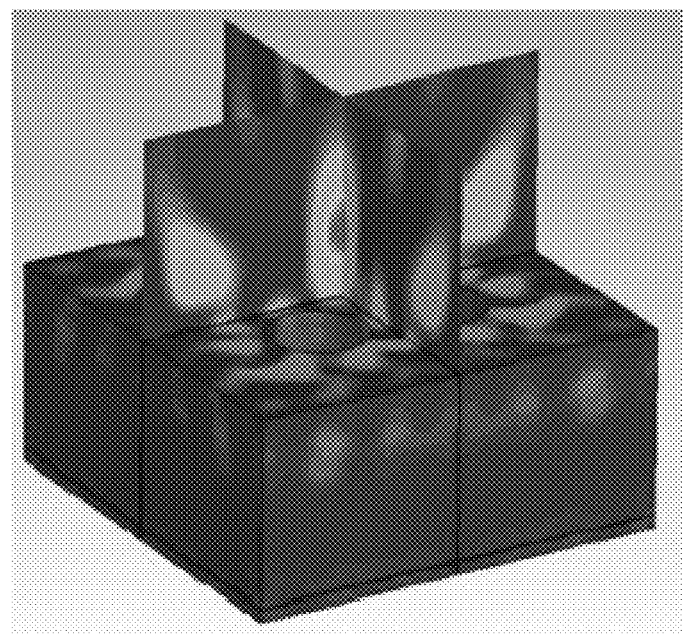

FIG. 39 provides two additional exemplary embodiments based on single-periodic (FIG. 39a) and double-periodic (FIG. 39b) arrays of hollow cylinders 141 embedded in a host medium 112, according to one embodiment of the disclosure. In both embodiments, the hollow cylinders form a number of regularly-spaced sub-arrays of 2×2 closely-positioned scatterers that act like the component illustrated in FIG. 42. Note that in case of FIG. 39b, each hollow cylinder 141 simultaneously contributes to the formation of four nanojets referenced 180.

It should be noted that in the case the plane wave is incident from left, the at least one base surface of the second element previously mentioned correspond to the lateral surface of a cylinder in the common sense with the at least two edge line segments being parts of the cylinder top and bottom edge lines However, one skilled in the art would understand this change of common sense.

It should be noted that due to the manufacturing process, some issues related to the creation of the previous mentioned shapes can occur. Indeed, at the nanoscale, it can be difficult to create an expected shape (such as a cylinder, a double-ring structure, etc.) without inaccuracies/deformations. These distortions introduced by the manufacturing process clearly affect (more or less depending on the type of distortions) the generated beams/nanojets originating from the device according to one embodiment of the disclosure. Especially, the nanojet beam radiation angle can be affected by these deformations.

Hence, in one embodiment of the disclosure, it is proposed to correct, at the nanoscale, the deficiencies (in term of orientation of the created nanojet) introduced by the manufacturing process. Such correction technique can be done via a doping process that modifies locally the refractive index value of the materials. Hence, it is proposed to obtain, via such doping process, a non-uniform (or non-istropic) material instead of a homogeneous material (in term of refractive index value). Modifying locally the refractive index means that for a 3D structure (that can have a wide range of shapes, i.e. it can be a three-dimensional space enclosed by a closed surface), having a volume from 1$\lambda_1^3$ to 20$\lambda_1^3$, the refractive index value is modified. Hence, within such 3D structure, the value of the refractive index is different from outside of this 3D structure.

The refractive index is a measurement of optical density of a material. The refractive index of the material depends on the relative permittivity of the material and also depends on optical frequency or wavelength.

Therefore, in one embodiment of the disclosure, it is proposed to use a femtosecond laser that can generate a femtosecond pulse being focused into an identified region of the dielectric layer. A gas of electronics in the conduction band of the glass is generated. The change in the optical properties (the complex refractive index) associated with this electron gas can be measured by a probe pulse as explained in the Phd thesis entitled "*Nonlinear femtosecond near infrared laser structuring in oxide glasses*" by Arnaud Royon, published in 2009.

In another embodiment of the disclosure, in order to measure a nanojet beam radiation angle, it is proposed to perform in a 3D coordinate system (such as a Cartesian coordinate system) x-y-z intensity measurements, by using for example a confocal microscopy technique (or confocal laser scanning microscopy technique) which characterizes the volumetric luminous intensity. The precision depends on the wavelength used to produce the nanojet beam and generally, a confocal microscope is known for measuring below the diffraction limit. The precision with which the maximum of radiation can be measured in each x-y plane is around $\lambda_1/(2*n)$, where n is the index of the material where the nanojet beam occurs. In depth, the precision is around $\lambda_1/(4n)$.

From the description of the FIGS. 8(*a*) and 8(*b*) and from equation (4), it appears that we can obtain an approximation of the angle $\theta_B$ (i.e. the nanojet beam radiation angle) by the following equation that involves the parameters $n_1$ and $n_2$ (where $n_2 < n_1$):

$$\theta_B \approx \frac{1}{2} \sin^{-1}\left(\frac{n_2}{n_1}\right)$$

Therefore, by derivating such equation according to either variable $n_1$ or $n_2$, we can obtain the two following equations:

$$\frac{d\theta_B}{dn_1} = \frac{-1}{2n_1} \cdot \frac{1}{\sqrt{\left(\frac{n_2}{n_1}\right)^2 - 1}}$$

$$\frac{d\theta_B}{dn_2} = \frac{1}{2n_1} \cdot \frac{1}{\sqrt{1 - \left(\frac{n_1}{n_2}\right)^2}}$$

Therefore, in the case that $n_1$ is increasing, it has for effect to decrease/reduce the value of the angle $\theta_B$.

In the case that $n_2$ varies, it has for effect to increase the value of the angle $\theta_B$ due to the fact that $$\frac{d\theta_B}{dn_2} > 0, \forall n_2.$$

Indeed, whatever the variation of the variable $n_2$, it increases the value of the angle $\theta_B$.

Hence, given a set of parameters ($n_1$, $n_2$), and knowing that values of $n_1$ and $n_2$ can only grow by applying a doping method, then if we have to correct the value of the angle $\theta_B$, two cases can happen:

if the value of the angle $\theta_B$ has to be decreased (i.e. a lower value has to be used), then the doping technique should be applied in order to increase the value of $n_1$;

if the value of the angle $\theta_B$ has to be increased, therefore a doping technique should be applied in such way that the value of $n_2$ is increased.

The same principles can be applied to the context of a double ring structure (see FIGS. 14(*b*) and 16(*a*) for example). It should be noted that the nanojets beams are oriented in the direction/side of the material having the highest refractive index (indeed, in the FIG. 16(*a*), the highest refractive index value is $n_1$ (compared to $n_2$) whereas in the FIG. 16(*b*), the highest refractive index value is $n_2$ (compared to $n_1$)).

Indeed, in another embodiment of the disclosure, it is proposed to modify the index refraction of the second element in order to correct a deviation of the angle $\theta_B$.

The previous description only relates to explanations on how the proposed technique enables light guiding at near field scale (i.e. at a distance less than a few wavelengths). However, applications, at the far field level (i.e. at few mm, cm or a larger distance) can be developed based on the device according to one embodiment of the disclosure.

For example, the PSF (point spread function) of a classical optics converging lens may be taken as the desired electro-magnetic field repartition for a given focal distance.

Therefore, in one embodiment of the disclosure, instead of correcting a nanojet element structure (shape) deficiencies by performing local measurements and local doping (i.e. by measuring the angle difference between the generated nanojets, and the expected nanojets), it is proposed to perform index refractive modifications from measurement at the far field level (based on the PSF value). Therefore, such correction can address a device that comprises a set of a nanojet elements. In such variant, it is proposed to use mean for correcting the far-field pattern of a device comprising nanojets generating elements, that can be used either during the manufacturing process or after it.

In order to correct the altered far-field pattern (due to the local deficiencies induced by malformations of the cavities for example), one way is to slightly perturb the distribution of the index of refraction of the host media aposteriori. This can be achieved by modifying locally the index of refraction via one of the several known methods in the state of the art. One skilled in the art, knowing the deviation can perform some simulations in order to identify a region (or 3D structure) where the index refraction modification will have a significant effect for correcting the deviation.

For example, one skilled in the art could use one of these known techniques for modifying index refraction:

neutron irradiation (see for example the article "*Correction of Optical Aberrations by Neutron Irradiation*," Appl. Opt. 10, 99-104 (1971) by P. Sinai) in which boron-rich glass is bombarded with neutrons to cause a change in the boron concentration, and thus the refractive index of the lens;

chemical vapour deposition (see document U.S. Pat. No. 3,904,268) involving the deposition of different glass with varying refractive indexes, onto a surface to produce a cumulative refractive change;

Partial polymerisation (see document U.S. Pat. No. 3,718,383): an organic monomer is partially polymerized using ultraviolet light at varying intensities to give a refractive gradient;

ion exchange (see document U.S. Pat. No. 3,873,408): Glass is immersed into a liquid melt with lithium ions. As a result of diffusion, sodium ions in the glass are partially exchanged with lithium ones, with a larger amount of exchange occurring at the edge. Thus the sample obtains a gradient material structure and a corresponding gradient of the refractive index;

ion Stuffing (in "*Digest of Topical Meeting on Gradient-index Optical Imaging Systems*" (Optical Society of America, Washington), D C (1979), paper WAL, by Mohr R K, Wilder J A, Macedo P B, and Gupta P K): Phase separation of a specific glass causes pores to form, which can later be filled using a variety of salts or concentration of salts to give a varying gradient.

Some of the above methods might be less efficient for our purpose, but since we want to implement an index gradient to correct for the global shape of the far-field, it is not necessarily mandatory to modify the index of refraction in the very near vicinity of the nano-elements.

Figure 40A:
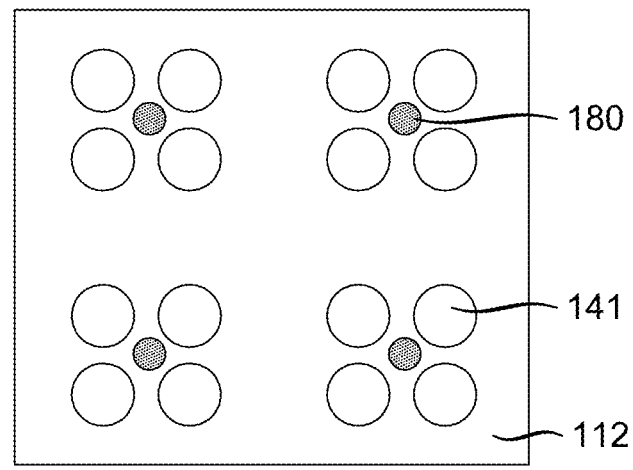
FIGS. 40(a) and (b) provide two additional exemplary embodiments based on single-periodic (FIG. 40(a)) and double-periodic (FIG. 40(b)) arrays of hollow cylinders embedded in a host medium.
Figure 40B:
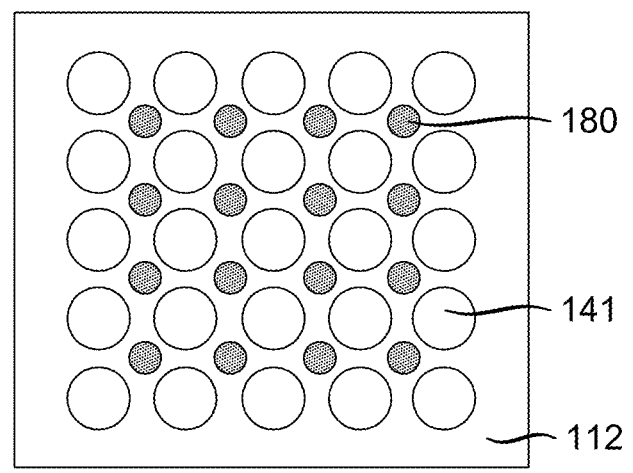

In FIG. 40, we have simulated a thin glass plate of nano-elements whose optical function is to focus the incoming light beam coming from infinity in the tiniest possible spot in the far-field. In order to show the advantage of the present disclosure, the nano-structure has been perturbated in a radial manner and it exhibits a very poor focusing to a spot size of rms radius of 137 microns which is not suitable with lots of applications like imaging. This perturbation can come from a redial difference of density of nano-elements or from some curved shaped implementation in the bulk host media for instance.

Figure 41A:
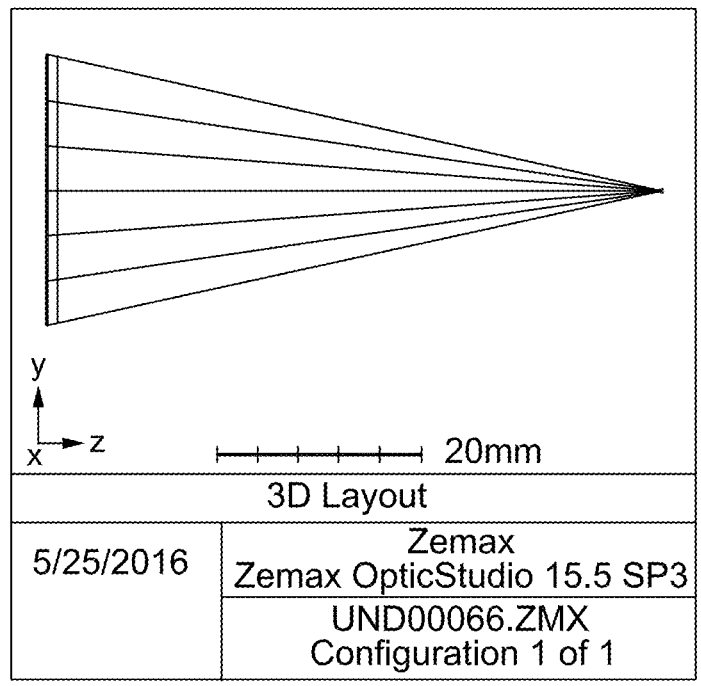
FIGS. 41(a) and (b) present (a) a ray trace through a thin plate of nano-elements where the far-field if a narrow focused light-bundle (lens), and (b) presents a spot diagram of the focused beam showing the large extend of the spot (with a root mean square (rms) radius spot size of 137 microns)
Figure 41B:
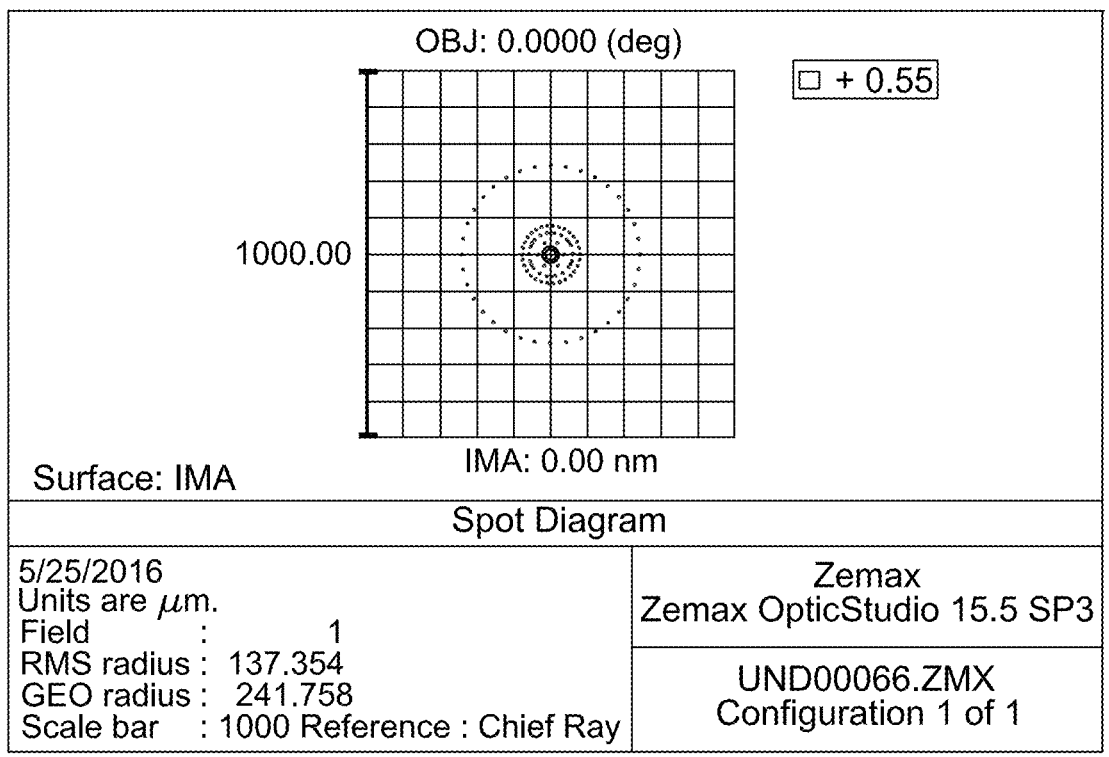

In order to correct for the far-field spot quality, one of the above method could be employed in order to modify the index of refraction of the right-hand side host media of the component. By optimizing the global variation of the index of refraction, we could achieve the performance shown on FIG. 41. This time, the rms spot size radius achieved is of 3.4 microns, which is a very good one for the focusing distance of 60 mm and a system aperture of 20 mm.

In order to compensate for the initial bad far-field pattern, the added modulation in the index of refraction of the host media can be modeled as $n(r)=n'_0+n'_2r^2+n'_4r^4$ with $n'_0=1.6$, $n'_2=-2.15\times10^{-3}$ and $n'_4=2.476\times10^{-5}$, where $r=\sqrt{x^2+y^2}$. But in general, n as also a longitudinal component, so could also be a function of z, n(r,z).

In another embodiment of the disclosure, it is proposed to use another polynomial function for defining a model for n(r). Hence, we have n(r)=P(r), where P is a polynomial function of degree n.

In another embodiment, other function can be used for modeling the function n(r).

Figure 42A:
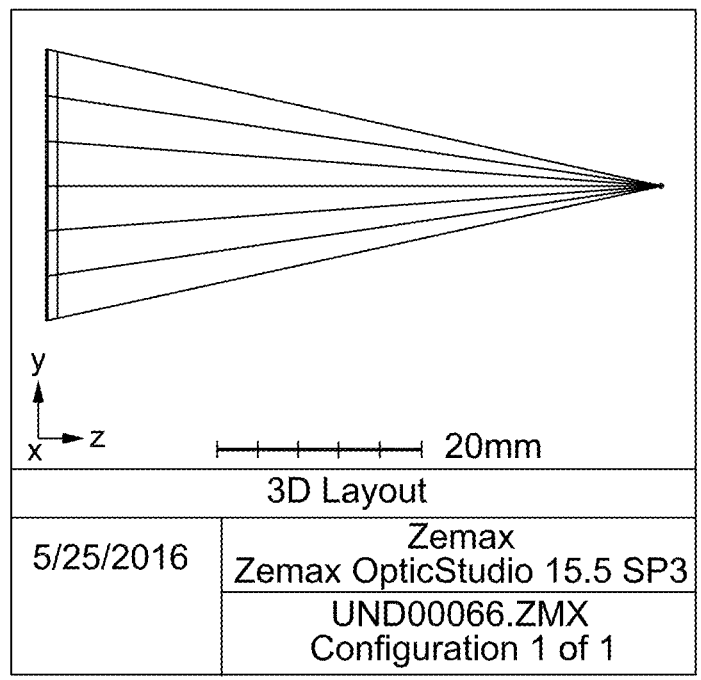
FIG. 42(a) presents a ray trace through a corrected thin plate of nano-elements.
Figure 42B:
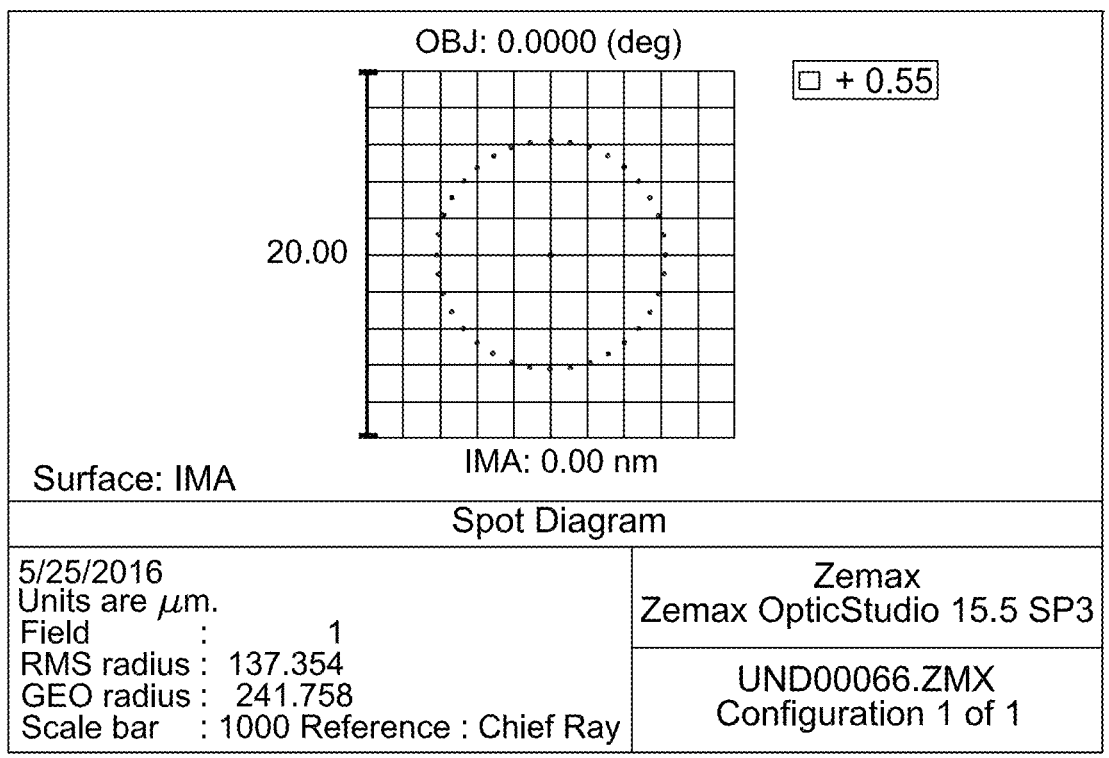
FIG. 42(b) presents a spot diagram of the focused beam showing the large extend of the spot (where rms spot size radius is of 3.4 μm, because of the gradient index correcting the far-field)
Figure 43:
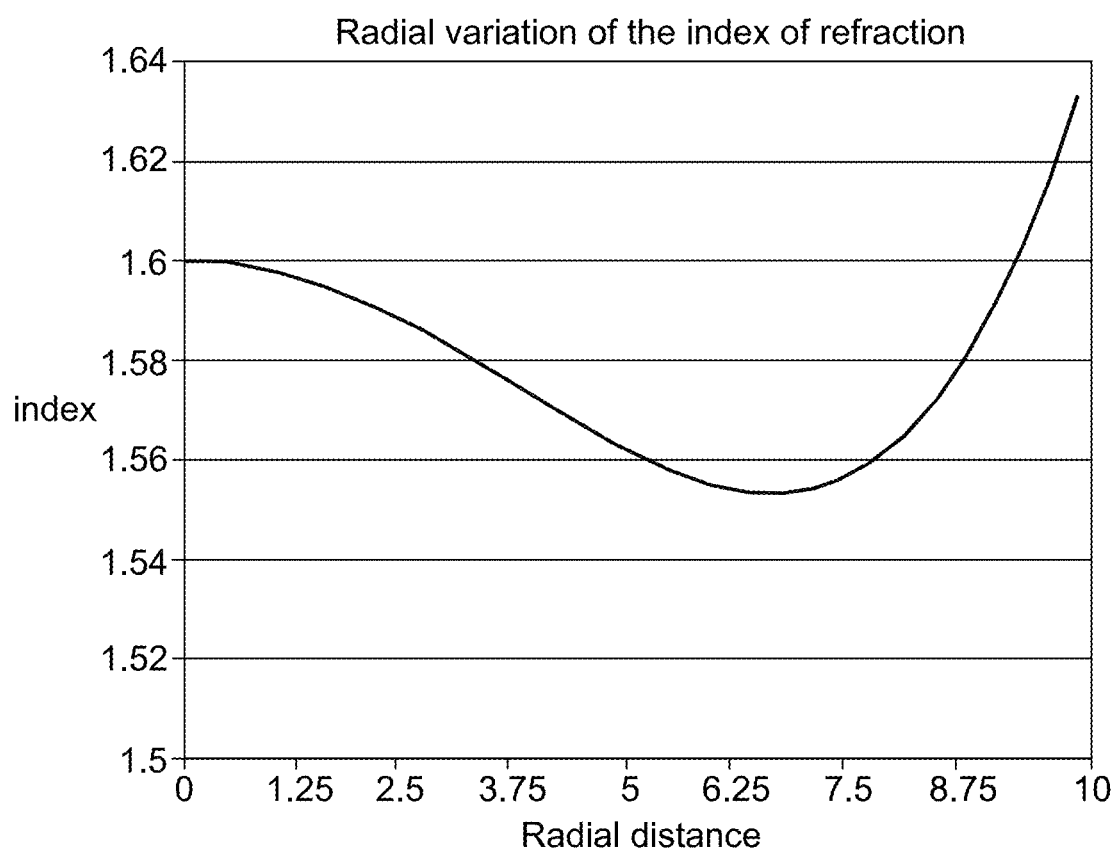
FIG. 43 presents a radial variation of the index of refraction according to the value of the radial distance.

As we can see from the FIG. 42, the variation of the index of refraction is very sound since it is constrained in a region of optically sound values ranging from 1.553 and up to 1.632. The variation is also constrained on this example, which is also good for a practical realization.

In this example case and for the purpose to give an example, the correcting index function is an even function of r but this might not be the case in general since the fabrication process can end up in some asymmetrical or even random variation of the phase φ of the light emerging from the optical component.

In the most general case, in order to achieve a target far-field pattern, the optical element needs to have the nanoelements fabricated and embedded in host material and the device has then an optical phase in the vicinity of the output surface described as a function $\phi_{target}(x,y)$ which is not necessarily continuous.

Once the component is fabricated, it will exhibit a phase function which is different due to some fabrication perturbations $\phi_{measured}(x,y)$.

In order to correct that sample, we need to modify the measured phase value by doping the host media or adding a thin component in its vicinity in such a way to get back to the design phase $\phi_{target}$. As the phase is defined modulo $2\pi$, we can always state that to compensate the optical component in order to achieve the thrived far-field pattern, we need the following statement to hold true:

$$\phi_{target}(x,y)=\phi_{measured}(x,y)+\Delta\phi(x,y) \bmod 2\pi$$

and the value $\Delta\phi(x,y)$ to add will be a summation of the varying index of refraction over the optical path length:

$$\Delta\phi(x,y) = \frac{2\pi}{\lambda}\int_{s_0}^{s} n(\xi,\eta,\zeta)ds$$

One way to have a control over the production of specific nano-beams is to vary the index of refraction of the host media for hollow type nano-structures. Large scale (over few microns) variations of the nano-elements are necessary in order to achieve some far-field optical function. Those variations can exhibit different types of deviations from the specified ones, and with the means described in this invention disclosure, we can compensate the variations to get to a better far-field pattern.

The fabrication of the hollow nano-structures is a complicated process and the performances of the optical components realized by such means greatly depend on various parameters of the nano-elements, such as their edge straightness, roughness, shape, their geometry, tolerances on the size. So it is much easier to enhance the quality of the optical element by providing it with an after fabrication index gradient than by tightening the fabrication process precision, the latter is not always possible.

In another embodiment of the disclosure, one skilled in the art can use Schlieren photography in order to determine changes or nonuniformities in refractive index of materials used in the present document.

The invention claimed is:

1. A method for manufacturing a device that forms at least one focused beam in a near zone, from an electromagnetic wave incident on the device, the method comprising:
    depositing a dielectric material layer with a first refractive index on a substrate layer;
    forming at least one cavity by a microfabrication technique in the dielectric material layer deposited on the substrate layer;
    filling the at least one cavity with a material having a second refractive index lower than the first refractive index, wherein the device comprises the substrate layer and the dielectric material layer having the at least one cavity filled with the material;
    determining a deviation between a measured radiation angle of a near-zone focused beam obtained from the device and an expected focused beam radiation angle; and
    modifying locally at least one of the first refractive index and the second refractive index to adjust a radiation angle of the near-zone focused beam to reduce the determined deviation.

2. The method for manufacturing according to claim 1, wherein the microfabrication technique is selected from the group consisting of optical lithography and e-beam lithography.

3. The method for manufacturing according to claim 1, further comprising depositing a superstrate layer on the dielectric material layer.

4. The method for manufacturing according to claim 1, wherein the at least one cavity is a through-hole in the dielectric material layer.

5. The method for manufacturing according to claim 1, wherein the at least one cavity surrounds an element within the dielectric material layer.

6. The method for manufacturing according to claim 1, wherein the at least one cavity is targeted to be cylindrical or cone-shaped.

7. The method of claim 1, wherein when the measured radiation angle of the near-zone focused beam is to be decreased, locally doping the dielectric material layer to increase the value of a first dielectric index of the dielectric material layer.

8. The method of claim 1, wherein when the measured radiation angle of the near-zone focused beam is to be increased, locally doping the material filling the at least one cavity to increase the value of a second dielectric index of the material.

9. The method of claim 1, wherein the at least one cavity is configured such that the near-zone focused beam is formed by the device in response to the incident electromagnetic wave.

10. The method of claim 1, wherein, when the determined deviation is positive, the modifying comprises locally doping the dielectric material layer to modify a value of the first refractive index of the dielectric material layer.

11. The method of claim 1, wherein, when the determined deviation is negative, the modifying comprises locally doping the material filling the at least one cavity to modify a value of the second refractive index of the material.

12. The method of claim 1, wherein the modifying comprises using at least one technique selected from the group consisting of neutron irradiation, chemical vapor deposition, and partial polymerization.

13. The method of claim 1, wherein the radiation angle of the near-zone focused beam is a direction at which the near-zone focused beam is directed.

14. The method of claim 1, wherein the radiation angle of the near-zone focused beam is an angle between the dielectric material layer and a direction of the near-zone focused beam.

* * * * *